United States Patent
Miyake et al.

(10) Patent No.: US 6,553,143 B2
(45) Date of Patent: *Apr. 22, 2003

(54) IMAGE ENCODING METHOD AND APPARATUS

(75) Inventors: Nobutaka Miyake, Yokohama (JP); Yoshitake Nagashima, Chigasaki (JP); Tadayoshi Nakayama, Tokyo (JP); Joji Oki, Yokohama (JP); Yuji Konno, Yokohama (JP); Kazuhide Hasegawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/425,768

(22) Filed: Apr. 20, 1995

(65) Prior Publication Data

US 2002/0102027 A1 Aug. 1, 2002

Related U.S. Application Data

(63) Continuation-in-part of application No. 08/083,969, filed on Jun. 29, 1993, now abandoned.

(30) Foreign Application Priority Data

Jun. 30, 1992 (JP) .............................. 4-173443
Jun. 30, 1992 (JP) .............................. 4-173444
Nov. 6, 1992 (JP) .............................. 4-296928

(51) Int. Cl.$^7$ ................................ G06T 9/00
(52) U.S. Cl. ...................... 382/239; 382/250; 382/251; 358/1.15
(58) Field of Search ................................ 382/232, 239, 382/251, 248, 250; 348/405, 419, 420, 419.1, 420.1; 395/114; 358/432, 433, 1.15; 375/240.03, 240.24

(56) References Cited

U.S. PATENT DOCUMENTS

| | | | |
|---|---|---|---|
| 4,698,689 A | * 10/1987 | Tzou | 358/433 |
| 4,884,147 A | * 11/1989 | Arimoto et al. | 358/443 |
| 5,073,821 A | * 12/1991 | Juri | 375/240.03 |
| 5,105,284 A | * 4/1992 | Sakata et al. | 358/401 |
| 5,150,455 A | * 9/1992 | Morikawa et al. | 358/1.15 |
| 5,216,518 A | 6/1993 | Yamagami | 358/426 |
| 5,245,427 A | * 9/1993 | Kunihiro | 348/409.1 |
| 5,249,053 A | * 9/1993 | Jain | 375/240.03 |
| 5,249,066 A | * 9/1993 | Fukuda et al. | 358/261.1 |
| 5,291,282 A | * 3/1994 | Nakagawa et al. | 375/240.23 |
| 5,491,761 A | * 2/1996 | Kim | 382/251 |
| 5,537,215 A | * 7/1996 | Niimura et al. | 386/111 |
| 5,579,083 A | 11/1996 | Naito et al. | 355/50 |
| 5,684,896 A | * 11/1997 | Stone et al. | 382/239 |
| 5,822,462 A | 10/1998 | Miyake | 382/251 |
| 5,825,934 A | 10/1998 | Ohsawa | 382/246 |
| 5,838,834 A | 11/1998 | Saito | 382/251 |

FOREIGN PATENT DOCUMENTS

| | | |
|---|---|---|
| JP | 4-18857 | 1/1992 |
| JP | 4-87460 | 3/1992 |
| JP | 4-145781 | 5/1992 |

\* cited by examiner

*Primary Examiner*—Jon Chang
(74) *Attorney, Agent, or Firm*—Fitzpatrick, Cella, Harper & Scinto

(57) ABSTRACT

This invention relates to an image encoding method and apparatus, and particularly has as its object to satisfactorily control the amount of encoded image data. In order to achieve this object, according to this invention, there is disclosed a technique for sequentially controlling the code amounts in accordance with accumulated code amount information and accumulated encoded area information, so that variable-length codes of an image fall within a predetermined memory capacity in a single pass. More specifically, in an image processing apparatus having a compression processor (15) for compressing input image information, and a memory (16) for storing encoded data by the compression processor (15), a code amount controller (14) calculates a reference code amount on the basis of the input image information, and controls the encoding condition of the compression processor (15) on the basis of the calculated reference code amount.

14 Claims, 62 Drawing Sheets

FIG. 20

| 6 | 6 | 6 | 5 | 4 | 3 | 2 | 2 |
|---|---|---|---|---|---|---|---|
| 6 | 6 | 5 | 4 | 3 | 2 | 2 |   |
| 6 | 5 | 4 | 3 | 2 | 2 |   |   |
| 5 | 4 | 3 | 2 | 1 |   |   |   |
| 4 | 3 | 2 | 1 |   |   |   |   |
| 3 | 2 | 1 |   |   |   |   |   |
| 2 | 1 |   |   |   |   |   |   |
| 1 |   |   |   |   |   |   |   |

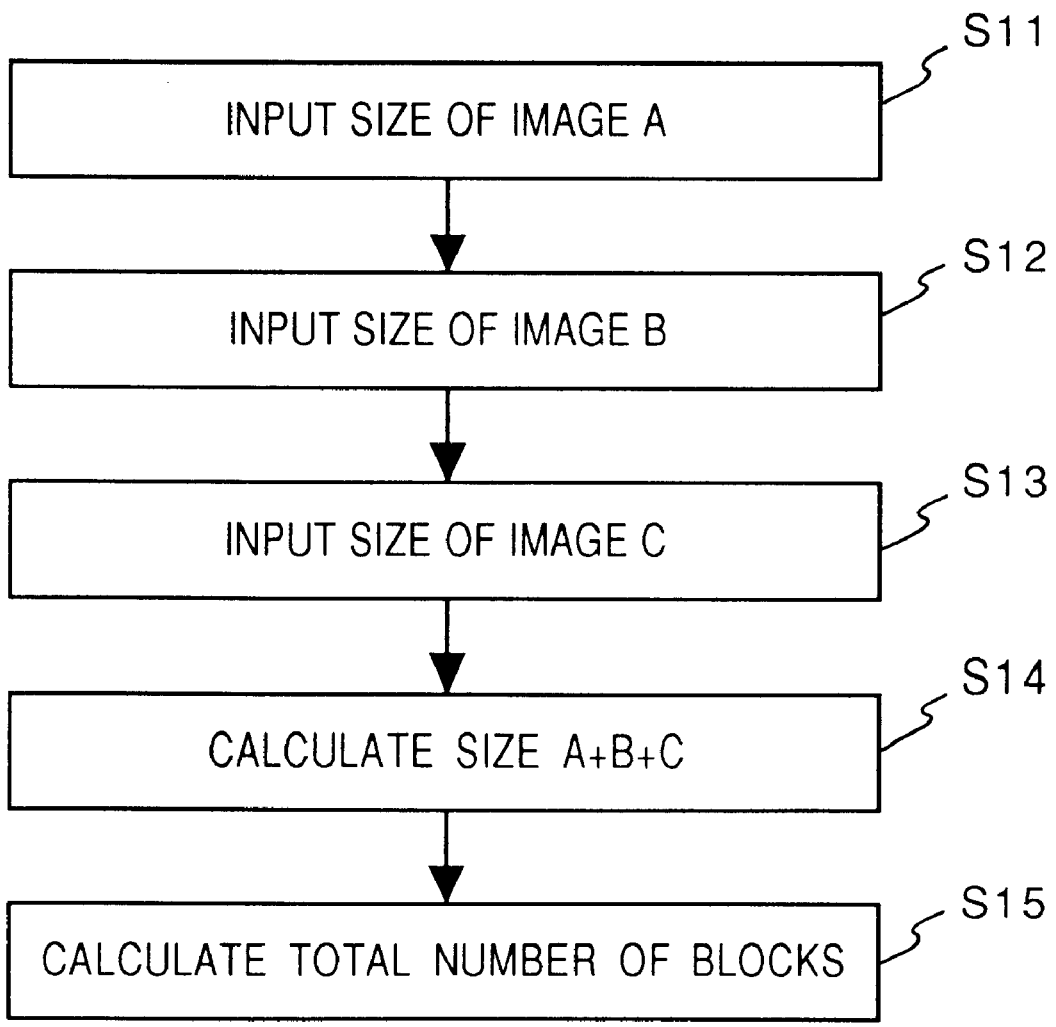

FIG. 28A

| | | | |
|---|---|---|---|
| 4 | 4 | 4 | 3 |
| 4 | 3 | 3 | 3 |
| 4 | 3 | 3 | 2 |
| 3 | 3 | 2 | 2 |

FIG. 28B

| | | | |
|---|---|---|---|
| 16 | 16 | 16 | 32 |
| 16 | 32 | 32 | 32 |
| 16 | 32 | 32 | 64 |
| 32 | 32 | 64 | 64 |

FIG. 28C

| | | | |
|---|---|---|---|
| 8 | 8 | 7 | 6 |
| 8 | 7 | 6 | 6 |
| 7 | 6 | 5 | 5 |
| 6 | 6 | 5 | 4 |

FIG. 28D

| | | | |
|---|---|---|---|
| 1 | 1 | 2 | 4 |
| 1 | 2 | 4 | 4 |
| 2 | 4 | 8 | 8 |
| 4 | 4 | 8 | 16 |

FIG. 33

| F1 | F2 | F3 | F4 | F5 | F6 | F7 | F8 | F9 | F10 | F11 | F12 | F13 ----- |
|----|----|----|----|----|----|----|----|----|-----|-----|-----|--------|
| $x_1$ | $y_1$ | $W_1$ | $H_1$ | $x_2$ | $y_2$ | $W_2$ | $H_2$ | $x_3$ | $y_3$ | $W_3$ | $H_3$ | IMAGE DATA |

FIG. 38

| F1 | F2 | F3 | F4 | F5 | F6 | F7 | F8 | F9 | F10 | F11 | F12 | F13 | F14 | F15 | F16 ----- |
|----|----|----|----|----|----|----|----|----|-----|-----|-----|-----|-----|-----|--------|
| x1 | y1 | W1 | H1 | A1 | x2 | y2 | W2 | H2 | A2  | x3  | y3  | W3  | H3  | A3  | IMAGE DATA |

FIG. 48

|  | LOW-FREQUENCY RANGE → | | | | | | HIGH-FREQUENCY RANGE | |
|---|---|---|---|---|---|---|---|---|
| LOW-FREQUENCY RANGE ↓ | 8 | 8 | 4 | 2 | 0 | 0 | 0 | 0 |
| | 8 | 4 | 2 | 0 | 0 | 0 | 0 | 0 |
| | 4 | 2 | 0 | 0 | 0 | 0 | 0 | 0 |
| | 2 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| HIGH-FREQUENCY RANGE | 0 | 0 | 0 | 0 | 0 | 0 | 0 | 0 |

FIG. 49

| | LOW-FREQUENCY RANGE $\longrightarrow$ HIGH-FREQUENCY RANGE | | | | | | | |
|---|---|---|---|---|---|---|---|---|
| LOW-FREQUENCY RANGE ↓ HIGH-FREQUENCY RANGE | 16 | 24 | 40 | 0 | 0 | 0 | 0 | 0 |
| | 24 | 40 | 0 | 0 | 0 | 0 | 0 | 0 |
| | 40 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |

IMAGE ENCODING METHOD AND APPARATUS

This application is a continuation-in-part of application Ser. No. 08/083,969 filed Jun. 29, 1993 now abandoned.

BACKGROUND OF THE INVENTION

1. Field of the Invention

The present invention relates to an image encoding method and apparatus, used when image information is stored in storage means and, more specifically, an image encoding method and apparatus, which are suitably used in an image output apparatus such as a printer, an apparatus having means for compressing input image data and storing compressed image data, or the like.

2. Description of the Related Art

In recent years, with the advent of high-resolution, full-color image display units, and along with remarkable development of the semiconductor techniques, it is technically possible to provide an apparatus which can store high-resolution full-color information in a memory, and can output it to an image display unit.

However, in order to store a large amount of image data, a very large memory capacity is required, and such a large-capacity memory leads to an increase in cost of the apparatus. For example, an A3-size full-color image which has a resolution of 400 dots per inch (to be abbreviated as dpi hereinafter), and in which each of red, blue, and green color data is expressed by 8 bits, requires an information amount of about 96 Mbytes, and 192 4-Mbit memories are required to store the A3-size full color image.

Thus, a technique for storing a full-color image in a small-capacity memory by decreasing the amount of image data using an image compression method has been conventionally adopted.

As one of international standard color still image encoding methods, an encoding method of a baseline system proposed by the JPEG (Joint Photographic Experts Group) is known. Although it will not be described in detail herein, with this method, a DCT-transformed quantization coefficient is variable-length encoded by Huffman encoding. Since this method adopts variable-length encoding, it is difficult to control a certain type of objective image to fall within a predetermined memory area.

As proposed in U.S.Patent application Ser. No. 738,562 (filed on Jul. 31, 1991), in a method of fixed-length encoding a DCT-transformed quantization coefficient in units of blocks, image quality deteriorates in some blocks due to unbalanced amount of image data in each block of an image.

Thus, in order to apply the above-mentioned JPEG method to a so-called electronic image pickup camera for electronically picking up an image, and storing the picked-up image in a floppy disk or an IC card, a code amount (an amount of code) control method has been proposed in U.S. patent application Ser. No. 753,660 (filed on Aug. 30, 1991).

However, image data normally suffers from considerable unbalance of information.

For example, an area of a blue sky without a speck of cloud can almost be expressed by DC components alone, while an area of crowded twigs requires many high frequency components in addition to DC components to express the crowded twigs.

For this reason, the code amount (the number of bits) necessary for preserving image information varies largely depending on blocks, and a difference between such blocks becomes ten times or more.

However, when an identical code amount is assigned to the blocks, as described above, a block with a small information amount cannot efficiently use the memory, and a memory capacity several times that which is efficiently used in practice must be prepared.

Furthermore, when the above-mentioned electronic image pickup camera system is applied to a printer having a certain memory capacity, input image sizes may often vary, and since the printer has no frame memory, it is difficult to determine encoding parameters by several trials (if information is transmitted from a connected host computer several times, the transfer time is undesirably prolonged).

Furthermore, the following drawbacks are posed.

(1) When image data for one page is constituted by a plurality of partial images, as shown in FIG. 41, and these partial images have different characteristics respectively, they must use different optimal compression parameters respectively, resulting in a decrease in compression efficiency.

(2) Since a blank portion other than an image is also determined as image data, the code amount is increased, resulting in an increase in redundancy.

(3) When compression is performed by a variable-length encoding method, the code amount in a page is fixed. Thus, if compression is performed by a 1-pass method, portions at the beginning and end of the page have different image quality levels, and image quality as a whole deteriorates.

(4) When image data for one page is constituted by a plurality of partial images, required image quality cannot be set for each of the partial images. In addition, compression parameters cannot be controlled according to attributes of the partial images.

SUMMARY OF THE INVENTION

It is an object of the present invention to eliminate the drawbacks of the above-mentioned techniques.

More specifically, it is an object of the present invention to satisfactorily control the amount of encoded image data.

In order to achieve the above object, according to the present invention, there is disclosed an image encoding apparatus comprising:

an inputter for inputting data representing an image constituted by a plurality of block images, and for sequentially supplying image data representing individual ones of the plurality of block images, on a block by block basis;

an image data transformer, arranged for transforming image data representing an individual block image, supplied by the inputter, into corresponding spatial frequency component data;

an encoder, arranged for quantizing the spatial frequency component data supplied by the image data transformer, to provide quantized spatial frequency component data, and for encoding the quantized spatial frequency component data;

a comparer, arranged for comparing an amount of encoded spatial frequency component data provided by the encoder with a predetermined lower value and a predetermined higher value, before the encoder encodes next spatial frequency component data; and a quantization parameter setter, arranged for setting a quantization parameter to be utilized by the encoder for quantizing the next spatial frequency component data, based on a comparison result of the comparer so that the amount of the encoded data falls within a predetermined range.

It is another object of the present invention to perform proper image encoding in accordance with the size of an original.

It is still another object of the present invention to improve a variable-length encoding method.

Other objects and aspects of the present invention will become apparent from the following description taken in conjunction with the accompanying drawings, and the description of appended claims.

BRIEF DESCRIPTION OF THE DRAWINGS

FIG. 20 is a map showing an example of bit assignment in a block;

FIGS. 23A and 23B are flow charts for explaining main operation sequences according to the 11th and 12th embodiments;

FIGS. 28A to 28D are views showing examples of bit assignment and quantization tables in the 15th embodiment;

FIG. 33 shows a data format used in the 19th embodiment;

FIG. 38 shows a data format in the 21st embodiment;

FIG. 48 is a map showing the numbers of bits assigned to codes;

FIG. 49 shows an example of a quantization table according to the 26th embodiment of the present invention;

DETAILED DESCRIPTION OF THE PREFERRED EMBODIMENTS

The preferred embodiments of the present invention will be described in detail hereinafter with reference to the accompanying drawings.

First Embodiment

Figure 1:
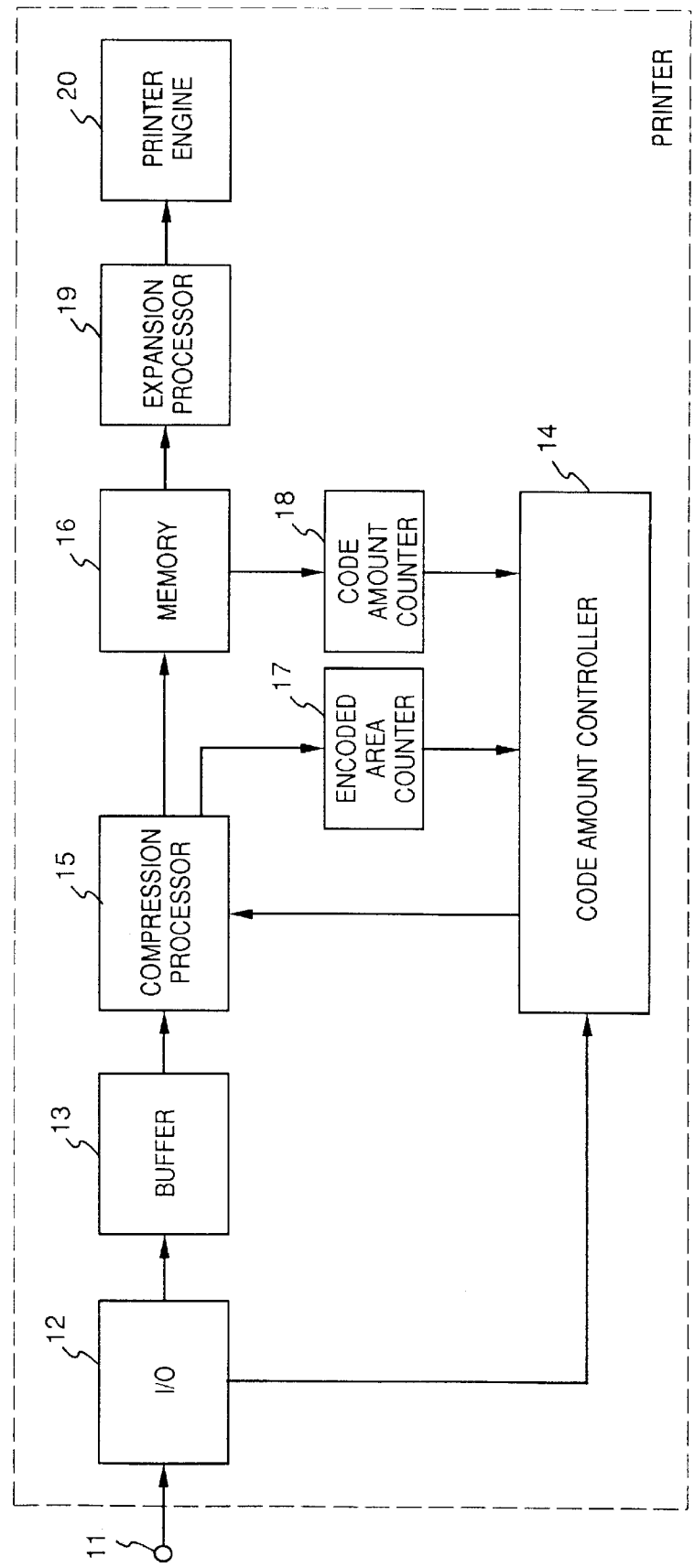
FIG. 1 is a block diagram showing an arrangement of an image output apparatus according to the first embodiment of the present invention.

FIG. 1 is a block diagram showing an arrangement of the first embodiment in which an image processing apparatus of the present invention is applied to a printer.

In FIG. 1, reference numeral 11 denotes an input terminal, which represents an information input source connected to the printer of this embodiment. An equipment which is connected to the input terminal 11 and outputs information to the printer, includes a host computer, a formatter with an interpreter of a page description language, which has been put into practical applications in recent years, and the like.

Reference numeral 12 denotes an I/O unit of the printer, which controls information exchange with the connected equipment. Reference numeral 13 denotes a buffer memory for storing information for several lines. For example, in the case of a compression method utilizing orthogonal transform in units of blocks, the buffer memory 13 stores information for at least one block line. Reference numeral denotes a code amount controller for receiving image size information from the I/O, setting a target compression ratio, and controlling a code amount to fall within a predetermined value range.

Reference numeral 15 denotes a compression processor for receiving image information stored in the buffer 13, and variable-length encoding the image information by decreasing the redundancy of an image.

Reference numeral 16 denotes a memory for storing codes from the compression processor 15. Of course, this memory has a memory capacity smaller than the data amount of a maximum-size image, which can be reproduced by the printer according to this embodiment.

Reference numeral 17 denotes an encoded area counter for, when the compression processor 15 sequentially executes encoding, e.g., when the processor 15 executes encoding processing in units of blocks, counting the number of processed blocks so far. Reference numeral 18 denotes a code amount counter for counting a code amount stored in the memory so far. Reference numeral 19 denotes an expansion processor for reading out codes from the memory 16, and decoding the codes according to the specification of a printer engine 20 (in synchronism with the timing of the process speed of the engine). Blocks enclosed in a broken line correspond to a printer. As the printer engine 20, an electrophotographic laser beam printer is used.

Figure 2:
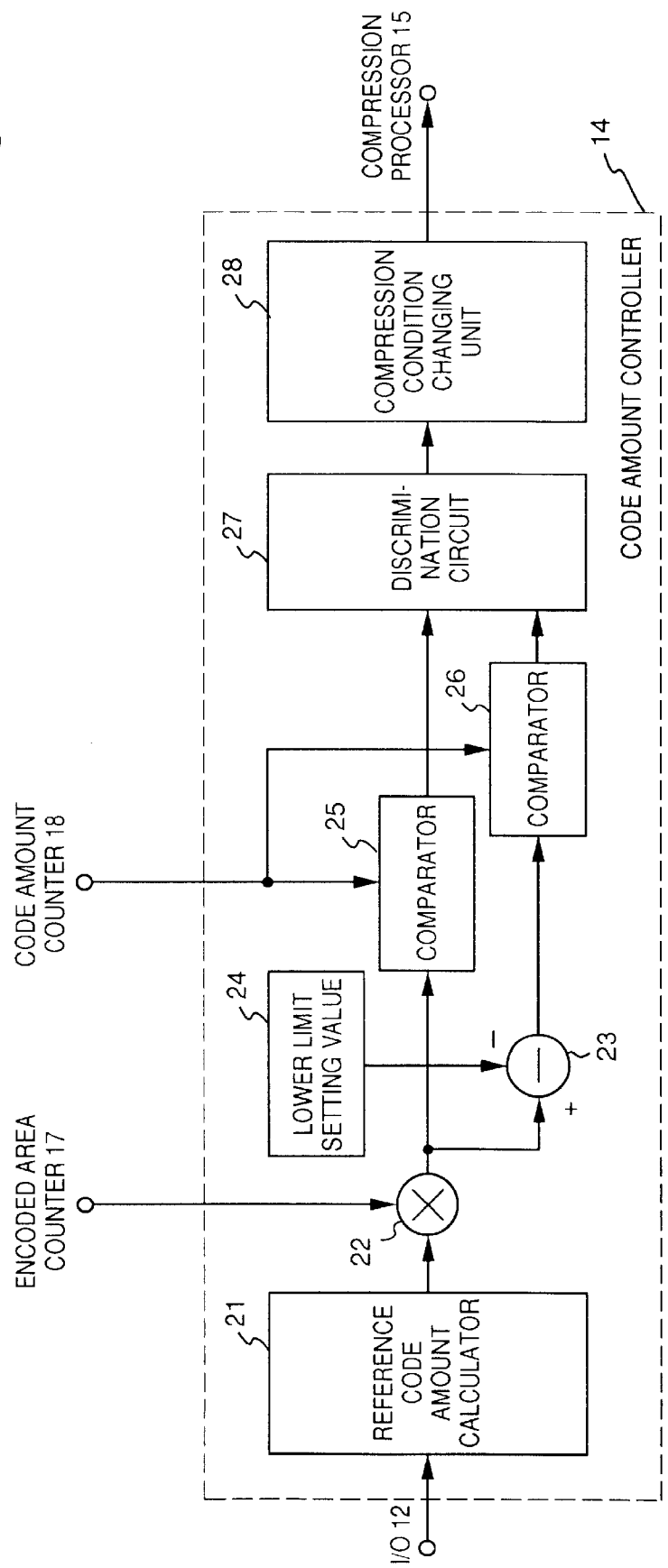
FIG. 2 is a block diagram showing a detailed arrangement of a code amount controller shown in FIG. 1.

FIG. 2 shows a detailed arrangement of the code amount controller shown in FIG. 1. In FIG. 2, blocks enclosed in a broken line correspond to the code amount controller 14.

Figure 3:
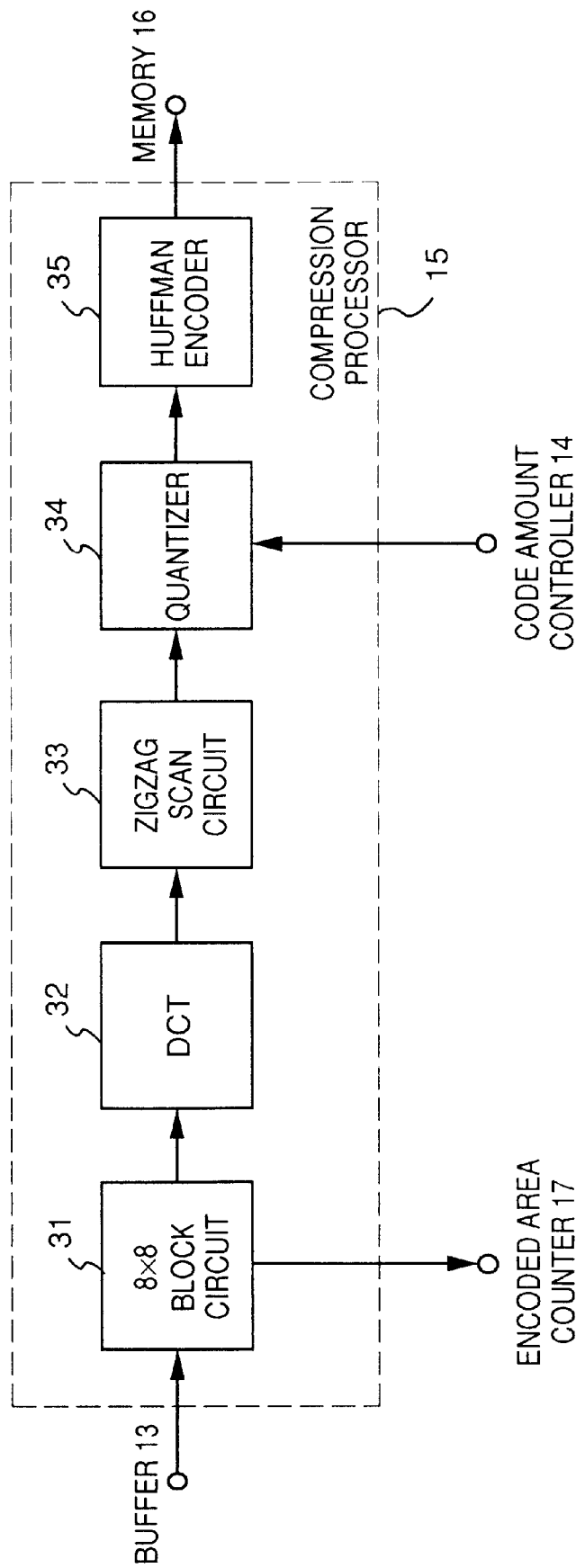
FIG. 3 is a block diagram showing a detailed arrangement of a compression processor shown in FIG. 1.

FIG. 3 shows a detailed arrangement of the compression processor shown in FIG. 1. Blocks enclosed in a broken line correspond to the compression processor 15. The flow of signals of this embodiment will be described below with reference to FIGS. 1 to 3.

First, the code amount controller (FIG. 1) receives, from the I/O 12, image size information to be output to the printer. The image size may be received from the connected host computer in the format of <the number of horizontal pixels> and <the number of vertical pixels> when an image area has a rectangular shape, or may be received in the format of <the area of an image area> when an image area has a shape other than the rectangular shape. In any case, the image size information must be received as header information prior to image information.

The image size information is transmitted to a reference code amount calculator 21 shown in FIG. 2, and the calculator 21 calculates a reference (average) code amount per block.

For example, if the memory capacity of the printer is represented by A, and the number of blocks obtained when the input image size is divided into 8 (pixels)×8 (pixels) blocks is represented by B, A/B corresponds to the reference (average) code amounts per block.

Figure 4:
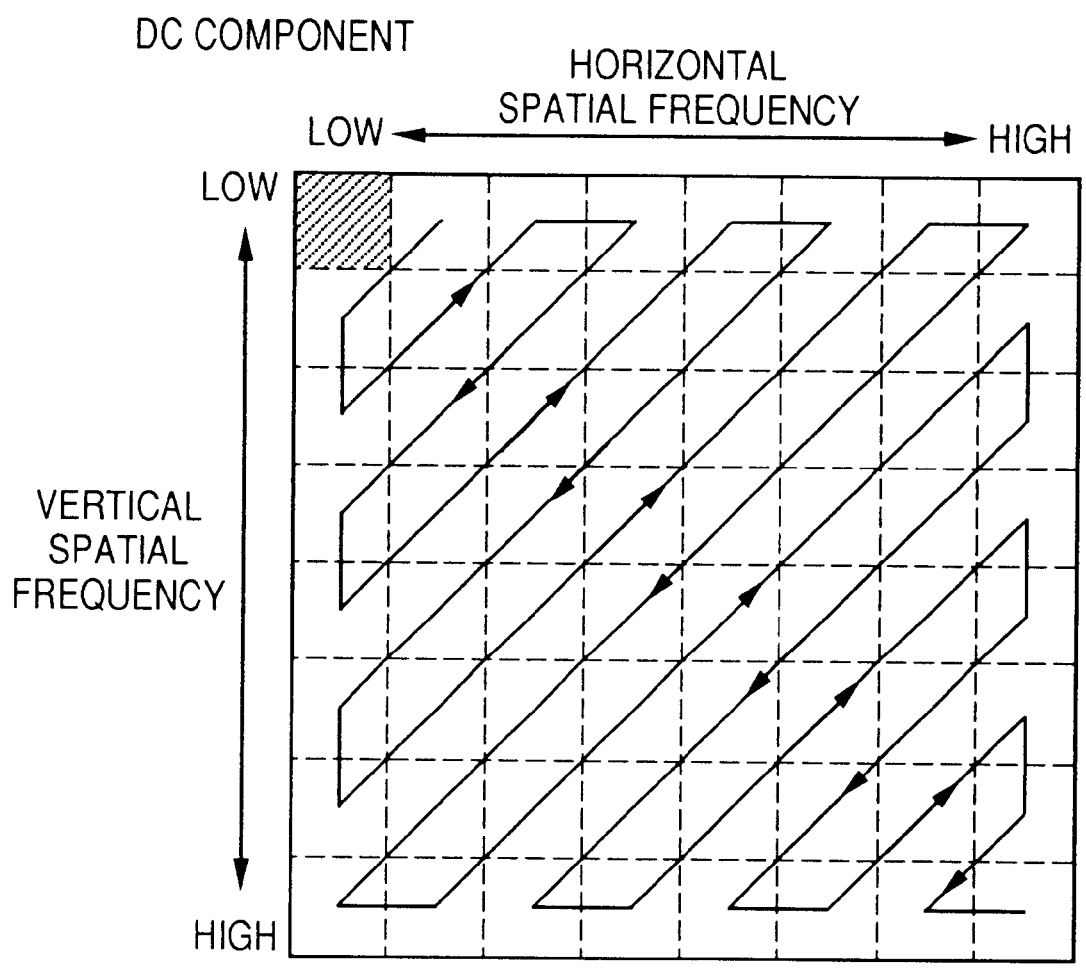
FIG. 4 is a chart for explaining a normal zigzag scan of the first embodiment.

Image information for one block line is stored from the I/O 12 in the buffer 13, and the stored information is then transmitted to a block circuit 31 (FIG. 3) of the compression processor 15. In the compression processor 15, image information for one block divided by the block circuit 31 is supplied to a DCT circuit 32, and is DCT-transformed. The DCT-transformed information is sorted from a low-frequency range to a high-frequency range in the block by a zigzag scan circuit 33 in a zigzag pattern in a one-dimensional direction, as shown in FIG. 4.

The sorted information is subjected quantization processing in a quantizer 34 in accordance with quantization table information having an 8×8 block size from the code amount controller. The quantization coefficients are entropy-encoded by a Huffman encoder 35, and codes for one block are stored in the memory 16.

In the above description, the encoded area counter 17 comprises an accumulator for adding divided blocks subjected to the encoding processing, and the number of processed blocks so far is input to a multiplier 22 shown in FIG. 2.

The multiplier 22 calculates a product of the reference code amount information per block from the reference code amount calculator 21 with the number of encoded blocks. For example, assuming that the above-mentioned A/B corresponds to the reference code amount per block, and K blocks have been processed so far, a value (A×K)/B is calculated. When processing of all blocks is completed, since K=B, the output from the multiplier is A.

A value present in a lower limit setting value unit 24 is subtracted from the product output from the multiplier by a subtracter 23.

The outputs from the multiplier 22 and the subtracter 23 represent a value offset downward by a predetermined amount from a reference code amount in the encoded area so far. More specifically, if the lower limit setting value is represented by $\beta$, and K blocks have been processed so far, the subtracter 23 outputs $((A \times K)/B) - \beta$.

On the other hand, the code amount stored in the memory 16 is counted by the code amount counter 18. If the code amount stored in the memory upon completion of encoding of K blocks is represented by Ck, comparators 25 and 26 respectively compare (A×K)/B and Ck, and $((A \times K)/B) - \beta$ and Ck.

A discrimination unit 27 receives these comparison results, and determines which one of the following three relations the code amount Ck satisfies.

$$(A \times K)/B \leq Ck \quad (1)$$

$$((A \times K)/B) - \beta \leq Ck < (A \times K)/B \quad (2)$$

$$Ck < ((A \times K)/B) - \beta \quad (3)$$

If the discrimination unit determines that the code amount satisfies relation (1), a compression condition changing unit 28 changes a condition to perform a little more coarse quantization; if the code amount satisfies relation (3), the unit 28 changes the condition to perform a little more fine quantization.

If the code amount satisfies relation (2), it is determined that the stored code amount is almost equal to the reference code amount (falls within an allowable range), and the quantization condition is not changed.

The information from the compression condition changing unit 28 is transmitted to the compression processor, and the processor encodes the following blocks under the changed condition.

Figure 5:
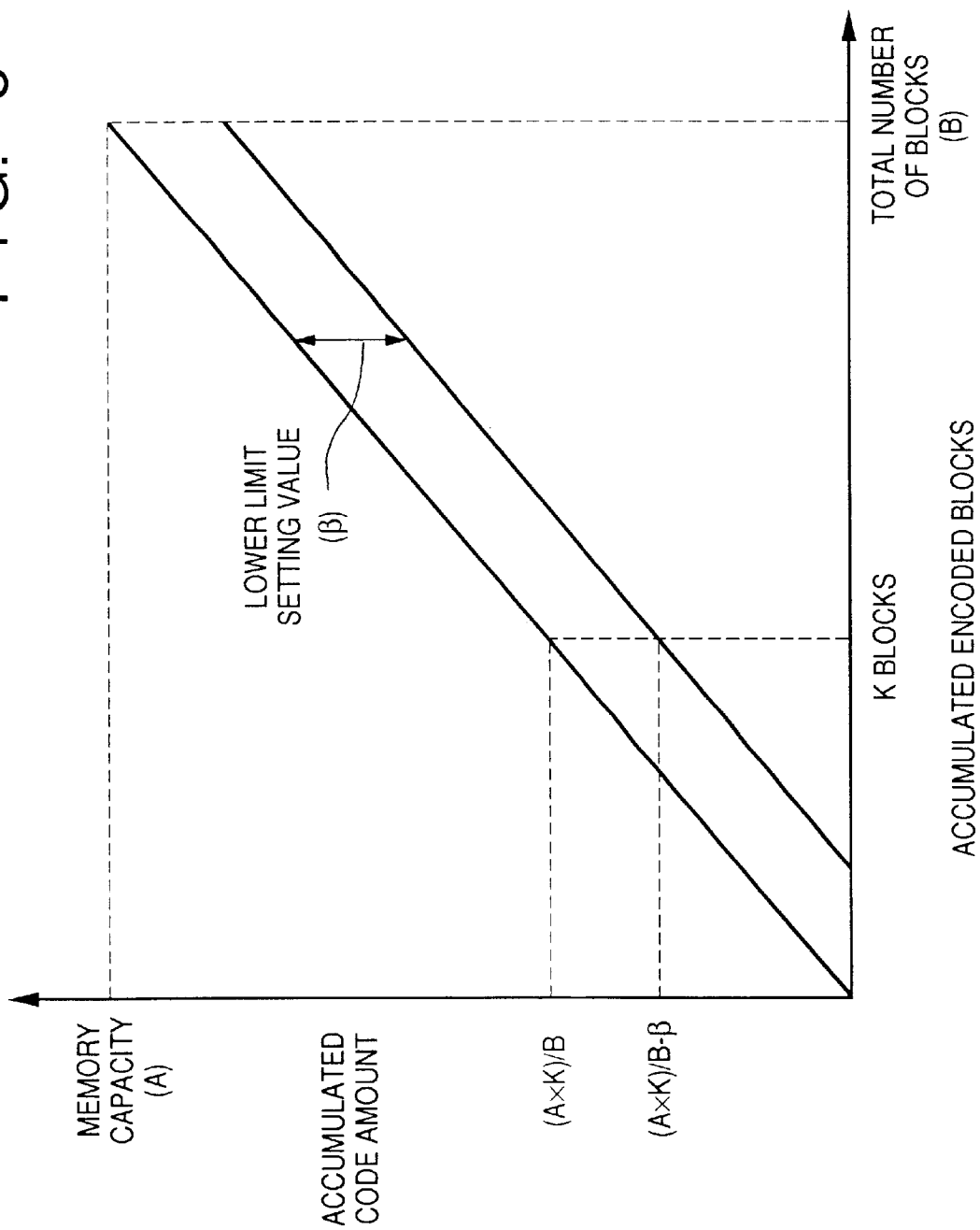
FIG. 5 is a graph showing control of the first embodiment.

FIG. 5 plainly shows the above-mentioned control.

In FIG. 5, the number of accumulated encoded blocks is plotted along the abscissa, and the end point indicates the total number of blocks calculated based on the input image size information (the number of calculated blocks is represented by B).

The accumulated code amount is plotted along the ordinate, and the end point indicates the memory capacity of the printer (the memory capacity of the printer is represented by A).

A straight line passing the origin and having an inclination of A/B represents the reference code amount. A straight line drawn below this straight line separated by the lower limit setting value $\beta$ represents the above-mentioned allowable range.

More specifically, this embodiment controls the encoded result to fall within a range between these two straight lines.

With this control, the code amount can be controlled in one pass without executing a plurality of trials.

Of course, two different quantization tables must be pre-set with different quantization coefficients so as to generate a difference between code amounts.

As described above, according to this embodiment, in the printer having the memory for storing image information, since the code amount is sequentially controlled on the basis of the accumulated code amounts and information of the accumulated encoded area, the amount of variable-length codes of an image can be controlled to fall within the predetermined memory in a single pass.

As a result, the transfer time of image information from the host computer can be shortened, and since variable-length encoding is used, satisfactory compression processing corresponding to unbalanced image information can be realized.

Second Embodiment

Figure 6:
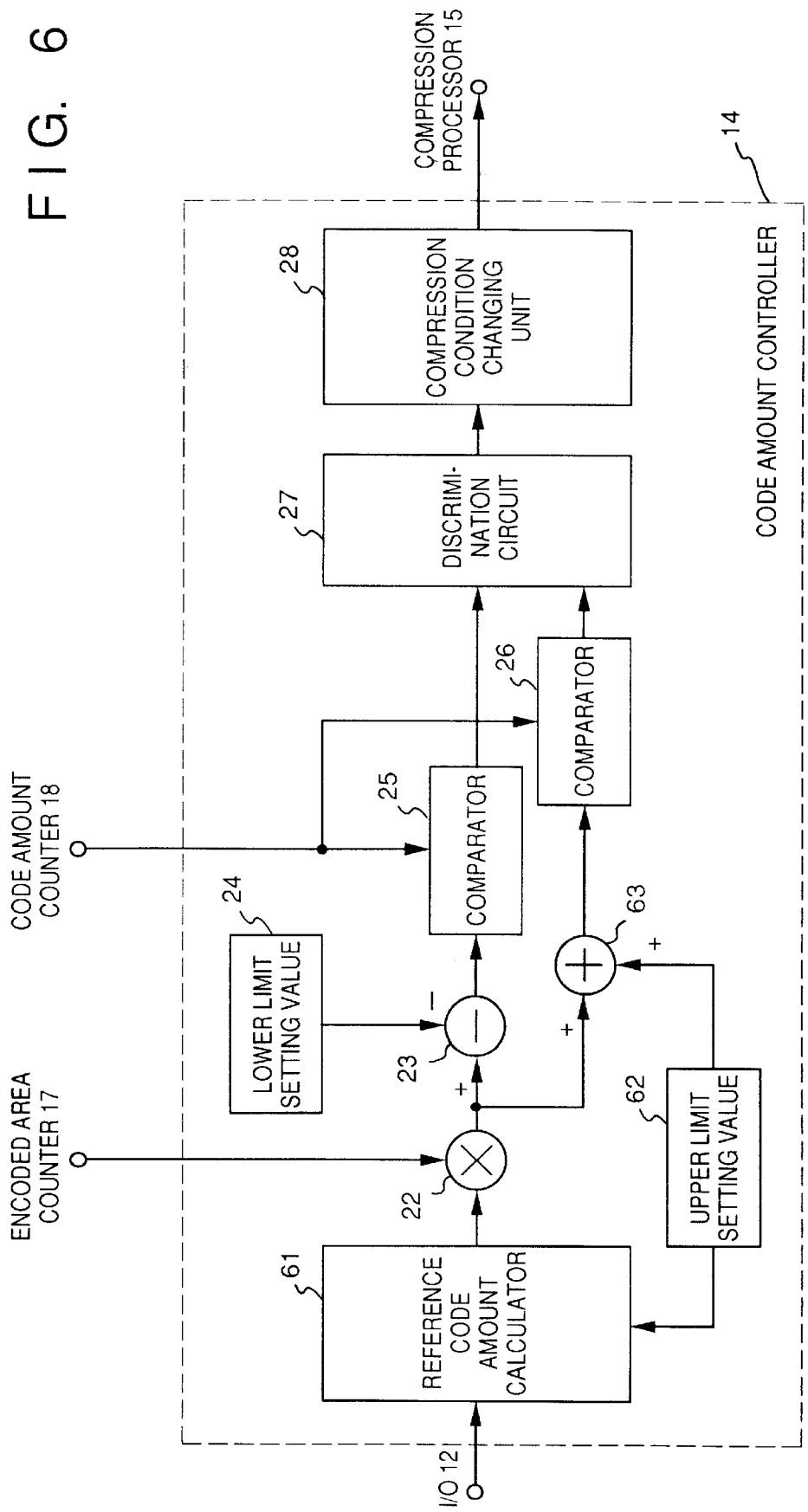
FIG. 6 is a block diagram showing an arrangement according to the second embodiment of the present invention.
Figure 7:
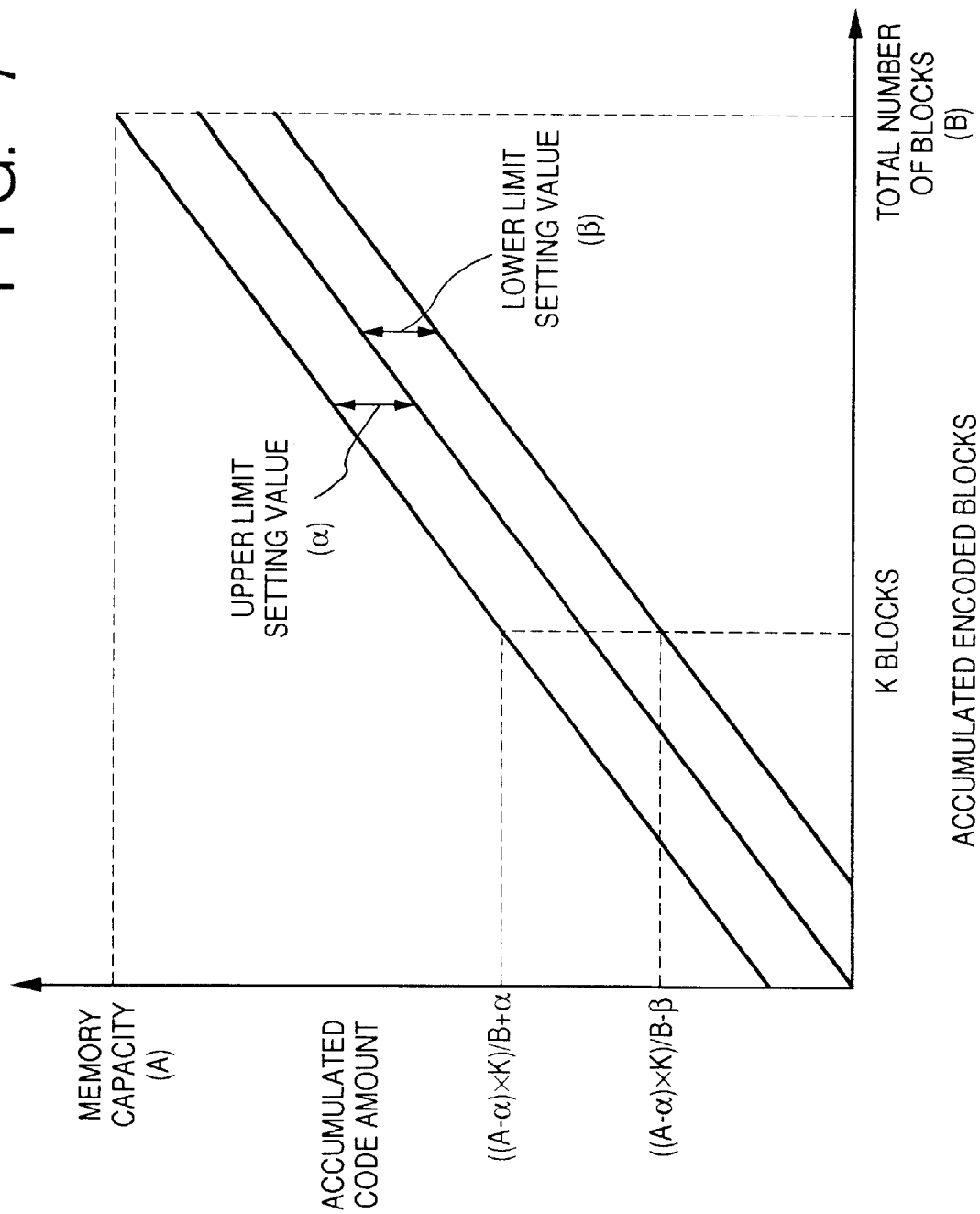
FIG. 7 is a graph showing control of the second embodiment.

FIG. 6 is a block diagram showing main part of the second embodiment according to the present invention. The second embodiment of the present invention will be described below with reference to FIG. 6 and FIG. 7 for explaining code amount control in the second embodiment.

The second embodiment is an application of the first embodiment. Thus, the same reference numerals in FIG. 6 denote the same parts as in the block diagram of the code amount controller in FIG. 2, and a detailed description thereof will be omitted.

In FIG. 6, reference numeral 61 denotes a reference code amount calculator for calculating a reference code amount per block like in the first embodiment. The second embodiment is characterized by a setting method of the reference code amount per block.

In the second embodiment, the calculator 61 receives a value (represented by $\alpha$) from an upper limit setting value unit 62, and sets a value obtained by subtracting a from the memory capacity A as a reference end point. More specifically, a reference code amount per block (corresponding to the inclination of each straight line in FIG. 7) is given by $(A-\alpha)/B$.

Assume that an input from the encoded area counter indicates K blocks. Then, the output from the multiplier 22 becomes $((A-\alpha) \times K)/B$.

The product from the multiplier is added to the predetermined value from the upper limit setting value unit 62 by an adder 63. In addition, a predetermined value (represented by $\beta$) from the lower limit setting value unit 24 is subtracted from the product from the multiplier by the subtracter 23.

The outputs from the adder 63 and the subtracter 23 respectively represent values offset upward and downward from the reference code amount in the encoded area so far by predetermined values.

More specifically, the adder 63 outputs $((A-\alpha) \times K)/B + \alpha$, and the subtracter 23 outputs $((A-\alpha) \times K)/B - \beta$.

Assuming that the code amount stored in the memory upon completion of encoding of K blocks is represented by Ck, the comparators 25 and 26 respectively compare $((A-\alpha) \times K)/B + \alpha$ and Ck, and $((A-\alpha) \times K)/B - \beta$ and Ck.

The discrimination unit 27 receives these comparison results, and determines which one of the following three relations the code amount Ck satisfies.

$$((A-\alpha) \times K)/B + \alpha \leq Ck \quad (1')$$

$$Ck < ((A-\alpha) \times K)/B + \alpha \text{ and } ((A-\alpha) \times K)/B - \beta \leq Ck \quad (2')$$

$$Ck < ((A-\alpha) \times K)/B - \beta \quad (3')$$

Like in the first embodiment, if the discrimination unit determines that the code amount satisfies relation (1'), the compression condition changing unit 28 changes a condition to perform a little more coarse quantization; if the code amount satisfies relation (3'), the unit 28 changes the condition to perform a little more fine quantization.

If the code amount satisfies relation (2'), it is determined that the stored code amount is almost equal to the reference code amount (falls within an allowable range), and the quantization condition is not changed.

The information from the compression condition changing unit 28 is transmitted to the compression processor 15, and the processor encodes the following blocks under the changed condition.

More specifically, this embodiment is characterized in that offsets are set above and below the reference code amount, and the reference code amount is calculated by a different method. With the above-mentioned control, code amount control which can more easily absorb unbalanced code amounts in units of blocks can be realized.

Third Embodiment

Figure 8:
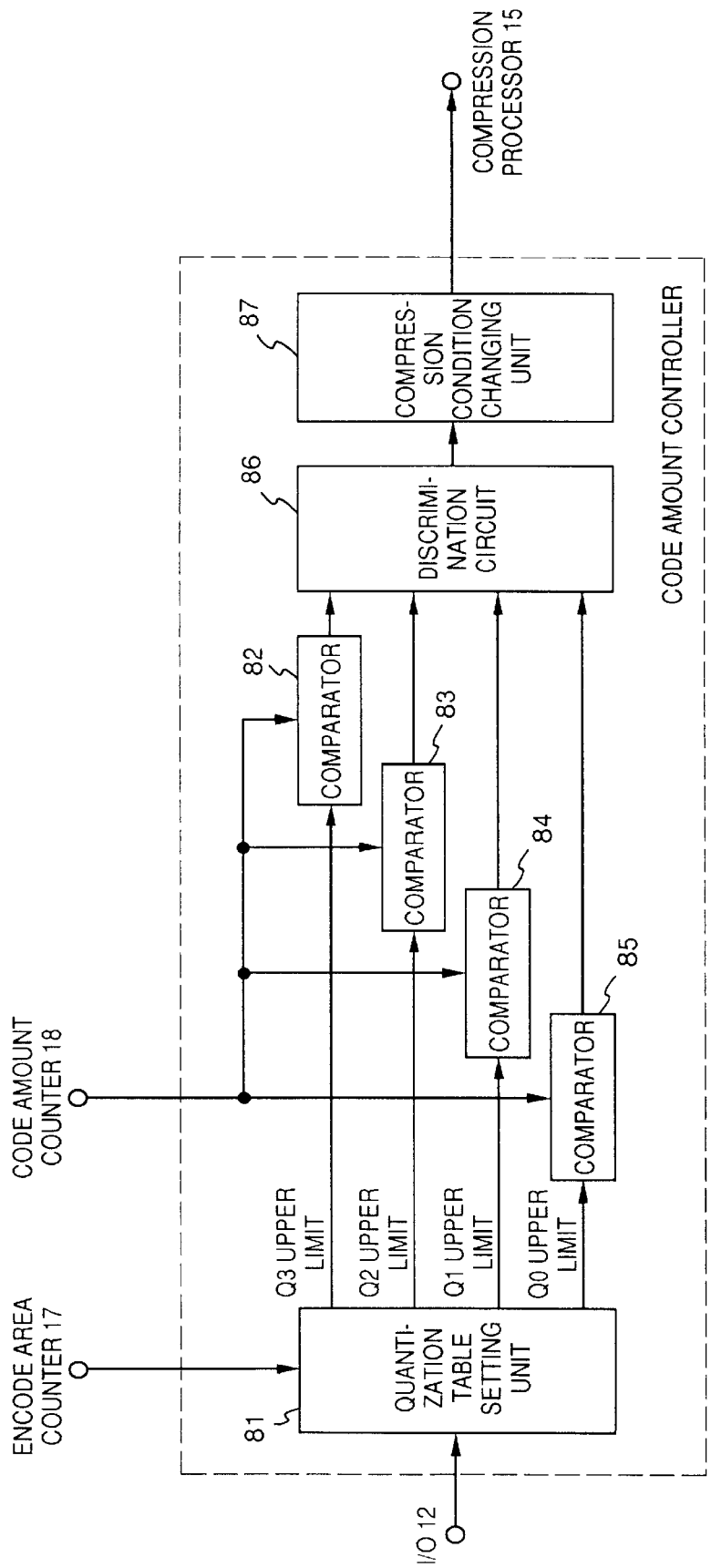
FIG. 8 is a block diagram showing an arrangement according to the third embodiment of the present invention.

FIG. 8 is a block diagram showing main part of the third embodiment according to the present invention. The third embodiment of the present invention will be described below with reference to FIG. 8 and FIG. 9 for explaining code amount control in the third embodiment.

In the third embodiment, in place of setting an allowable range corresponding to an offset from the reference code amount, a compression condition is directly set based on the relationship between the number of accumulated encoded blocks and the accumulated code amount (assume that the third embodiment holds five different quantization tables).

In FIG. 8, reference numeral 81 denotes a quantization table setting unit for calculating the total number of blocks (represented by B) based on image size information received from the I/O. The unit 81 can also calculate the ratio of the accumulated encoded blocks to the total number B of blocks based on received information of the accumulated encoded blocks. More specifically, a graph shown in FIG. 9 can be pre-set as the content of a ROM.

Assume that the accumulated encoded blocks are K blocks.

Also, assume that quantization tables held in the unit 81 are numbered with Q4, Q3, Q2, Q1, and Q0 in an order from the coarsest quantization steps.

The outputs from the quantization table setting unit 81 are four signals, i.e., <upper limit value of Q3>, <upper limit value of Q2>, <upper limit value of Q1>, and <upper limit value of Q0>, and are respectively transmitted to comparators 82, 83, 84, and 85.

If the input from the code amount counter 18 is Ck, the upper limit values of the quantization tables are compared with Ck by the corresponding comparators.

If the upper limit value of Qn is represented by QnUP, the comparison results can be classified into the following five relations:

| | | |
|---|---|---|
| $Q3UP<Ck$ | (1) | (Table Q4) |
| $Q2UP \leq Ck < Q3UP$ | (2) | (Table Q3) |
| $Q1UP \leq Ck < Q2UP$ | (3) | (Table Q2) |
| $Q0UP \leq Ck < Q1UP$ | (4) | (Table Q1) |
| $Ck < Q0UP$ | (5) | (Table Q0) |

A discrimination unit 86 receives the comparison results, and discriminates which quantizer range the code amount belongs. A quantization table selector 87 selects a table matching with the discrimination result from the discrimination unit 86 from the held quantization tables, and transmits the selected table to the compression processor.

In the above description, the four comparators are used. However, since the accumulated code amount continuously changes, this embodiment may be realized by a simpler arrangement (e.g., by decreasing the number of comparators)

Figure 9:
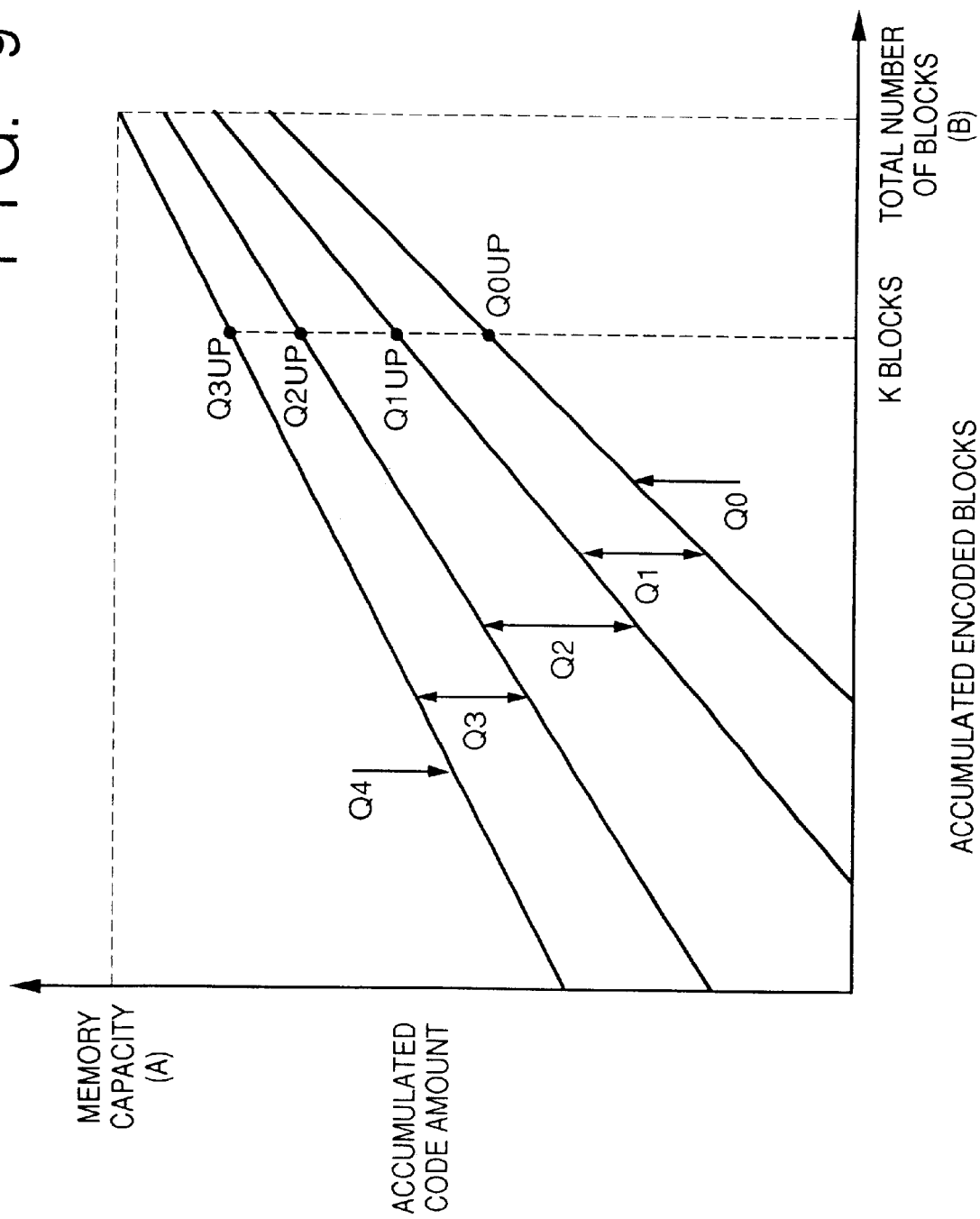
FIG. 9 is a graph showing control of the third embodiment.

In this embodiment, as shown in FIG. 9, the switching ranges of the tables may be narrowed as the number of accumulated encoded blocks is increased.

More specifically, as the number of accumulated encoded blocks is increased, unbalanced code amounts in units of blocks cancel each other. Especially, the printer often receives, as an input image, various kinds of image information such as a natural image input from, e.g., an image reader, an image artificially created by the host computer, character and line images, and the like in a synthesized format from, e.g., the connected host computer.

In this case, a wide allowable range is set in an early stage of encoding to eliminate unbalanced code amounts, and the code amount can be controlled in a later stage of encoding.

In the above description, the code amount is controlled by switching the quantization condition. In this case, such control is made under a condition that the quantization tables of the quantizers can be easily read out in decoding. Thus, when the quantization condition is switched, switching information may be encoded and stored in the memory 16, or the coefficient values of the selected quantization table may be encoded as index information, and the index information may be stored in the memory 16.

As described above, the quantization tables are preferably obtained in advance so as to obtain a certain code amount using a certain typical image.

In this embodiment, a code amount is detected in units of blocks. Also, control by detecting the code amounts in units of several blocks or block lines is effective.

Fourth Embodiment

The fourth embodiment according to the present invention will be described in detail below with reference to the accompanying drawings.

(1) Arrangement of Fourth Embodiment

Figure 10:
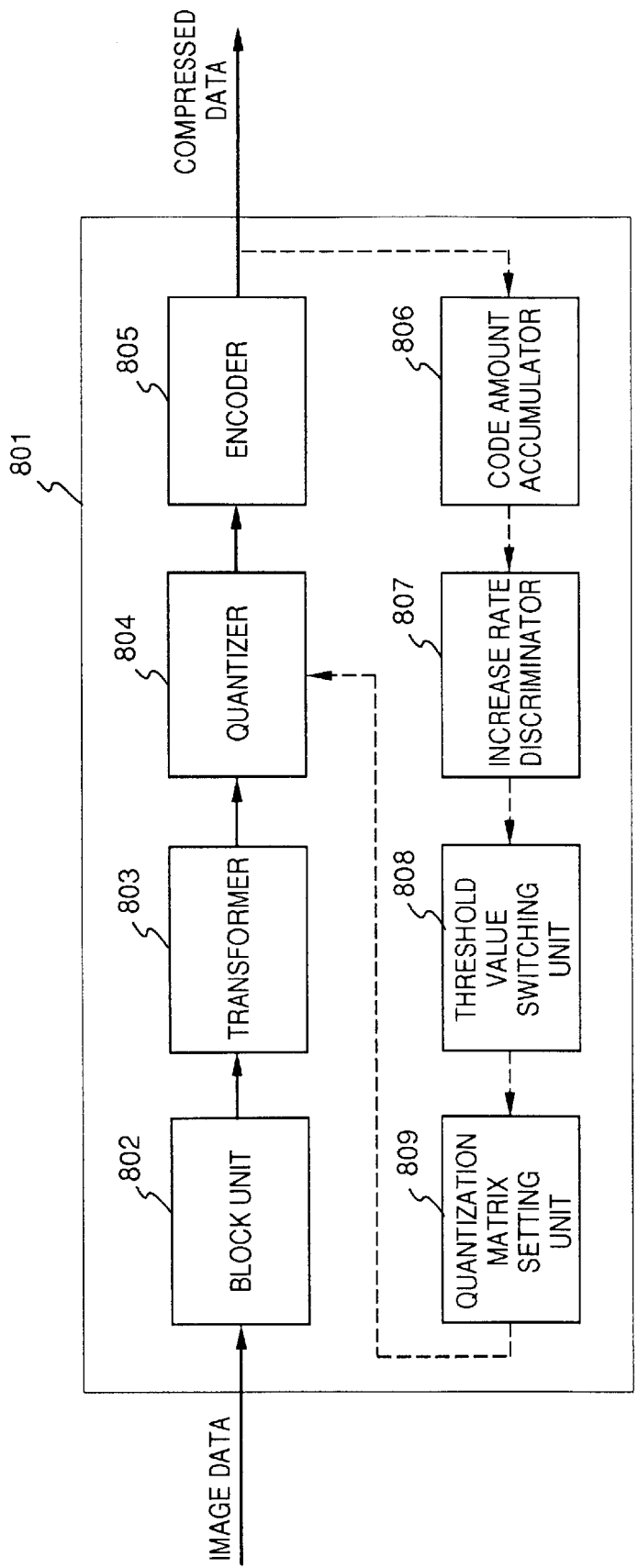
FIG. 10 is a block diagram showing an image encoding processing apparatus according to the fourth embodiment of the present invention.

In FIG. 10, reference numeral 801 denotes an image encoding apparatus of the fourth embodiment. In FIG. 10, reference numeral 802 denotes a block unit for dividing an input image signal into blocks; 803, a transformer for performing sequence transform in units of blocks; 804, a quantizer for quantizing transform coefficient blocks using a quantization matrix; 805, an encoder for encoding quantized transform coefficients using variable-length codes; 806, a code amount accumulator for accumulating a code amount encoded by the encoder 805 in every predetermined unit; 807, an increase rate discriminator for discriminating a rate of increase in code amount based on the code amount stored in the code amount accumulator 806; 808, a threshold value switching unit for switching a threshold value in accordance with the discrimination result from the increase rate discriminator 807; and 809, a quantization matrix setting unit for setting the quantization matrix used in the quantizer 804.

(2) Processing Sequence

Image encoding control in the image encoding apparatus 801 of the fourth embodiment with the above-mentioned arrangement will be described below with reference to the flow chart shown in FIG. 11.

Figure 11:
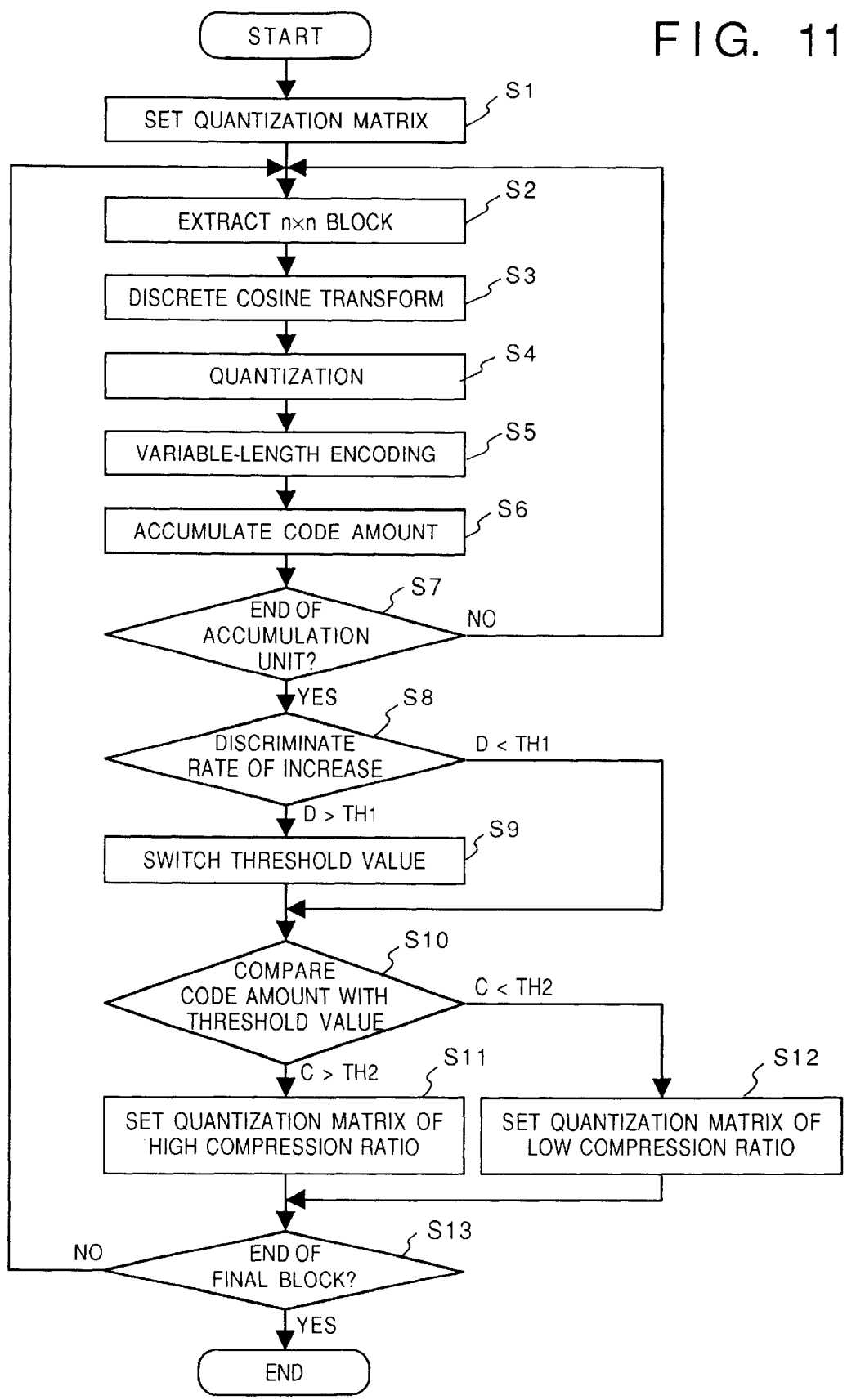
FIG. 11 is a flow chart showing image encoding control in the fourth embodiment.

When an image signal is input, the processing shown in FIG. 11 is started. In step S1, the quantization matrix setting unit 809 sets a default quantization matrix. In step S2, an input image signal is divided into blocks each consisting of n×n pixels by the block unit 802.

In step S3, the transformer 803 executes sequence transform of n×n pixel data to calculate n×m transform coefficients. In this case, when discrete cosine transform is used as the sequence transform in the transformer 803, the following discrete cosine transform formula (a) is preferably used.

$$F(\mu, v) = \frac{4}{n^2} \frac{C(\mu)C(v)\sum_{i=0}^{n-i}\sum_{j=0}^{n-j} f(i, j)\cos(2i+1)\mu\pi}{2n \times \cos(2j+1)v\pi} \quad (a)$$

where $$C(\mu) = \frac{1}{\sqrt{2}} (\mu = 0) \quad C(v) = \frac{1}{\sqrt{2}} (v = 0)$$

$$C(\mu) = 1 \ (\mu \neq 0) \quad C(v) = 1 \ (v \neq 0)$$

f(i,j): input image data

F($\mu$,v): DCT coefficient

In step S3, the quantizer 804 performs quantization by dividing the transform coefficients with the corresponding values of the quantization matrix in units of positions of the transform coefficient. In this case, when the quantization matrix has large values, the number of coefficients which become "0" upon quantization is increased, and the code amount is decreased.

In step S5, the encoder 805 encodes the quantized coefficients and matrix information used in quantization. In step S6, the code amount accumulator 806 accumulates and stores the code amount. It is checked in step S7 if processing of a predetermined accumulation unit is completed. If NO in step S7, the flow returns to step S2 to repeat the processing in steps S2 to S6 for one block line.

However, if YES in step S7, the flow advances to step S8, and the increase rate discriminator 807 compares a difference D between the code amount of the previous block line and the code amount of the current block line with a predetermined threshold value TH1. In this case, if the difference D is larger than the threshold value TH1, the flow advances to step S9, and the threshold value switching unit 808 switches a threshold value table used in the quantization matrix setting unit 809. Thereafter, the flow advances to step S10. However, if the difference D is smaller than the threshold value TH1, the flow jumps to step S10.

In step S10, a total accumulated code amount C up to the current block line is compared with a value TH2 in the current encoded area of the currently set threshold value table. If the accumulated code amount is larger than the threshold value TH2, the flow advances to step S11, and the quantization matrix setting unit 809 sets a quantization matrix (higher compression ratio) having values larger than the current values. Then, the flow advances to step S13.

On the other hand, if the accumulated code amount is smaller than the threshold value TH2, the flow advances to step S12, and the quantization matrix setting unit 809 sets a quantization matrix (lower compression ratio) having values smaller than the current values. The flow then advances to step S13. In step S13, it is checked if the current processing block is a final block. If YES in step S13, the processing is ended; otherwise, the flow returns to step S2 to repeat the above-mentioned processing until the final block.

Note that discrimination in step S7 in FIG. 11 is made in units of block lines in the above description. However, the present invention is not limited to this. For example, discrimination in units of an arbitrary number of blocks is included in the scope of this embodiment, as a matter of course. For example, such discrimination may be made for several block lines. In this case, in step S8, in place of comparing the difference D between the code amounts of the previous and current block lines with the threshold value TH1, a ratio D' of the code amount for several block lines to the final target code amount is compared with a certain threshold value TH3.

Furthermore, the threshold value TH1 used in the processing in step S8 in FIG. 11 is not particularly limited. For example, a plurality of threshold values may be prepared in correspondence with the positions of an image. When the threshold value TH1 is varied in correspondence with the position (the stage of encoding processing) of an image, the threshold value can be more adaptively switched in step S9.

Moreover, the threshold values TH1 and TH2 used in steps S8 and S10 shown in FIG. 11 need not always be prepared as predetermined tables in units of positions of an image, as described above, but may be calculated based on position information of an image by the following equation.

TH1=m×position of image

TH2=n×position of image

At this time, the threshold values can be switched by switching m and n.

As described above, according to this embodiment, the image encoding apparatus comprises the block unit for dividing an input image signal into blocks each consisting of a plurality of pixels, the transformer for performing sequence transform in units of blocks, the quantizer for quantizing transformed transform coefficients using a quantization matrix, the encoder for encoding the quantized transform coefficients using variable-length codes, the code amount accumulator for accumulating the encoded code amount, and the quantization matrix setting unit for switching the quantization matrix used in the quantizer on the basis of the accumulated code amount in the code amount accumulator, and further comprises the increase rate discriminator for discriminating the rate of increase in code amount accumulated in the code amount accumulator, and the threshold value switching unit for switching the threshold value used for switching the quantization matrix in the quantization matrix setting unit on the basis of the discrimination result from the increase rate discriminator. Therefore, the threshold value used for switching the quantization matrix can be adaptively switched in accordance with the encoded information amount at the corresponding position of an image, and the quantization range of the entire image can be changed stepwise.

Also, the encoded code amount can be fixed to a target value.

Fifth Embodiment

The fifth embodiment of the present invention will be described in detail below with reference to the accompanying drawings.

Figure 12:
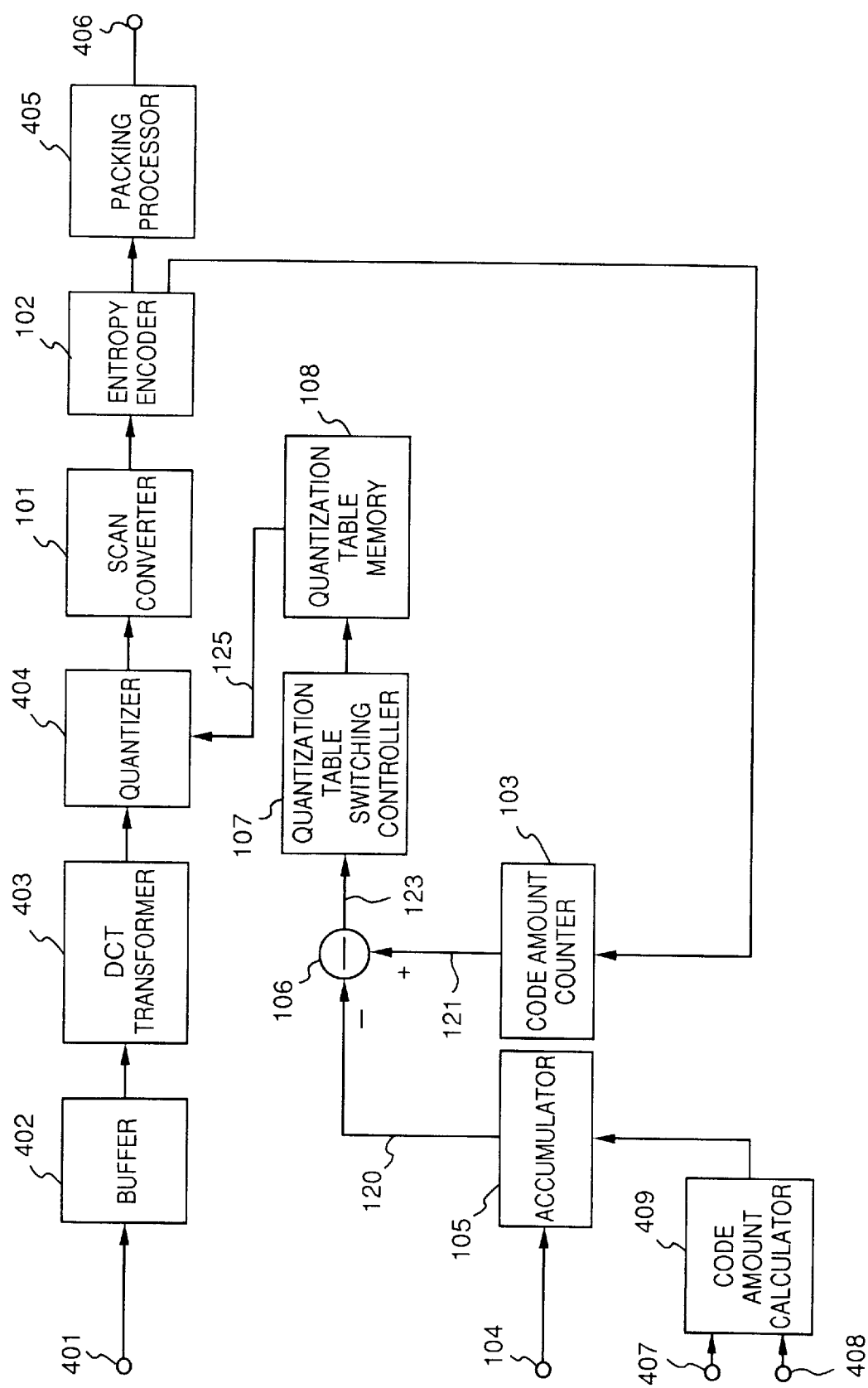
FIG. 12 is a block diagram showing an arrangement of an image encoding apparatus according to the fifth embodiment of the present invention.

FIG. 12 is a block diagram showing an image encoding apparatus according to the fifth embodiment of the present invention.

In FIG. 12, reference numeral 401 denotes an input terminal for receiving image data; 402, a buffer for temporarily storing a portion of image data; 403, a DCT transformer for DCT-transforming an image; 404, a quantizer for quantizing DCT-transformed frequency components; 405, a packing processor for packing data in units of bits into those in units of bytes or words; 406, an output terminal for outputting compression-encoded data; 407, an input terminal for receiving the horizontal size of an image; 408, an input terminal for receiving the vertical size of an image; and 409, a code amount calculator for calculating the number of bits of information to be assignable to a block as a basic unit upon DCT transform on the basis of the horizontal and vertical sizes of an image.

Figure 13:
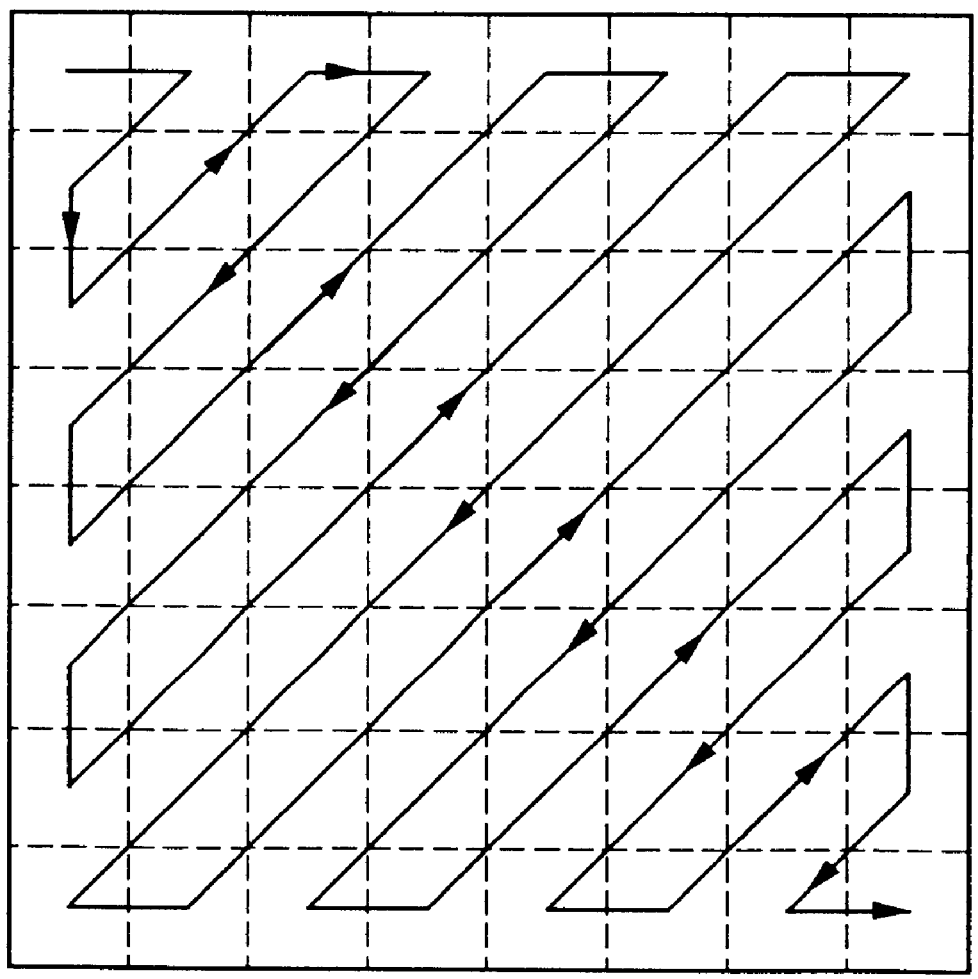
FIG. 13 is a chart showing an order upon sorting of DCT-transformed frequency components in a scan converter according to the fifth embodiment.

In this embodiment, the image encoding apparatus further comprises a scan converter 101 for sorting quantized data in a scan order shown in FIG. 13, an entropy encoder 102 for encoding scan-converted data on the basis of entropy levels of the data, a code amount counter 103 for counting a total code amount generated by the entropy encoder 102, an input terminal 104 for receiving one pulse every time one block is encoded, an accumulator 105 for accumulating and adding a code amount to be assigned to one block output from the code amount calculator 409, a subtracter 106 for subtracting the output from the accumulator 105 from the output from the code amount counter 103, a quantization table switching controller 107 for controlling switching of a plurality of quantization tables on the basis of an output result from the subtracter 106, and a quantization table memory 108 for storing the plurality of quantization tables.

Figure 19:
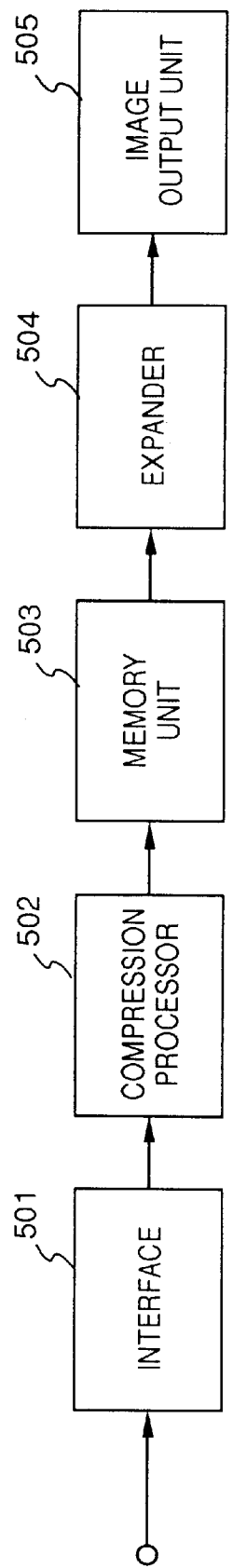
FIG. 19 is a block diagram showing an arrangement of the image encoding apparatus according to the fifth embodiment of the present invention.

FIG. 19 shows an arrangement of an image output apparatus using the image encoding apparatus of the fifth embodiment.

Data supplied from an external apparatus (not shown) such as a computer is classified into header information of an image and actual image data by an interface unit 501, and horizontal size information of an image in the header information is input to the terminal 407 (FIG. 12). On the other hand, vertical size information is input to the terminal 408. The image data is input to the terminal 401. The horizontal size information and vertical size information input to the terminals 407 and 408 are supplied to the code amount calculator 409, and the number of bits to be assignable to one block is calculated and output.

This processing is to maximally efficiently utilize a memory unit 503 having a predetermined capacity. For example, when the memory unit 503 has a total memory capacity of 128 Mbits, the horizontal size of an image is 4,000, the vertical size thereof is 6,000, each of red (R), blue (B), and green (G) pixels consists of 8 bits, and a DCT-transform block has a size of 8×8 pixels, the total number of blocks is 4,000×6,000÷(8×8)×3=1,125,000.

With this value, the number of bits per block is 128× $2^{20}$÷1,125,000≈119. This value is supplied to the quantizer 404, and the number of encoding bits is assigned to each of DCT-transformed frequency components to obtain a total of 119 bits. FIG. 20 shows an example of such bit assignment.

On the other hand, the image data input to the terminal 401 is stored in the buffer 402, and is read out in units of blocks. The readout image data is supplied to the DCT transformer 403. Every time image data for one block is supplied from the buffer 402 to the DCT transformer 403, a pulse is input to the terminal 104, and is supplied to the accumulator 105.

Prior to image encoding processing, the accumulator 105 is cleared to an initial value "0", and accumulates and adds the output value from the code amount calculator 409 every time it receives the pulse from the terminal 104. The accumulator 105 then outputs the accumulation result. An output value 120 from the accumulator serves as a reference for a total code amount generated upon encoding of an image, and will be referred to as a reference code amount hereinafter. The image data supplied to the DCT transformer 403 is DCT-transformed in units of blocks, and the DCT-transformed data is quantized by the next quantizer 404.

In FIG. 19 described above, the number of encoding bits is determined in advance for each frequency component of the DCT transformer, and quantization must be performed so that the quantized data falls within a range of the number of bits. However, in this embodiment, since a block with a small information amount is encoded to a small number of bits, the number of encoding bits is not determined in advance for each frequency component.

Instead, a quantization step is determined for each frequency component, and quantization is executed based on the quantization step. The quantization step is supplied from the quantization table memory 108 to the quantizer 404. Data quantized by the quantizer 404 is supplied to the scan converter 101, and is scan-converted in an order shown in FIG. 13.

In general, in a natural image, a high-frequency component has a small electric power, and tends to become zero after quantization. Therefore, when quantized components are sorted in the order shown in FIG. 13, "zero" components tend to be concentrated in the latter half. For this reason, if the divisions of blocks can be identified upon encoding/decoding, encoding of continuous "zero" components in the latter half can be omitted. Thus, encoded data for one block may include only block division information or only DC components and block division information in some cases.

Frequency component data scan-converted by the scan converter 101 are subjected to entropy encoding (e.g., Huffman encoding) for converting data into variable length codes according to the probability of appearance of each value by the entropy encoder 102. Code data and a code amount generated upon entropy encoding are respectively supplied to the packing processor 405 and the code amount counter 103.

The packing processor 405 packs code data generated in units of several bits into information in units of bytes or words, and outputs the packed information to the terminal 406 as compressed data. On the other hand, the code amount counter 103 is cleared to zero prior to encoding of an image, sequentially adds the code amount received from the entropy encoder 102, and outputs the result.

An output value 121 from the code amount counter is a total sum, at the corresponding timing, of actually generated code amounts upon encoding of an image, and will be referred to as a generated code amount hereinafter. The generated code amount 121 is large or small depending on the nature of an image to be encoded, and preferably assumes a value near the reference code amount 120. When the generated code amount 121 is considerably larger than the reference code amount 120, the memory unit 503 is full of data before encoding of all image data is completed, and all the image data cannot be stored.

When the generated code amount 121 is considerably smaller than the reference code amount 120, this means that the memory unit 503 is not efficiently used in spite of the fact that image deterioration can be suppressed using a lower compression ratio. Thus, in the fifth embodiment, the subtracter 106 subtracts the reference code amount 120 from the generated code amount 121 to obtain a difference 123, and control is made to decrease the absolute value of the difference 123.

More specifically, the quantization table switching controller 107 compares the difference 123 with a plurality of threshold values, and outputs a selection signal 124 for selecting one of the plurality of quantization tables to the quantization table memory 108 in accordance with the comparison results. The quantization table memory 108 has the plurality of quantization tables having different compression ratios, selects one of the plurality of quantization tables according to the selection signal 124, and outputs a quantization step signal 125 corresponding to frequency components to be quantized by the quantizer 404 to the quantizer 404.

In order to decrease the absolute value of the difference 123, when the difference 123 becomes large, a quantization table having a high compression ratio (the generated code amount is small) can be selected; when the difference 123 becomes small (large in the "−" direction), a quantization table having a low compression ratio can be selected.

As described above, in the fifth embodiment, after the reference code amount 120 is subtracted from the generated code amount 121 by the subtracter 106 to obtain the difference 123, the quantization table is selected according to the difference 123. Alternatively, a means having functions of both the subtracter 106 and the quantization table switching controller 107 may be prepared as a look-up table comprising, e.g., a RAM or ROM, and the look-up table may output the quantization table selection signal 124 in accordance with the generated code amount 121 and the reference code amount 120 input thereto.

In this manner, when the compression ratio is controlled on the basis of a code amount generated by encoding processing (generated code amount) and a code amount serving as a reference (reference code amount), the memory unit can be efficiently utilized. Therefore, the capacity of the memory unit can be reduced as compared to the prior art, and a low-cost image encoding apparatus and a low-cost image output apparatus including the image encoding apparatus can be realized.

From another point of view, efficient utilization of the memory unit allows to store an image having almost the best reproducible image quality by a limited memory capacity, and this leads to high performance of the apparatus.

As described above, according to the fifth embodiment, since the compression ratio is controlled on the basis of the generated code amount obtained by counting code amounts generated by encoding processing, and the reference code amount obtained from a reference code amount generation means, the memory unit can be efficiently utilized even when image information is unbalanced. For this reason, the memory capacity can be decreased by several tens of %, and the cost of the memory unit can be greatly reduced.

Particularly, the above-mentioned encoding apparatus is suitable for an image output apparatus having a memory for storing a compressed image, and can contribute to a decrease in cost of the image output apparatus.

Sixth Embodiment

Figure 14:
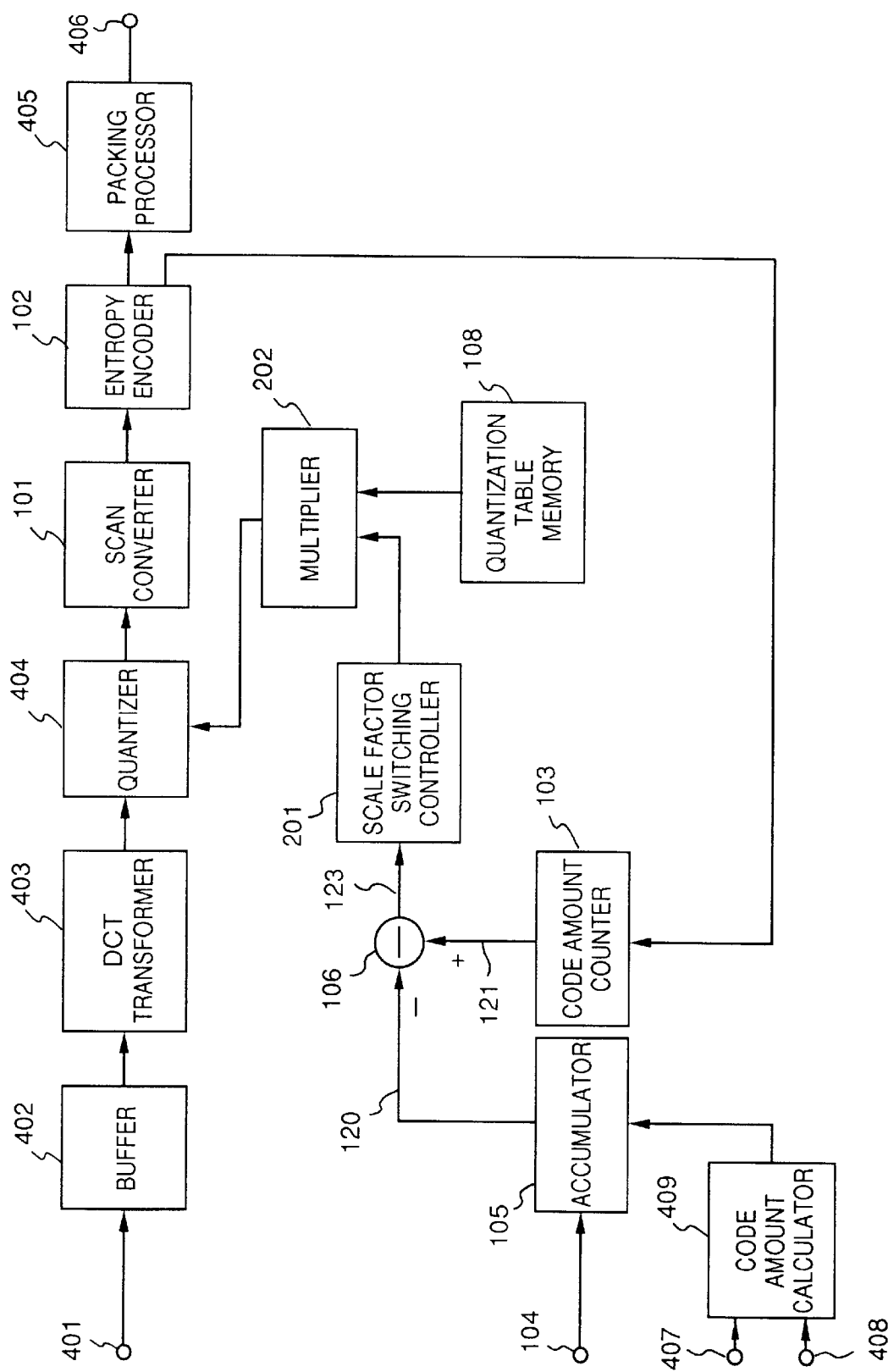
FIG. 14 is a block diagram showing an arrangement of an image encoding apparatus according to the sixth embodiment of the present invention.

FIG. 14 is a block diagram showing an arrangement of an image encoding apparatus according to the sixth embodiment of the present invention. The same reference numerals in FIG. 14 denote the same parts as in FIG. 12 in the fifth embodiment described above. As compared to the fifth embodiment, the sixth embodiment corresponds to a case wherein an image for one page, which can be output at one time from an image output apparatus, consists of a plurality of small images having different natures.

Assume that small images are encoded in turn one by one. This embodiment comprises a scale factor switching controller 201 for controlling a quantization step width in place of the quantization table switching controller 107 in the fifth embodiment, and also uses a multiplier 202 for multiplying a scale value output from the scale factor switching controller 201 with a value output from the quantization table memory 108.

The terminals 407 and 408 respectively receive attribute information (including image size information) of a plurality of images and identification information of the plurality of images in place of the horizontal size information and the vertical size information of an image in the fifth embodiment.

As described above, even a single image suffers from unbalance of information depending on areas. Also, images having different natures, e.g., an image generated by, e.g., a computer graphics program and an image read by, e.g., a scanner have a large difference between their high-frequency components. Therefore, when these images are encoded by assigning the same code amount thereto, a high-quality image having many high-frequency components considerably deteriorates. In this case, when the code amounts to be assigned are weighted on the basis of input sources of the images and parameters such as autocorrelations, the deterioration levels of the compressed images can be balanced.

Thus, in the sixth embodiment, prior to image encoding, attribute information of each of the plurality of images is input from the input terminal 407, and the code amount calculator 409 calculates a code amount to be assigned to a predetermined image data amount in units of images. For example, if two images A and B respectively have data amounts of Da and Db blocks, the weighting coefficients on code amounts to be assigned are respectively represented by Wa and Wb, and the capacity of the memory unit is M bits, a code amount per block to be assigned to the image A is Wa•M/(Wa•Da+Wb•Db) bits, and a code amount per block to be assigned to the image B is Wb•M/(Wa•Da+Wb•Db) bits.

Thus, F=M/(Wa•Da+Wb•Db) as a common term of the two equations is calculated in advance. When the image A is to be encoded, Wa•F is output from the code amount calculator 409; when the image B is to be encoded, Wb•F is output from the calculator 409. In order to detect which image A or B is being encoded, the above-mentioned interface unit 501 can manage transfer of image data to recognize which image is being transferred, and can input recognition information to the terminal 408.

The code amount calculator 409 outputs a code amount to be assigned corresponding to each image on the basis of the input information. In practice, since the image data transfer timing and the encoding time have a small time shift therebetween, the time shift need be absorbed by the interface unit 501 or the code amount calculator 409.

Assume that the image A is transferred and encoded first. The code amount counter 103 and the accumulator 105 are cleared to an initial value "0" by a reset signal (not shown). When transfer and encoding of the image A are started, the code amount calculator 409 outputs Wa•F, i.e., a code amount to be assigned, to the accumulator 105. Every time one block is encoded, a pulse is input from the terminal 104, and the accumulator 105 accumulates and adds the value Wa•F.

On the other hand, image data is divided into blocks by the buffer 402 as in the fifth embodiment, and is encoded by the entropy encoder 102 via the DCT transformer 403, the quantizer 404, and the scan converter 101. The code amount encoded by the entropy encoder 102 is counted by the code amount counter 103.

In the sixth embodiment, the quantization step used in the quantizer 404 is generated by multiplying the output from the quantization table memory 108 with the scale value output from the scale factor switching controller 201 by the multiplier 202 unlike in the fifth embodiment.

Therefore, immediately after the beginning of encoding, since the two inputs of the subtracter 106 are zero, its output is also zero. For this reason, a value "zero" is input to the scale factor switching controller 201, and the scale value corresponding to the input value is supplied to the multiplier 202. As encoding progresses, the reference code amount 120 output from the accumulator 105 and the generated code amount 121 output from the code amount counter 103 have a difference therebetween, and the difference 123 appears as the output from the subtracter 106.

In this embodiment as well, the scale factor is controlled to decrease the absolute value of the difference 123 like in the fifth embodiment. More specifically, when the difference 123 becomes large, the scale value is increased to select a coarse quantization step, thereby decreasing the generated code amount. Conversely, when the difference 123 becomes small, the scale value is decreased to select a fine quantization step, thereby increasing the generated code amount.

The image A is encoded by the above-mentioned operation content, and upon completion of encoding of the image A, the image B is then transferred and encoded. Prior to encoding of the image B, the code amount counter 103 and the accumulator 105 are cleared to "0" by a reset signal (not shown). In addition, the code amount calculator 409 calculates a code amount Wb•F to be assigned, and outputs this amount to the accumulator 105. Thereafter, encoding of the image B is performed in the same manner as encoding of the image A.

In this manner, according to the sixth embodiment, even when a plurality of images are encoded, the compression ratio is controlled based on the generated code amount and the reference code amount so as to efficiently utilize the memory unit. Therefore, the capacity of the memory unit can be decreased as compared to the prior art.

In the sixth embodiment, the quantization is changed by controlling the scale factor. However, the present invention is not limited to the above embodiment. For example, a method of switching quantization tables like in the fifth embodiment, or any other methods may be adopted.

In the above description, when encoding of the image A is completed, and encoding of the image B is started, the code amount counter 103 and the accumulator 105 are cleared to "0". However, this clearing operation may be omitted. If this clearing operation is omitted, when the generated code amount is smaller than the reference code amount upon completion of encoding of the image A, a memory capacity corresponding to the difference can be efficiently used for encoding of the image B. However, when the generated code amount is larger than the reference code amount, a memory capacity that can be used upon encoding of the image B is decreased accordingly.

Seventh Embodiment

Figure 15:
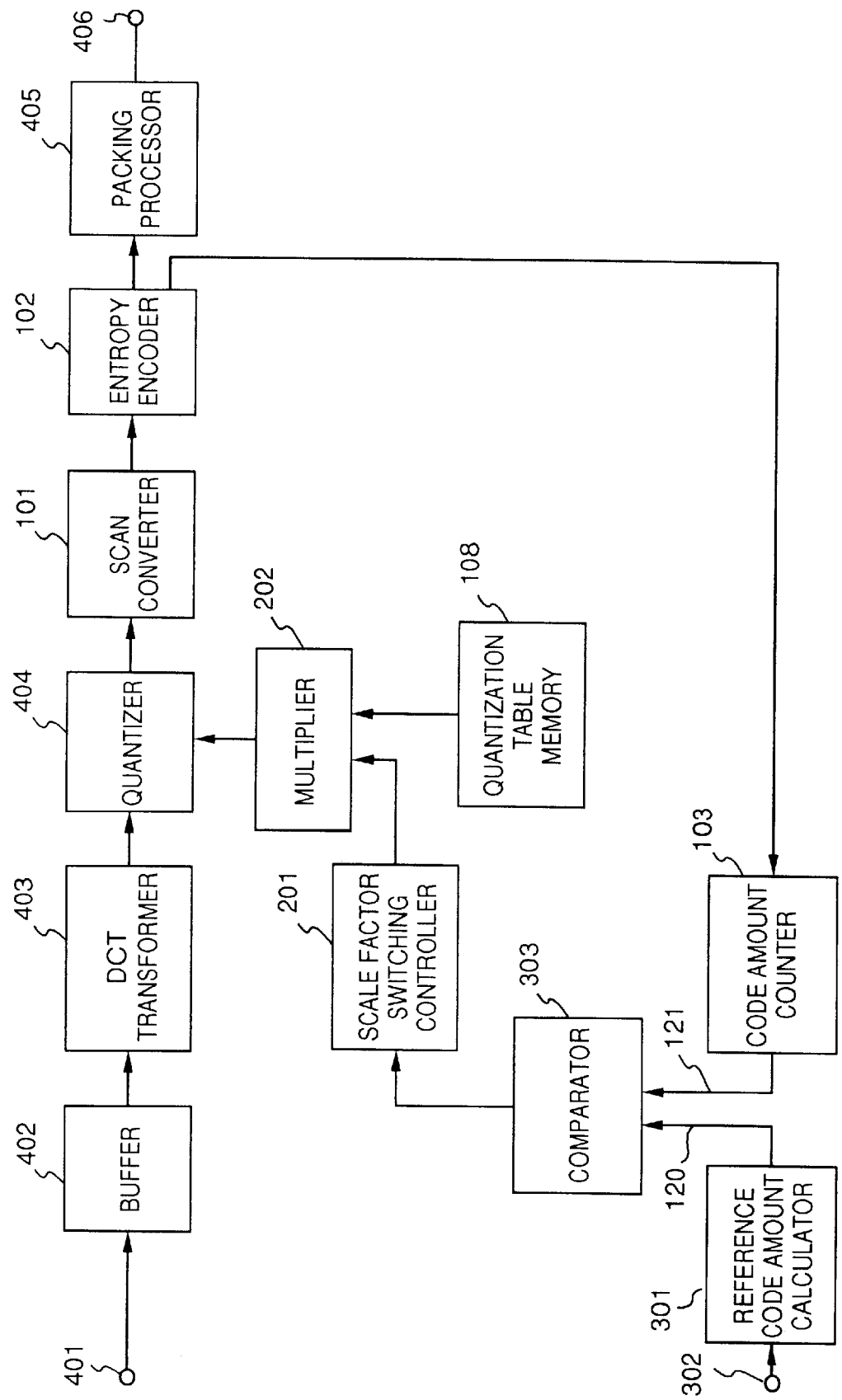
FIG. 15 is a block diagram showing an arrangement of an image encoding apparatus according to the seventh embodiment of the present invention.

FIG. 15 is a block diagram of an image encoding apparatus according to the seventh embodiment of the present invention. The same reference numerals in FIG. 15 denote the same parts as in FIGS. 12 and 14, and a detailed description thereof will be omitted. Differences from the above embodiments will be mainly described below.

In the seventh embodiment, the compression ratio is controlled, so that a generated code amount for a predetermined image data amount always falls within a reference code amount range (in the following description, the predetermined data amount is K blocks).

When a code amount generated upon encoding of K blocks of image data under a certain quantization condition exceeds the reference code amount, the quantization condition is changed in a direction to decrease the generated code amount, and the K blocks of image data are encoded again.

When the generated code amount after second encoding is equal to or smaller than the reference code amount, encoding of the K blocks of image data is completed, and encoding of next K blocks of image data is performed. However, when the generated code amount after second encoding is not equal to or smaller than the reference code amount, the quantization condition is further changed to perform third encoding. Thereafter, encoding is repetitively performed while changing the quantization condition until the generated code amount becomes equal to or smaller than the reference code amount.

When the above-mentioned processing is performed in the seventh embodiment, the reference code amount need not be specially generated using the code amount calculator 409 and the accumulator 105 unlike in the fifth and sixth embodiments described above, but can be calculated based on the capacity of the memory unit, the total data amount of an image to be encoded, and the value K of the K blocks.

In the seventh embodiment shown in FIG. 15, a reference code amount calculator 301 calculates and outputs a reference code amount (a signal on the signal line 120 corresponds to a reference code amount). Information necessary for calculating the reference code amount is input from a terminal 302.

The seventh embodiment does not require a difference between the reference code amount and the generated code amount, but need only detect the relationship between the two values. For this purpose, a comparator 303 discriminates the relationship. Other constituting units are basically the same as those in the sixth embodiment. Although some blocks require slightly different control methods, they will be described as needed in the following description of the operation.

The operation of the seventh embodiment with the arrangement shown in FIG. 15 will be described below.

First, information necessary for calculating a reference code amount for K blocks, such as the total data amount of an image to be encoded, and the like, is input to the reference code amount calculator 301 via the terminal 302. The reference code amount calculator 301 calculates a reference code amount, and outputs the calculation result on the signal line 120. On the other hand, image data is divided into blocks by the buffer 402 as in the fifth and sixth embodiments, and is encoded by the entropy encoder 102 via the DCT transformer 403, the quantizer 404, and the scan converter 101.

A code amount encoded by the entropy encoder 102 is counted by the code amount counter 103. The code amount 103 is cleared to an initial value "0" prior to the encoding processing. At this time, the scale factor switching controller 201 is also reset to an initial state, and outputs a scale value corresponding to the initial state. The multiplier 202 multiplies the output from the quantization table memory 108 with the output scale value, and supplies the product to the quantizer 404.

Upon completion of encoding the K blocks of image data, the generated code amount 121 output from the code amount counter 103 is compared with the reference code amount 120 by the comparator 303 to determine a larger one. If the generated reference amount 121 is equal to or smaller than the reference code amount 120, encoding of the K blocks of image data is completed, and encoding of next K blocks of image data is started.

Conversely, when the generated code amount 121 is larger than the reference code amount 120, information indicating this is supplied to the scale factor switching controller 201, and the K blocks of image data are read out from the buffer 402 again to perform encoding.

The buffer 402 must be controlled to hold image data for a while so as to allow repetitive read-out operations of the same image data. The scale factor switching controller 201 outputs a scale value larger than the previously output scale value on the basis of the received information, thereby decreasing the generated code amount to be smaller than the previous value.

In this manner, the K blocks of image data are encoded again, and the generated encoded data are stored in the memory unit 503 via the packing processor 405. The seventh embodiment requires different control from that in the fifth and sixth embodiments in this storage operation. More specifically, when identical image data is encoded several times, and generated encoded data is sequentially stored in the memory unit 503, unnecessary data is stored in the memory unit 503, and the memory unit undesirably becomes full of data.

Thus, when identical image data is encoded a plurality of number of times, control must be made to overwrite the second and subsequent encoded data on the first encoded data so as not to leave unnecessary data. In the seventh embodiment, when the encoded and stored data amount (generated code amount) is larger than the reference code amount, the scale value is increased again to perform re-encoding, and such operations are repeated until the generated code amount becomes equal to or smaller than the reference code amount.

In the seventh embodiment, the value K of the K blocks is an arbitrary value. However, when K=1, the same problem as in the prior art is posed. Therefore, in order to solve this problem, K>1 must be satisfied.

Eighth Embodiment

Figure 16:
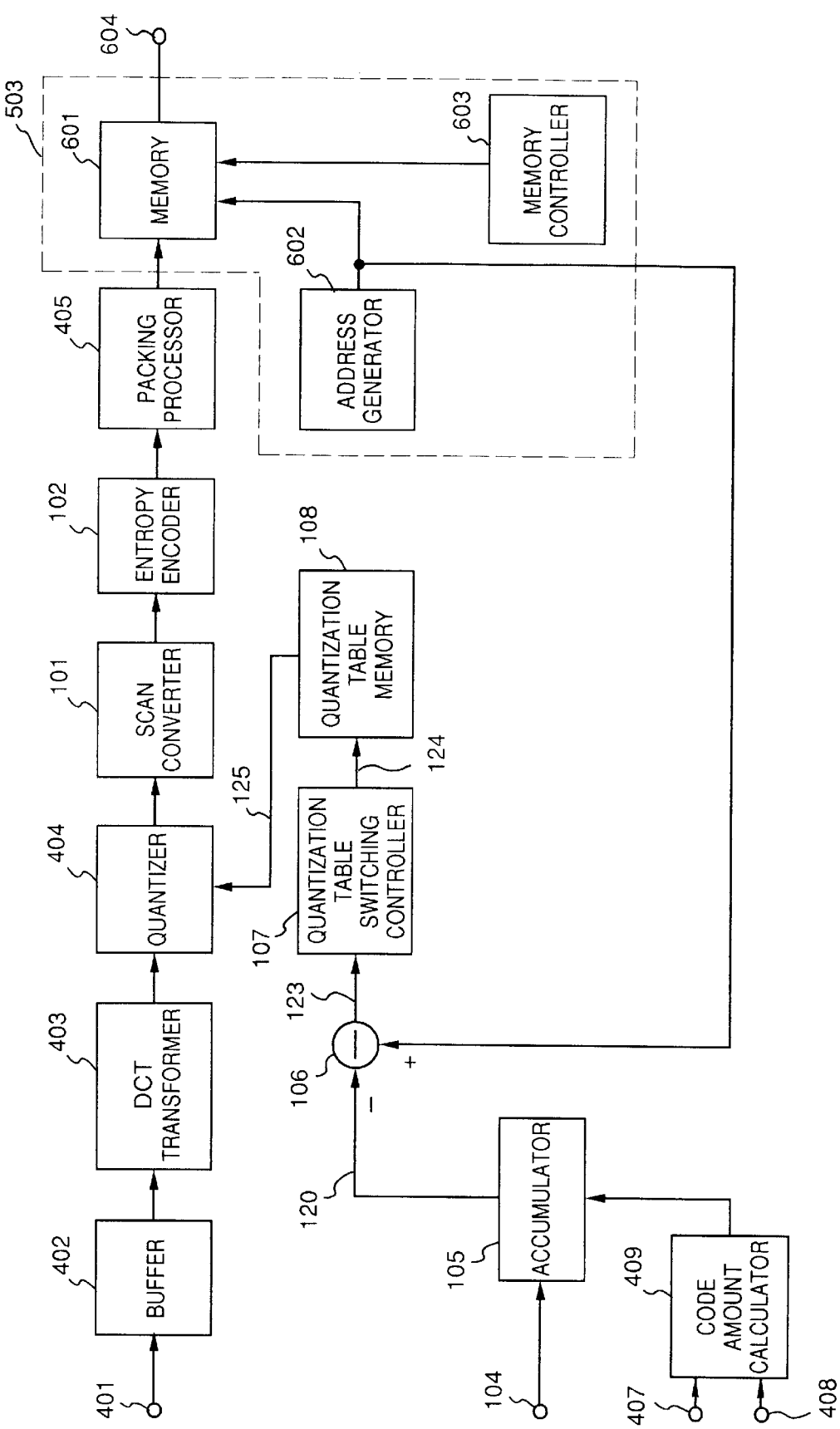
FIG. 16 is a block diagram showing an arrangement of an image encoding apparatus according to the eighth embodiment of the present invention.

FIG. 16 is a block diagram showing an image encoding apparatus according to the eighth embodiment of the present invention. In the eighth embodiment, an address generator 602 as one unit constituting the memory unit 503 is used as code amount counting means.

In the fifth to seventh embodiments described above, the code amount counting means has been described using the block diagram of the encoding processor alone including no memory unit. In this embodiment, however, the code amount counting means will be described below with reference to the block diagram including the memory unit 503.

The memory unit 503 corresponds to a region surrounded by a broken line in FIG. 16, and is constituted by a memory 601 for storing encoded data, an address generator 602 for supplying an address signal to the memory 601, and a memory controller 603 for controlling the address generator 602 and generating a control signal for the memory 601.

Figure 17:
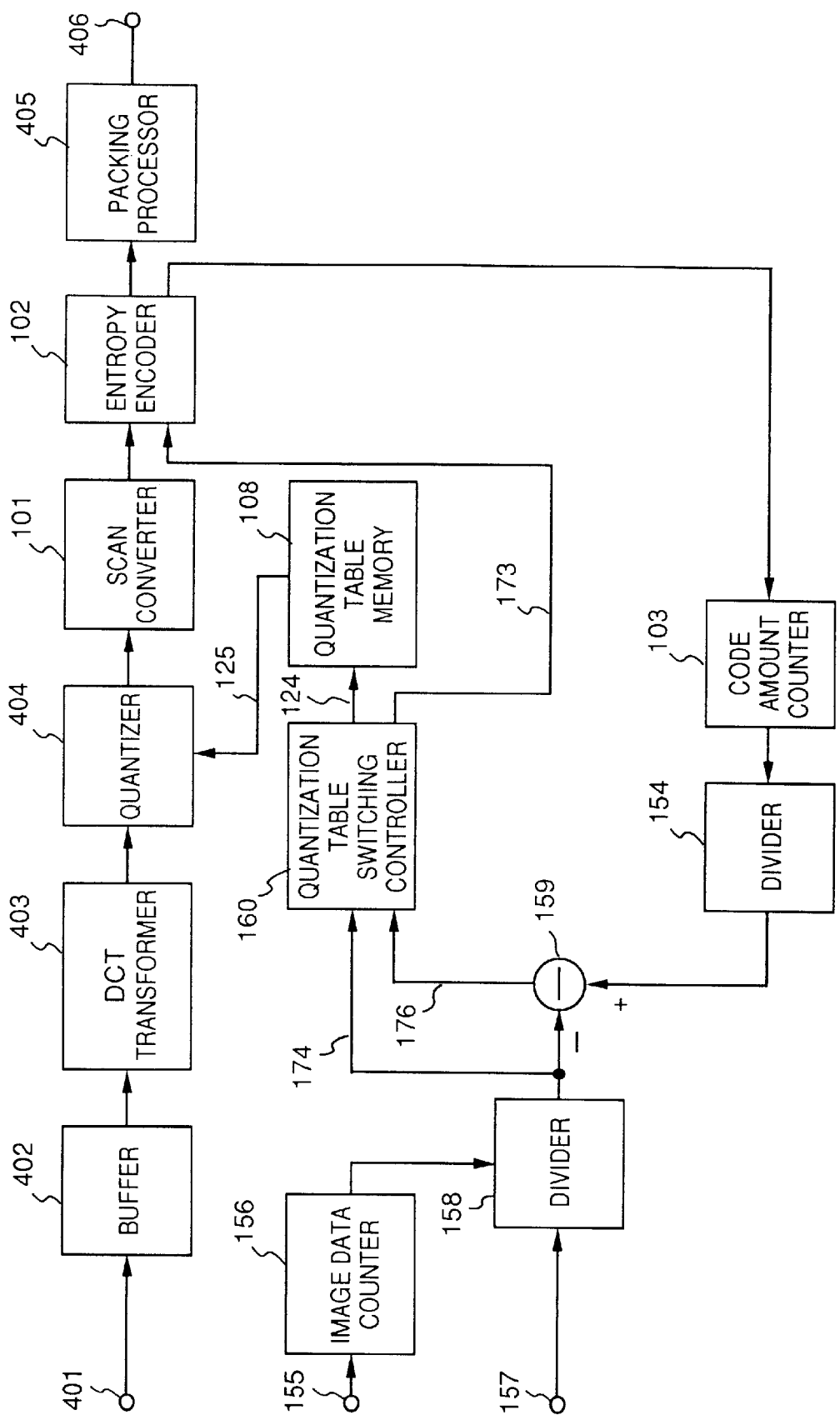
FIG. 17 is a block diagram showing an arrangement of an image encoding apparatus according to the ninth embodiment of the present invention.

A terminal 604 is used for outputting encoded data read out from the memory 601 when data is expanded. As has been described above, since the address generator is used as the code amount counting means, the eighth embodiment does not require the code amount counter 103 for exclusively counting only a code amount, as shown in FIGS. 12, 14, and 17. Since other constituting units are the same as those in the fifth embodiment shown in FIG. 12, the same reference numerals in FIG. 16 denote the same parts as in FIG. 12, and a detailed description thereof will be omitted. Also, since the operation content of the entire encoding apparatus is the same as the first embodiment, a detailed description thereof will be omitted, and the address generator 602 will be described in detail below.

The address generator 602 can be used as the code amount counting means as in the eighth embodiment since address information output from the address generator 602 can represent the use amount of the memory, i.e., the generation amount of encoded data. In practice, address information can represent the generation amount of encoded data under the condition that the address value starts from zero, and is incremented in unitary increments. The eighth embodiment is also premised on this operation.

In this embodiment, the generation order of the address value is not limited to the above-mentioned order, and various generation orders may be used. For example, the address value may be generated in an order from a larger value. In this case, since the inverted value of the address value represents the generation amount of encoded data, it can be used as the output from the code amount counting means. When addresses 0 to L−1 of the memory are assigned as an area for storing another information, and encoded data is stored in turn from an address L, a value obtained by subtracting L from the address value can be used as the output of the code amount counting means.

As described above, according to each of the above embodiments, since the compression ratio is controlled on the basis of the generated code amount obtained by counting code amounts generated by encoding processing, and the reference code amount obtained from the reference code amount generation means, the memory unit can be efficiently utilized even when image information is unbalanced. For this reason, the memory capacity can be decreased by several tens of %, and the cost of the memory unit can be greatly reduced.

The above-mentioned image encoding apparatus is suitable for an image output apparatus having a memory for storing compressed image, and can contribute to a decrease in cost of the image output apparatus.

Ninth Embodiment

FIG. 17 is a block diagram showing an image encoding apparatus according to the ninth embodiment of the present invention. The same reference numerals in FIG. 17 denote the same parts as in the above-mentioned fifth to eighth embodiments shown in FIGS. 12 to 16, and a detailed description thereof will be omitted.

The apparatus of the ninth embodiment comprises, as unique units, a first divider 154 for dividing the generated code amount counted by the code amount counter 103 with the capacity of the memory unit, a pulse input terminal 155 for receiving a pulse in correspondence with each pixel or each block of image data to be encoded, an image data counter 156 for counting an amount of image data as an encoding object by counting the pulses from the input terminal 155, an input terminal 157 for receiving the data amount of the entire image to be encoded, a second divider 158 for diving the output from the image data counter 156 with the total image data amount, a subtracter 159 for subtracting the output from the second divider 158 from the output from the first divider 154, and a quantization table switching controller 160 for controlling switching of a plurality of quantization tables on the basis of the output result from the subtracter 159.

In the ninth embodiment as well, the overall arrangement of an image output apparatus can be the same as those in the fifth to seventh embodiments described above. The operation of the ninth embodiment with the above-mentioned arrangement will be described below.

Data supplied from an external apparatus (not shown) such as a computer is classified into header information of an image and actual image data by the interface unit 501 as in the above embodiments. Image size information in the header information is converted into a numerical value representing the total image data amount, and the converted value is input to the input terminal 157. The image data is input to the input terminal 401.

The image data input to the input terminal 401 is encoded by the entropy encoder 102 via the DCT transformer 403, the quantizer 404, and the scan converter 101 as in the above embodiments. The encoded data in units of bits are packed into data in units of bytes or words by the packing processor, and the packed data is supplied to and stored in the memory unit 503 via the terminal 406.

At this time, every time image data is read out from the buffer 402, a pulse is input to the input terminal 155, and is supplied to the image data counter 156. Prior to encoding of image data, the image data counter 156 is cleared to zero by a reset signal (not shown), and counts the pulses input thereafter. The count value is supplied to the second divider 158, and is divided with the image size information input from the input terminal 157.

As a result, the second divider 158 outputs the ratio of the encoded image data amount (including image data which is being encoded) to the total image data amount.

As described above, the code amount counter 103 is cleared to zero prior to encoding of an image, sequentially adds code amounts received from the entropy encoder 102, and outputs the result. In the ninth embodiment, the output value from the code amount counter 103 is divided by the capacity of the memory unit 503 for storing encoded data to obtain the use ratio of the memory unit, and outputs the use ratio.

The use ratio of the memory unit output from the first divider 154 preferably assumes a value close to the ratio of the encoded image data amount output from the second divider 158 (the former ratio will be referred to as a first ratio hereinafter, and the latter ratio will be referred to as a second ratio hereinafter)

More specifically, when the first ratio is considerably larger than the second ratio, the memory unit 503 becomes full of data before encoding of all image data is completed, and all the image data cannot be stored.

When the first ratio is considerably smaller than the second ratio, this means that the memory unit 503 is not efficiently used in spite of the fact that image deterioration can be suppressed using a lower compression ratio. In order to solve this problem, in the ninth embodiment, the subtracter 159 subtracts the second ratio from the first ratio to obtain a difference 170, and control is made to decrease the absolute value of the difference 170.

For this purpose, the quantization table switching controller 160 receives the difference 170, compares it with a plurality of threshold values, and outputs a selection signal 124 for selecting one of the plurality of quantization tables according to the comparison result to the quantization table memory 108. The following operation is the same as that in the above embodiment.

As in the above embodiment, a quantization table used in decoding must be the same as that used in encoding. Therefore, when the quantization table is switched in encoding, the quantization need be switched in decoding at the same timing.

For this purpose, when the quantization table switching controller 160 switches the quantization table, the switching information is supplied to and encoded by the entropy encoder 120 via a signal line 173, and the encoded information is stored in the memory unit together with compression-encoded image data.

When all image data are compression-encoded by the above-mentioned control method, the second ratio (the ratio of encoded image data) output from the second divider 158 finally assumes a value "1". In contrast to this, the first ratio (the use ratio of the memory unit) output from the first divider 154 finally assumes a value near a value "1". The value near the value "1" means that the first ratio may exceed "1", and when the first ratio exceeds "1", this means that the memory unit is used up, and the capacity runs short.

Thus, in order to prevent the first ratio from finally exceeding "1", the control method of the quantization table switching controller 160 is changed, so that the difference output from the subtracter 159 becomes equal to or smaller than 0 in the latter half of encoding. For this purpose, since the quantization table switching controller 160 must detect the progress of encoding, the ratio of encoded image data from the second divider 158 is supplied to the quantization table switching controller 160 via a signal line 174.

As described above, according to the ninth embodiment, since the compression ratio is controlled on the basis of the ratio of the generated code amount to the capacity of the memory unit for storing encoded data and the ratio of encoded image data to the total image data amount, the memory unit can be efficiently used. Even when the capacity of the memory unit is decreased by several tens of %, the memory unit can satisfactorily operate, and cost of the memory unit can be greatly reduced.

10th Embodiment

Figure 18:
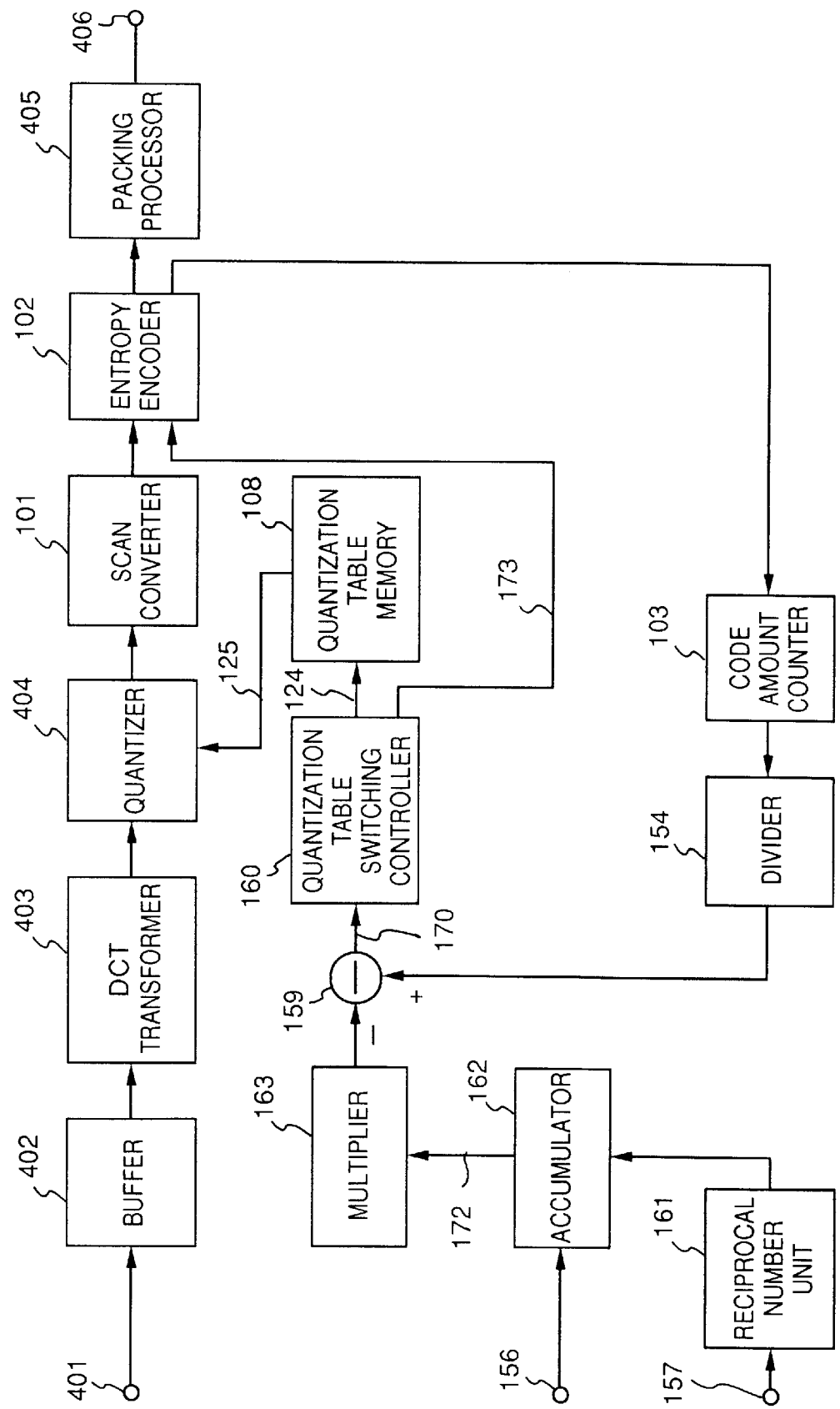
FIG. 18 is a block diagram showing an arrangement of an image encoding apparatus according to the 10th embodiment of the present invention.

FIG. 18 is a block diagram showing an arrangement of an image encoding apparatus according to the 10th embodiment of the present invention. In the 10th embodiment, the ratio of encoded image data to the total image data amount is obtained by a different arrangement from that of the ninth embodiment.

In the ninth embodiment, the signal line 174 is added to inform the ratio of encoded image data to the quantization table switching controller 160 so as to prevent the use ratio of the memory unit output from the divider 154 from finally exceeding "1". The 10th embodiment adopts an arrangement which can prevent the capacity of the memory unit from running short without using the signal line 174. Therefore, since the arrangement of the 10th embodiment is substantially the same as that of the ninth embodiment except that the signal line 174 is omitted, and a different method of calculating the ratio of the encoded image data amount to the total image data amount is used, the same reference numerals in the 10th embodiment denote the same parts as in the ninth embodiment, and a detailed description thereof will be omitted.

Constituting units unique to the 10th embodiment will be described below.

In FIG. 18, reference numeral 161 denotes a reciprocal number unit for calculating a reciprocal number of an image data amount input from the input terminal 157; 162, an accumulator, similar to the one in the fifth embodiment, for accumulating and adding an output value from the reciprocal number unit 161 every time a pulse is input from the input terminal 104; and 163, a multiplier for multiplying a value output from the accumulator 162 with a predetermined value.

The operation of the 10th embodiment with the above-mentioned arrangement will be described below.

Data supplied from an external apparatus (not shown) such as a computer is classified into header information of an image and image data by the interface unit 501, and the image data is encoded by the entropy encoder 102 via the DCT transformer 403, the quantizer 404, and the scan converter 101 as in the ninth embodiment. The encoded data in units of bits are packed into data in units of bytes or words by the packing processor 405, and the packed data is supplied to and stored in the memory unit 503 via the terminal 406. Code amounts generated by the encoder are counted by the code amount counter 103, and the count value is divided by the capacity of the memory unit by the divider 154, thus outputting a numerical value (memory unit use ratio) indicating the use state of the memory unit.

On the other hand, image size information included in the image header information is converted into a numerical value indicating the total data amount of an image, and the converted value is input to the input terminal 157. The numerical value input to the input terminal 157 is converted into a reciprocal number of he numerical value by the reciprocal number unit 161, thus obtaining the ratio of one pixel to the total image data. This numerical value is input to the accumulator 162, and is accumulated and added in response to a pulse (input from an input terminal 156) input in correspondence with each pixel of image data to be encoded.

The output value from the accumulator 162 represents the ratio of encoded image data to all image data, and assumes a value "1", of course, after all the image data are encoded. In the ninth embodiment, since the numerical value indicating the ratio of encoded data is directly input to the subtracter 159, control for preventing the output value (representing the use ratio of the memory unit) from the divider 154 from exceeding "1" is required.

However, in this embodiment, the multiplier 163 is arranged between the accumulator 162 and the subtracter 159, and the multiplier 163 multiplies the output from the accumulator 162 with a value α smaller than "1", thus preventing the output value from the divider 154 from exceeding "1".

As can be understood from the description of the operation of the ninth embodiment, if the final output from the multiplier 163 is α, the final output from the divider 154 assumes a value near α. Therefore, when a is set to cause a maximum value [near α] to be equal to or smaller than 1, the control method of the quantization table switching controller need not be changed in accordance with the ratio of encoded image data.

When image data is encoded based on the above-mentioned operation, compression effectively utilizing the memory unit can be realized, and all image data can be reliably encoded. In this embodiment, the multiplier 163 is arranged between the accumulator 162 and the subtracter 159, but may be arranged between the accumulator 162 and the reciprocal number unit 161.

In this case, since the reciprocal number calculator 161 and the multiplier 163 need only perform a calculation once per image, their calculation speeds can be low. Therefore, these calculations need not be performed by a special-purpose circuit, but may be performed using a CPU (not shown) used for another control. When the capacity of the memory unit is a power of 2, the divider 154 can be replaced with a simple bit shift circuit.

As described above, according to the embodiments of the present invention, in a printer having a memory for storing image information, since code amounts are sequentially controlled in accordance with information of an accumulated code amount and an accumulated code area, the code amounts can be controlled, so that variable-length codes of an image falls within a predetermined memory capacity in a single pass.

As a result, the transfer time of image information from a host computer can be shortened, and since variable-length codes are used, satisfactory compression processing suitable for unbalanced image information can be realized.

As a result, even a printer requiring a large capacity, especially, a color printer can be put on the market using a small memory.

A threshold value used for switching a quantization matrix is adaptively switched in accordance with an encoded information amount at the corresponding position of an image, and the quantization width of the entire image can be changed stepwise. In addition, a code amount after encoding can be fixed to be a target value.

Furthermore, since the compression ratio is controlled on the basis of a generated code amount obtained by counting code amounts generated by encoding processing, and a reference code amount obtained from reference code amount generation means, the memory unit can be efficiently utilized even when image information is unbalanced. For this reason, the memory capacity can be decreased by several tens of %, and the cost of the memory unit can be greatly reduced. The image encoding apparatus in each of the above embodiments is suitable for an image output apparatus having a memory for storing compressed image, and can contribute to a decrease in cost of the image output apparatus.

11th Embodiment

Figure 21:
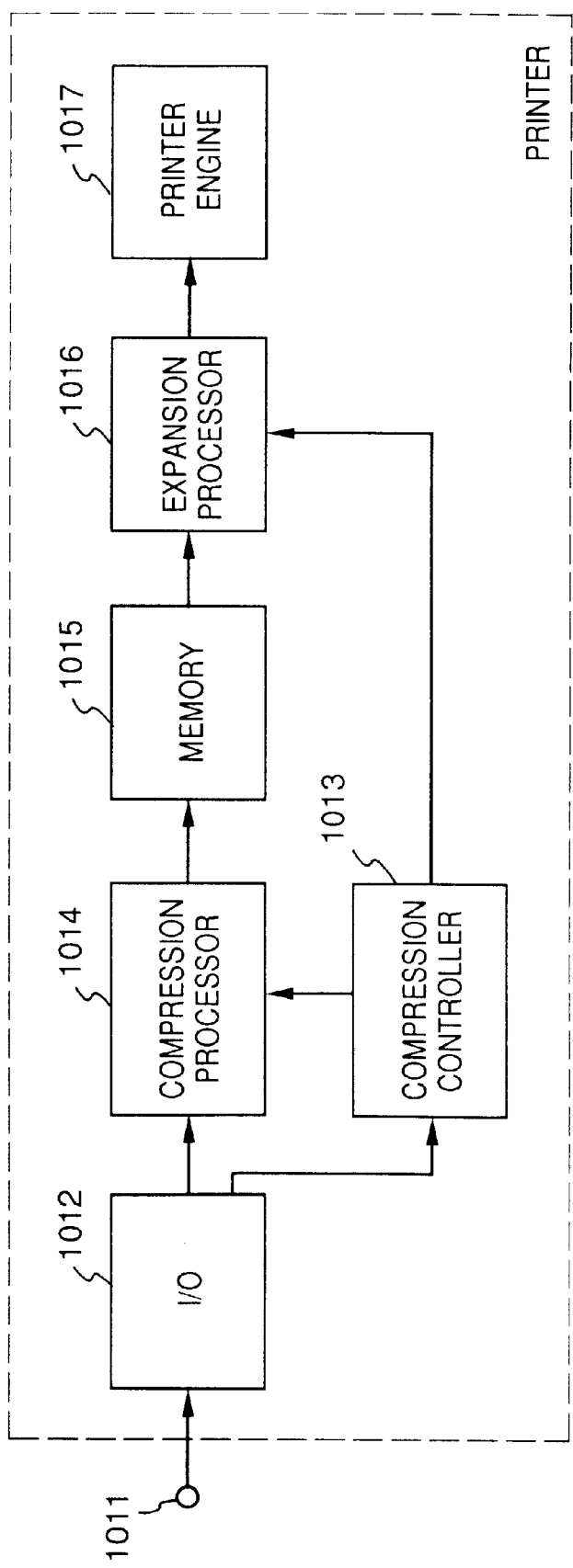
FIG. 21 is a block diagram showing an arrangement according to the 11th embodiment of the present invention.

FIG. 21 is a block diagram showing an arrangement of a printer according to the 11th embodiment of the present invention.

In FIG. 21, reference numeral 1011 denotes an input terminal as an information input source connected to the printer, and an information source connected to the input terminal 1011 includes a host computer, a formatter with an interpreter of a page description language, which has been put into practical applications in recent years, and the like.

Reference numeral 1012 denotes an I/O of the printer, which interfaces with the equipment connected to the input terminal 1011, and outputs information input from the connected equipment to a compression controller 1013 and a compression processor 1014. Reference numeral 1013 denotes a compression controller for receiving image size information from the I/O 1012, setting a target compression ratio, and controlling compression processing in the compression processor 1014.

Reference numeral 1014 denotes a compression processor for receiving image information from the I/O 1012, and encoding the image information while decreasing redundancy of an image. Reference numeral 1015 denotes a memory for storing codes from the compression processor 1014. In this embodiment, the memory 1015 has a memory capacity smaller than that for storing image information of a maximum output size of a printer engine 1017.

Reference numeral 1016 denotes an expansion processor for receiving factors (e.g., information of the target compression ratio, a code amount to be assigned to each block, and the like) used in control from the compression controller 1013, reading out information encoded by the compression processor 1014 from the memory 1015, and decoding the readout information according to the specification of the printer engine 1017 (in synchronism with the timing of the process speed of the engine).

In FIG. 21 described above, blocks surrounded by a broken line correspond to the printer of this embodiment.

An operation from reception of image information from the input terminal 1011 to storage of information in the memory 1015 in this embodiment with the above arrangement will be described below with reference to the flow chart of FIG. 23A.

Figure 23A:
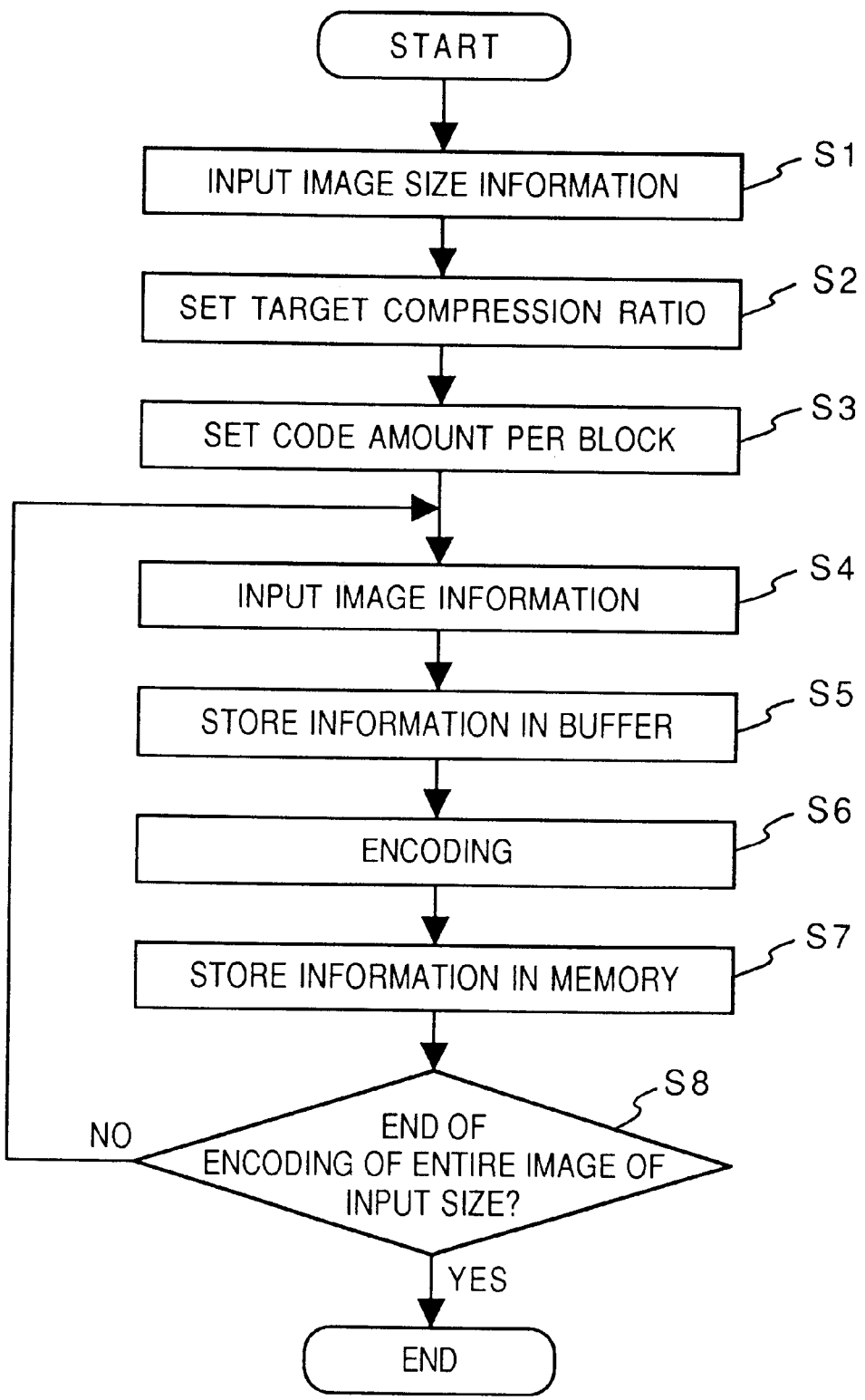

In FIG. 23A, step S1 is the step of inputting image size information, and means that the compression controller 1013 receives, from the I/O 1012, the image size information prior to image information to be output. At this time, the image size may be received from, e.g., a connected host computer in the format of <the number of horizontal pixels> and <the number of vertical pixels> when an image area has a rectangular shape, or may be received in the format of <the area of an image area> when an image area has a shape other than the rectangular shape. In any case, the image size information must be received as header information prior to image information.

The compression controller 1013 sets a target compression ratio in correspondence with the previously input image size information in step S2. The target compression ratio in this case is determined so that image information of the input image size is efficiently compressed to fill up the memory capacity of the memory 1015 of the printer.

Assume that the capacity corresponding to the maximum image size of the printer of this embodiment is represented by A, the capacity of the printer is represented by B, and the capacity corresponding to the input image size is represented by C. Since the above-mentioned prior art has a fixed compression ratio A/B, the use ratio of the memory varies depending on the image size. For this reason, in this embodiment, the target compression ratio is set to be C/B.

In step S3, a code amount per block is set. In this embodiment, an image is divided into blocks, and is compressed by utilizing, e.g., an orthogonal transform in each divided block. More specifically, if an image area is divided into, e.g., X blocks by block division processing (not shown) of an input image, each image block is fixed-length encoded to codes for each block (B/X). In this case, the value X is not fixed to the number of blocks corresponding to a maximum image size unlike in the prior art, but changes depending on the input image size. For this reason, the code amount for each block (B/X) also changes.

A quantization condition, e.g., the number of quantization assigning bits for the components of the orthogonal transform coefficients in each block, and the like, is selected according to the determined code amount per block, and this information is transmitted from the compression controller 1013 to the compression processor 1014 or the expansion processor 1016.

The flow then advances to step S4, and the compression processor 1014 receives a portion of image information. In step S5, the compression processor 1014 stores the received information in an internal buffer, and the flow advances to step S6. In step S6, encoding is executed according to the quantization condition set by the compression controller 1013, and in step S7, encoded code data is stored in the memory 1015. The flow then advances to step S8.

In step S8, it is checked if encoding of the entire image of the input size is completed. If NO in step S8, the flow returns to step S4, and the processing operations in steps S4 to S7 are repeated. In this manner, when the image information of the input size is stored in the internal memory of the printer, and encoding of the entire image of the input size is completed, the processing is ended.

As described above, input image information can be encoded and stored in the memory 1015 at the most efficient compression ratio in correspondence with the memory capacity.

When the stored encoded data is to be printed by the printer engine 1017 (expansion mode), the expansion processor 1016 reads out and decodes encoded data stored in the memory 1015 in synchronism with the process timing of the printer engine 1017 on the basis of the quantization condition information from the compression controller 1013, and supplies the decoded data to the printer engine 1017, thus outputting an image.

As described above, according to this embodiment, even when the printer has the small-capacity memory 1015, the compression ratio can be desirably changed depending on the image size, and the equipped memory 1015 can be maximally efficiently utilized.

As a result, since an image can be prevented from being compressed at an unnecessarily high compression ratio, deterioration of image quality can be avoided. In addition, a printer which is equipped with only a memory having a small memory capacity but requires a large memory capacity, e.g., a color printer, can be put into the market.

12th Embodiment

In the above embodiment, input image information is an image of a single specification in principle. However, the present invention is not limited to the above embodiment. The present invention also includes a case wherein a plurality of images are to be output from the printer engine 1017 for one page of an output sheet.

The 12th embodiment of the present invention, which is applied to a case wherein a plurality of images are to be output from a printer for one page of an output sheet, will be described below. The 12th embodiment has the same basic arrangement as that shown in FIG. 21 of the 11th embodiment, and has only a different processing sequence.

In the 12th embodiment, the present invention is applied to a case wherein a plurality of images are to be output from the printer engine 1017 for one page of an output sheet.

Figure 22:
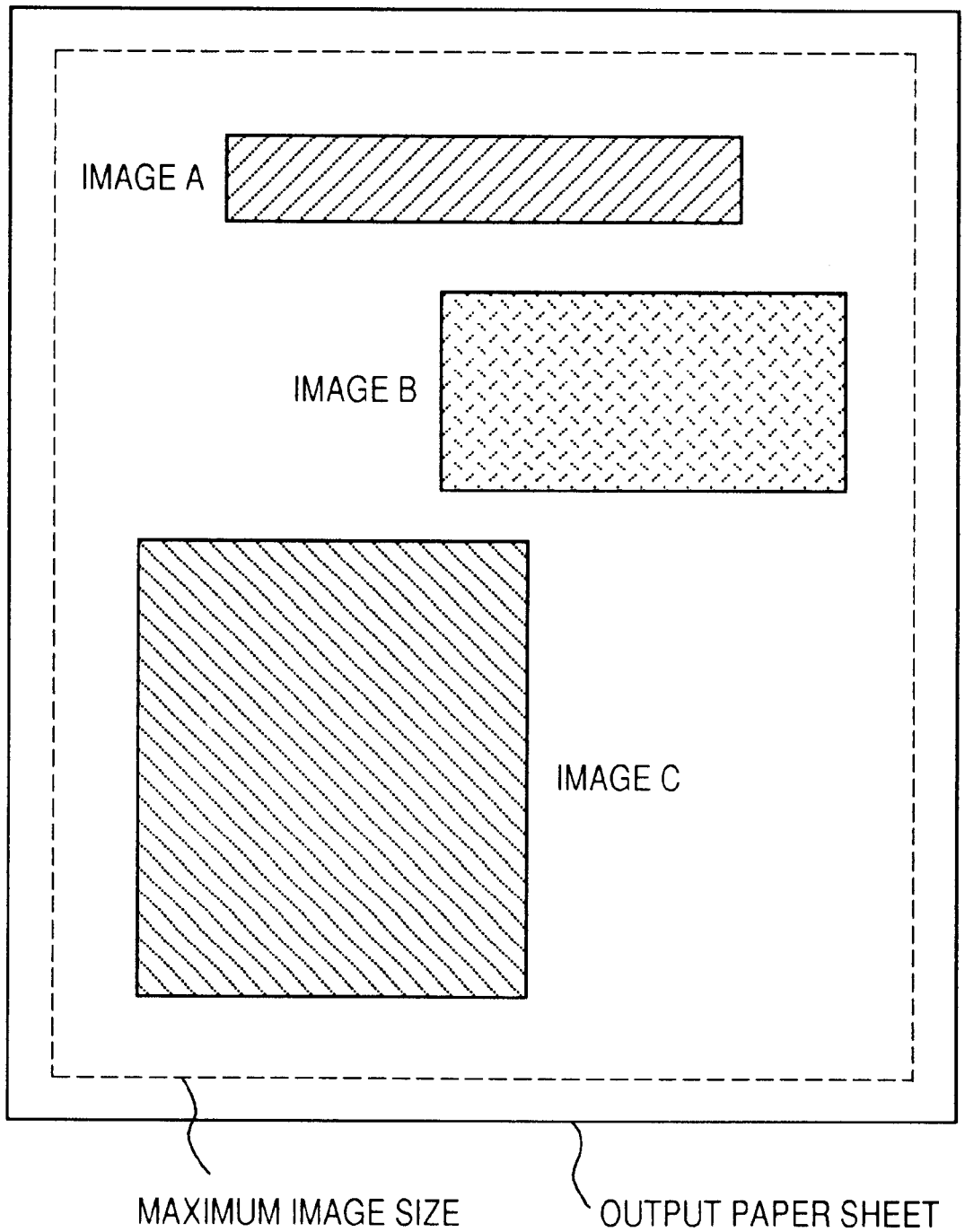
FIG. 22 is a view showing an example of an image layout to be used in the 12th embodiment of the present invention.

FIG. 22 shows an image layout for one page of an output sheet, which is input and processed in the 12th embodiment. In FIG. 22, a region indicated by a broken line is a maximum image size which can be output by the printer engine 1017. A region surrounding the maximum image size indicates the size of an output sheet.

In FIG. 22, three different types of image information of images A, B, and C are laid out at the illustrated positions by, e.g., a host computer within one page. When such images are to be output, the following encoding is performed in the 12th embodiment.

The encoding operation sequence of the 12th embodiment according to the present invention will be described below with reference to the flow chart shown in FIG. 23B.

The compression controller 1013 sequentially receives image size information of the images A, B, and C prior to their image information from, e.g., a connected host computer in steps S11 to S13 as in the above-mentioned 11th embodiment. Each size information can be received in the format of <the number of horizontal pixels> and <the number of vertical pixels>, as shown in, e.g., FIG. 41 described previously.

The flow advances to step S14, and the total size of all the input images is calculated. In this case, a size A+B+C is calculated. Since the three different images are input, the total number of blocks can be calculated on the basis of a total image area. For this reason, the total number of blocks is calculated in step S15.

After the total number of blocks is determined, encoding processing, memory storage processing, and the like are the same as those in step S2 and subsequent steps shown in FIG. 23A of the above-mentioned 11th embodiment. Thus, a detailed description of the following processing will be omitted.

More specifically, when the total size of input images is calculated regardless of the number of images before image information is input, an optimal encoding condition corresponding to the calculated size can be set.

In order to realize this embodiment, image layout information, e.g., the write start positions of the images A, B, and C, must be input, as a matter of course.

13th Embodiment

Figure 24:
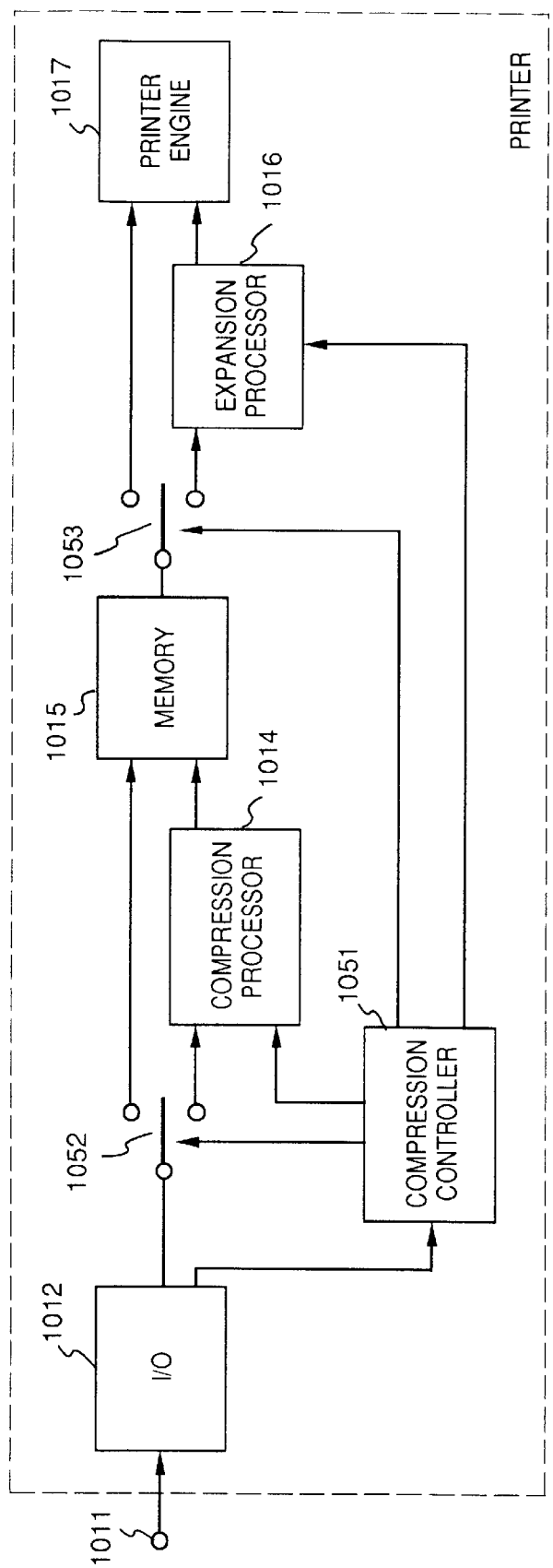
FIG. 24 is a block diagram showing an arrangement according to the 13th embodiment of the present invention.

FIG. 24 shows the 13th embodiment of the present invention. FIG. 24 is a block diagram showing an arrangement according to the 13th embodiment of the present invention. Since the 13th embodiment is an application of the 11th embodiment, the same reference numerals in FIG. 24 denote the same parts as in FIG. 21, and only a difference will be described below.

In FIG. 24, reference numeral 1051 denotes a compression controller, which controls a compression condition to achieve optimal compression for the memory capacity of the memory 1015 as in the embodiment shown in FIG. 21. Reference numerals 1052 and 1053 denote switching circuits (switches).

Information received by the compression controller 1051 of the 13th embodiment from the I/O 1012 is image size information, and in this embodiment, control is made not to perform compression processing under a certain condition.

Figure 25:
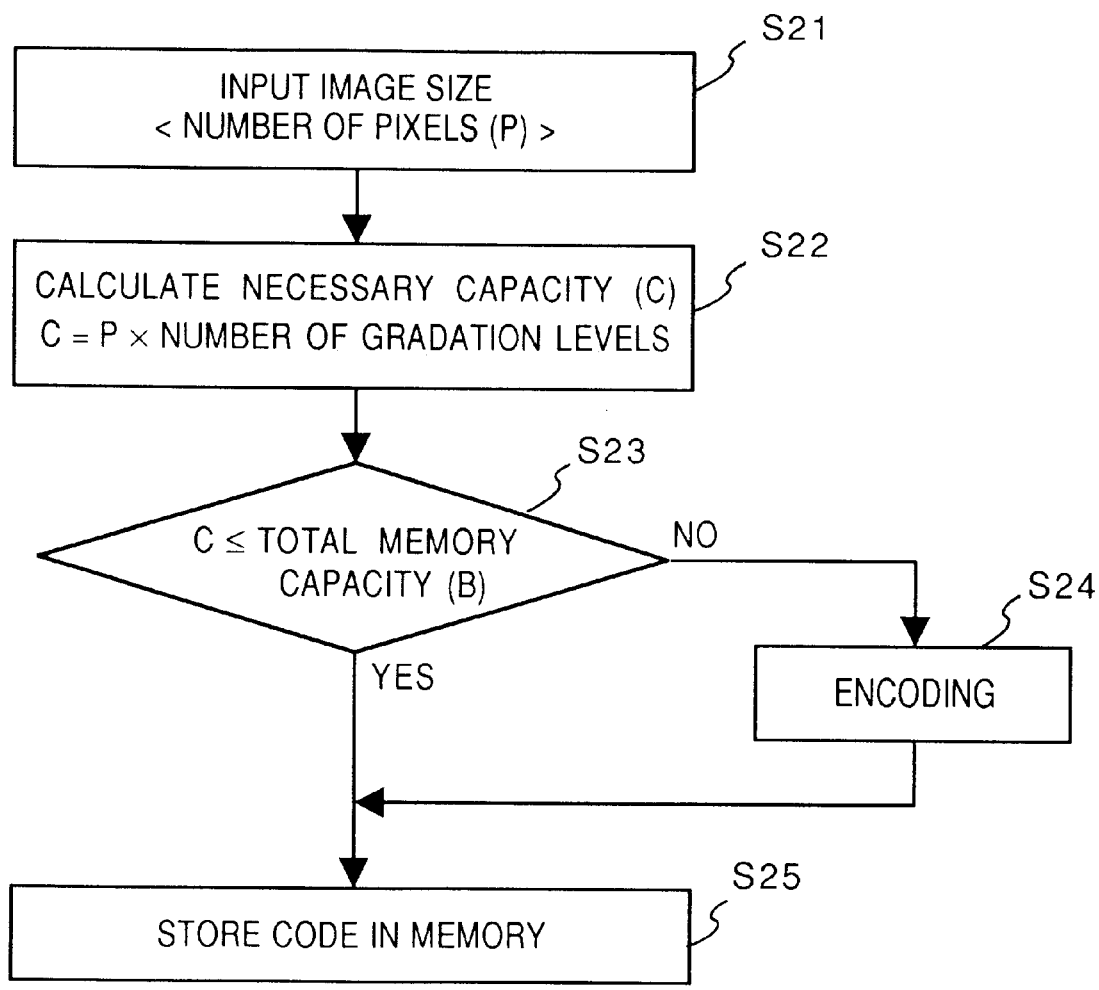
FIG. 25 is a flow chart for explaining a main operation sequence according to the 13th embodiment.

FIG. 25 is a flow chart showing a switching operation sequence of the switch 1052 in the 13th embodiment with the above arrangement.

The operation of the 13th embodiment according to the present invention will be described below with reference to the flow chart of FIG. 25.

The compression controller 1051 receives image size information in step S21. In the following description, for example, the number of pixels of the input image size is represented by P. In step S22, an information amount necessary for the input image size is calculated. For example, if the information amount is represented by C, and the number of gradation bits per pixel is represented by D, the information amount C is calculated as a product of P and D. In the case of a color printer, the number D of gradation bits includes input color space information. For example, when 8-bit information per color is received in a three-color space of R (red), G (green), and B (blue), the calculation is performed to have D=24 (bits). In this case, the information amount C coincides with a capacity required when no compression is performed.

Subsequently, in step S23, the information amount C is compared with the memory capacity (represented by B) of the memory 1015. If the capacity B is larger than the information amount C, the flow directly advances to step S25 without compression, and the information is stored in the memory 1015. Conversely, if the information amount C requires a larger capacity than the capacity B, the flow advances to step S24. In step S24, the information is encoded by the same compression processing as in the 11th embodiment, and the flow advances to step S25. In step S25, the encoded information is stored in the memory 1015.

More specifically, the judgment result in step S23 is transmitted to the switch 1052 to switch whether the information is stored in the memory 1015 via the compression processor 1014 or is directly stored in the memory 1015.

The switch 1053 performs the same operation as the switch 1052. When compressed information is stored in the memory 1015, it is decoded by the expansion processor 1016, and the decoded information is output to the printer engine 1017. When information is directly stored in the memory without any compression processing, it is directly read out from the memory 1015, and is output to the printer engine 1017.

In this manner, when the operation is switched according to image size information, the memory can be efficiently utilized.

14th Embodiment

Figure 26:
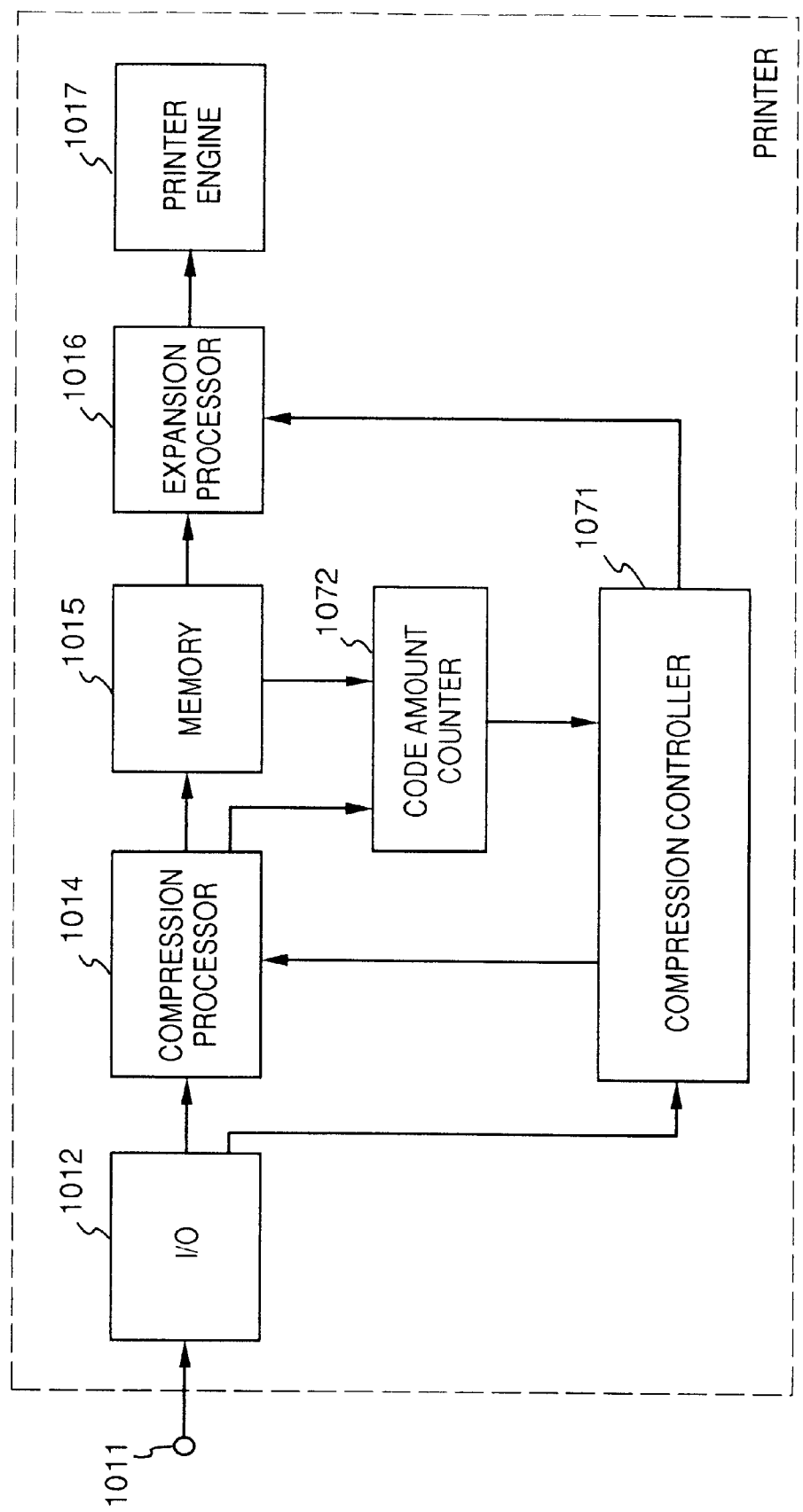
FIG. 26 is a block diagram showing an arrangement according to the 14th embodiment of the present invention.

FIG. 26 is block diagram showing main part of the 14th embodiment according to the present invention. In the 14th embodiment, the compression control method of the 11th embodiment is applied to variable-length encoding. The same reference numerals in FIG. 26 denote the same parts as in FIG. 21, and a detailed description thereof will be omitted.

In FIG. 26, reference numeral 1071 denotes a compression controller in the 14th embodiment, which receives image size information from the I/O 1012, and sets a target compression ratio as in the 11th embodiment. Compression processing is executed on the basis of the target compression ratio. In the 14th embodiment, an application to a compression method, in which divided image blocks are orthogonal-transformed, the transform coefficients are quantized, and the quantized coefficients are entropy-encoded using, e.g., Huffman codes, will be described below.

The compression controller 1071 sets a condition associated with compression on the basis of information of a target compression ratio and a code amount assigned per block. In this case, since divided blocks have unbalanced redundancies, when quantized coefficients are entropy-encoded, generated code amounts are not always constant. For this reason, as the characteristic feature of the 14th embodiment, a margin of a certain value or more is provided to a code amount assigned per block.

The compression processor 1014 receives information of the quantization condition selected based on the reference code amount per block from the compression controller 1071, quantizes orthogonal-transform coefficients, and then entropy-encodes the quantized coefficients. In this manner, codes encoded by the compression processor 1072 are sequentially stored in the memory 1015.

As described above, since each block is encoded by variable-length encoding, a code amount to be stored in the memory 1015 is not fixed. For this reason, in the 14th embodiment, a code amount counter 1072 is connected to the memory 1015 to detect the code amount stored in the memory 1015.

The code amount counter 1072 receives the current code amount information from the memory 1015, and also receives information of the ratio of the current area to the total image size from the compression processor 1014. The code amount counter 1072 receives these two kinds of information, and transmits them to the compression controller 1071. The compression controller 1071 predicts based on the two kinds of information supplied from the code amount counter 1072 whether or not image information can be stored in the memory 1015 if encoding is continued under the same condition. The controller 1071 finely changes the quantization condition, so that the memory 1015 is full of data upon completion of encoding.

The changed quantization condition is also transmitted to the compression processor 1014, and the compression processor 1014 compresses input image information according to the transmitted quantization condition.

In a block in which the quantization condition is switched, the switching information may be encoded, or a plurality of kinds of quantization tables may be held in advance, and index information of the selected table may be encoded.

In expansion processing, an expansion processor 1074 executes expansion processing on the basis of information associated with the quantization condition such as a quantization table transmitted from the compression controller 1071, and transmits expanded information to the printer engine 1017.

In this manner, even when a code amount is varied in units of blocks, since the total image size is transmitted in advance, so-called intra-image fixed-length processing can be executed within the memory capacity.

As described above, according to the 11th to 14th embodiments, in a printer equipped with a memory having a predetermined capacity, the compression ratio can be desirably changed according to the image size, and the equipped memory can be maximally efficiently utilized.

As a result, a printer which is equipped with only a memory having a small memory capacity but requires a large memory capacity, e.g., a color printer, can be put into the market.

15th Embodiment

Figure 27:
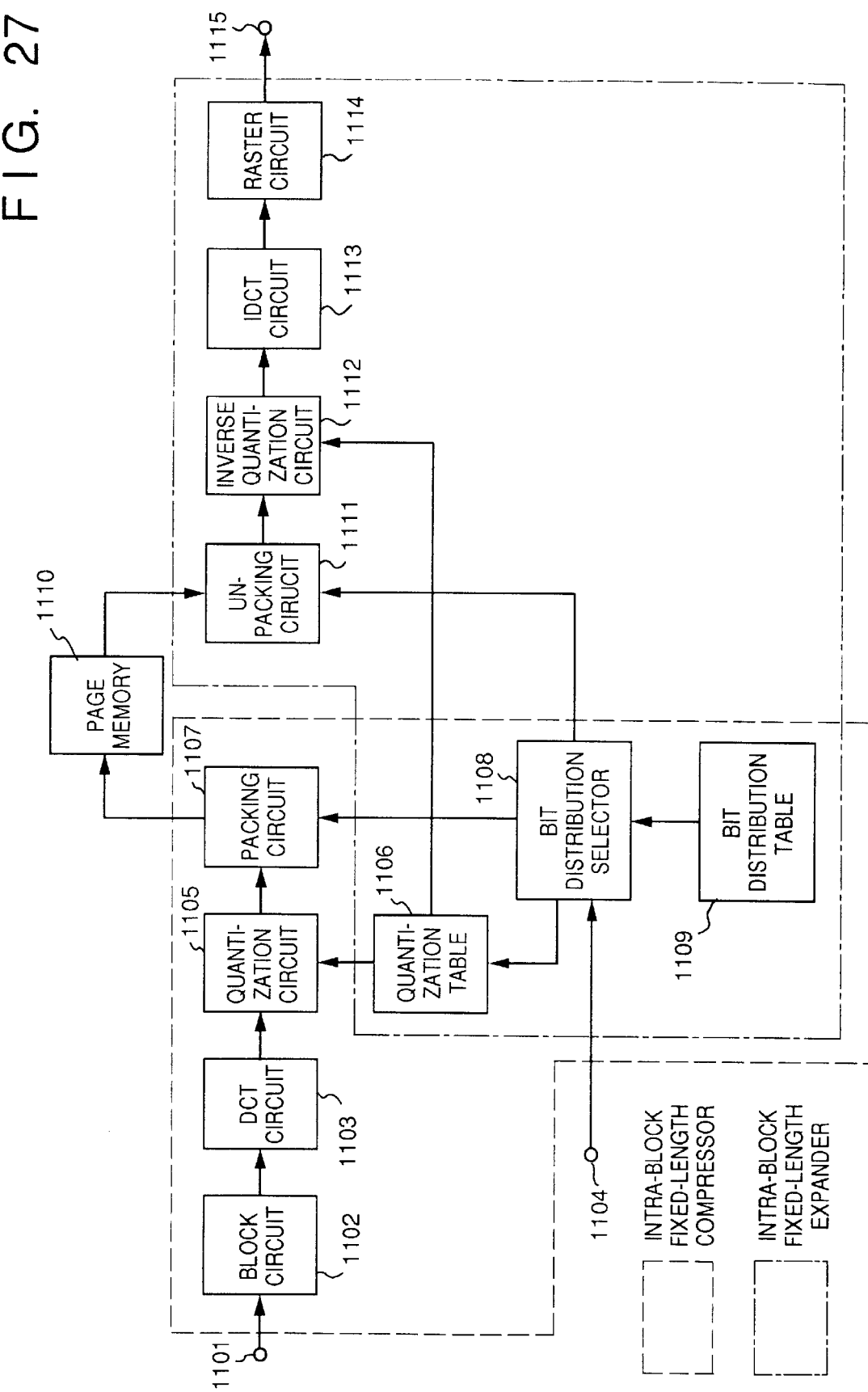
FIG. 27 is a block diagram showing an image encoding apparatus according to the 15th embodiment of the present invention.

The 15th embodiment of the present invention will be described below. FIG. 27 is a block diagram showing an embodiment wherein the present invention is applied to an image encoding apparatus. In the 15th embodiment shown in the block diagram of FIG. 27, image data and its image size are input, and the compression ratio is changed according to the input image size. After intra-block fixed-length compression is performed based on the changed compression ratio, encoded data is stored in a page memory. When an image is to be output, data read out from the page memory is expanded, and the expanded image data is output from an output terminal.

In FIG. 27, image data is input from an input terminal 1101, and is divided into 8 (pixels)×8 (pixels) blocks by a block circuit 1102. Then, orthogonal transform is performed in units of blocks.

In this embodiment, a DCT (Discrete Cosine Transform) circuit 1103 is used. The DCT circuit 1103 transforms image data into DCT coefficients, and the DCT coefficients are subjected to quantization processing (to be described later) in a quantization circuit 1105. A packing circuit 1107 one-dimensionally packs the quantized components in turn on the basis of a bit length bit-distributed by a bit distribution selector 1108, and outputs the packed data. The one-dimensionally aligned data are sequentially stored in a page memory 1110. In this manner, intra-block fixed-length compression processing is executed according to the bit distribution determined in units of blocks, and compressed data is stored in the page memory.

When image data is expanded and output, the data read out from the page memory 1110 is subjected to processing opposite to the compression processing by an unpacking circuit 1111, an inverse quantization circuit 1112, an IDCT circuit 1113, and a raster circuit 1114 shown in FIG. 27. Thus, expanded data is output from an output terminal 1115.

Image data is input from the input terminal 1101, while the image width and height of the image data are input from an input terminal 1104 as another input terminal. The image size can be determined based on the image width and height of the image data. Therefore, for example, when an image having an image width of 8w and an image height of 8h is input to the page memory having a capacity M, if one block used for intra-block fixed-length compression consists of 8×8 pixels, the input image is divided into w×h blocks.

Therefore, the number of bits, which can be assigned to one block, is M/(w×h) bits, and if the intra-block fixed-length compression is performed within the assigned number of bits, the image data can be stored by efficiently utilizing the page memory.

In the 15th embodiment, paying attention to this point, when the image size is input, as described above, the number of bits to be assigned to each block is calculated, and a bit distribution according to the calculated number of bits is selected to perform intra-block fixed-length compression.

More specifically, the bit distribution selector 1108 calculates the number of bits to be assigned to each block on the basis of the image size (image width×image height) input from the input terminal 1104, and selects a desired bit distribution from a plurality of prepared bit distribution tables in accordance with the calculation result. At the same time, a plurality of quantization tables are formed based on the plurality of bit distribution tables to satisfy a relationship as in the prior art. When image data is actually input, one of quantization tables 1106 is selected in accordance with the bit distribution selected by the bit distribution selector 1108.

How to select one of bit distribution tables 1109 and the quantization tables 1106 will be described below under the assumption that one block consists of 4×4 pixels, and the bit precision of a DCT coefficient as an output from the DCT circuit 1103 is 8 bits, for the sake of simplicity.

If the image size of a certain image A is 4w×4h, a product of the image width×the image height is input to the bit distribution selector 1108, and the number of bits per block is calculated. If the capacity of the page memory is 50wh bits, the number of bits per block is 50 bits.

One bit distribution is selected from the plurality of bit distribution tables 1109 on the basis of the number of bits. As an example of the bit distribution, a distribution shown in FIG. 28A may be used. Since this distribution method is a known technique as a bit distribution method utilizing the characteristics of the DCT coefficients, a description thereof will not particularly made here.

A quantization table selected according to this bit distribution is as shown in FIG. 28B. This quantization table is prepared in advance in the plurality of quantization tables 1106, and is selected according to the number of bits per block upon actual image compression. The selected table is input to the quantization circuit 1105.

If another image B is input, and has an image size of 2w×2h, the number of bits per block is twice as large as the number of bits obtained when the image A is input, i.e., 100 bits. FIG. 28C shows an example of the bit distribution according to this number of bits. Therefore, the bit distribution selector 1108 switches the bit distribution from FIG. 28A to FIG. 28C. Similarly, the quantization table shown in FIG. 28B is switched to the quantization table shown in FIG. 28D.

As described above, according to this embodiment, the image size is input together with input image data, and the bit distribution table and the quantization table are switched in accordance with the input image size, thereby changing the number of bits per block. Thus, intra-block fixed-length compression processing can be performed by efficiently utilizing the page memory.

16th Embodiment

Figure 29:
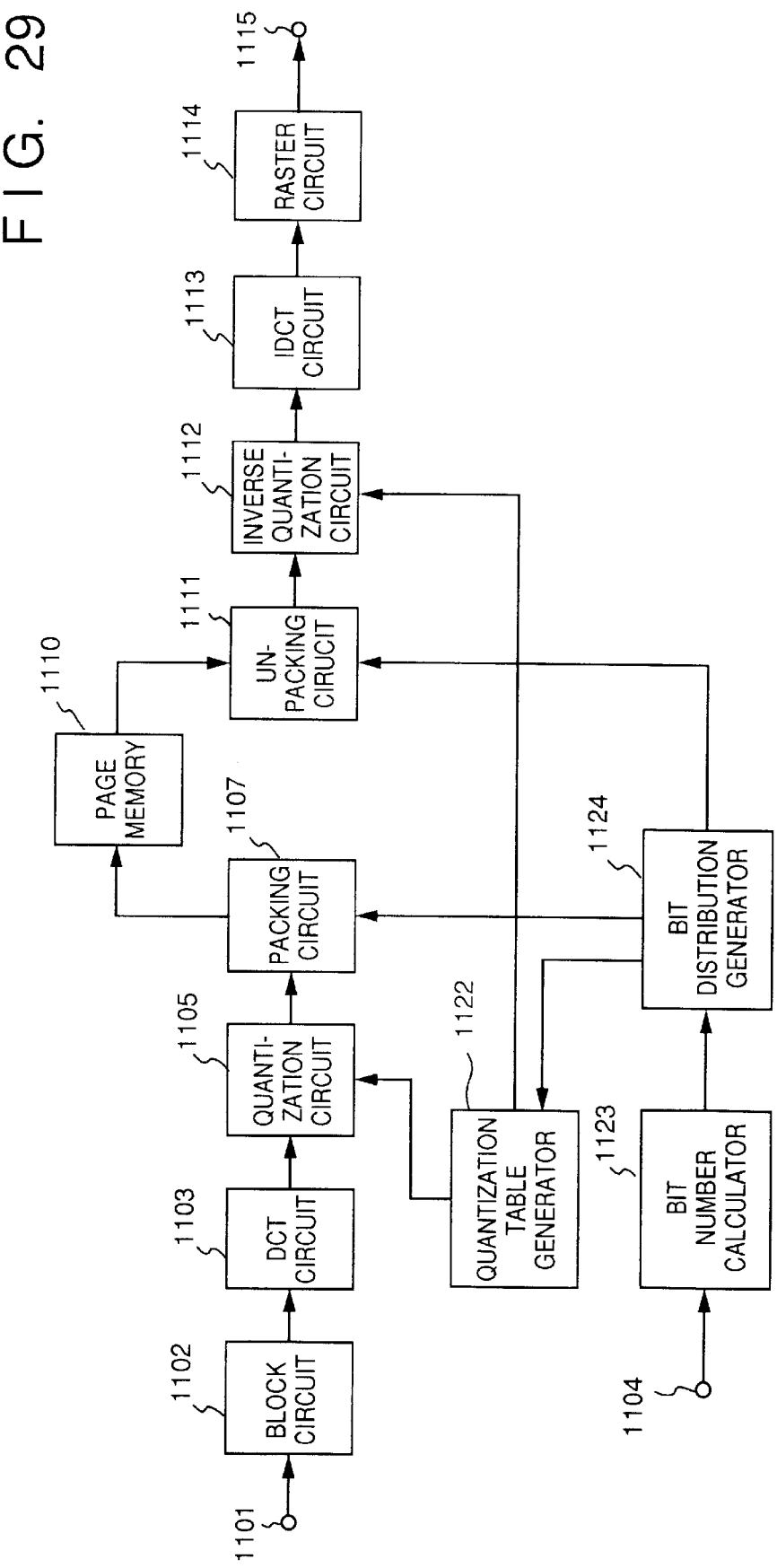
FIG. 29 is a block diagram showing an image encoding apparatus according to the 16th embodiment of the present invention.

FIG. 29 shows the 16th embodiment according to the present invention. The same reference numerals in FIG. 29 denote the same parts as in the 15th embodiment shown in FIG. 27 described above, and a detailed description thereof will be omitted.

In FIG. 29, when image data is input from the input terminal 1101, the image size of the input image data is input from the input terminal 1104 to a bit number calculator 1123. The bit number calculator 1123 calculates the number of bits to be assigned to one block, and outputs the calculation result. More specifically, when a page memory has a capacity M, and one block is constituted by n×n pixels, the calculator 1123 calculates $M/(n^2)$, and outputs the calculated value to a bit distribution generator 1124. The bit distribution generator 1124 assigns bits to each component of an n×n pixel block, so that the total number of bits per block becomes equal to the input number of bits. Since a method of assigning bits to the each component is a known technique, a description thereof will be omitted here. A quantization table generator 1122 receives the bit distribution from the bit distribution generator 1124, and calculates $2^{(C-Bij)}$ (where C is the bit precision of a DCT component, and $B_{ij}$ is the bit distribution) for each component in the block, and outputs the calculated result to the quantization circuit 1105.

As described above, according to the 16th embodiment, the bit distribution table and the quantization table can be omitted, and the hardware arrangement can be simplified.

17th Embodiment

Figure 30:
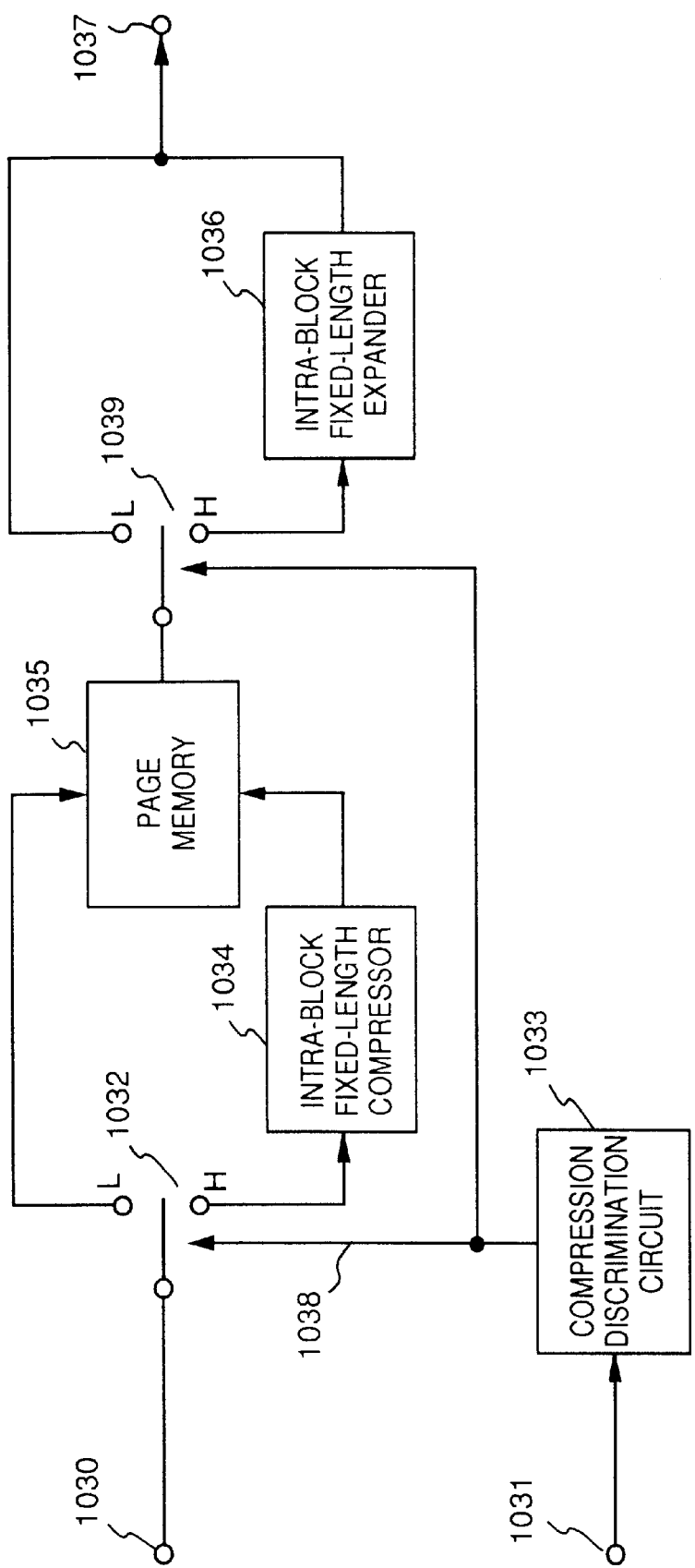
FIG. 30 is a block diagram showing an image encoding apparatus according to the 17th embodiment of the present invention.

FIG. 30 shows the 17th embodiment according to the present invention. In the prior art, when intra-block fixed-length compression is performed, compression is performed regardless of the input image size. However, image data can often be stored in a page memory without any compression depending on an image size. Even when a low compression ratio is set, data processed by the compression processor causes an error in the orthogonal transformer.

Thus, the 17th embodiment has a process without compression processing, as shown in FIG. 30. An intra-block fixed-length compressor 1034 and an intra-block fixed-length expander 1036 respectively correspond to portions surrounded by a broken line and an alternate long and short dashed line in FIG. 27 of the above-mentioned 15th embodiment.

Image data is input from an input terminal 1030, and at the same time, an image size is input from an input terminal 1031. A compression discrimination circuit 1033 compares the total information amount of the input image with the capacity of the page memory on the basis of the input image size. When the total information amount of the input image is smaller than the capacity of the page memory, the circuit 1033 outputs a Low-level compression discrimination signal 1038. Conversely, when the total information amount of the input image is larger than the capacity of the page memory, the circuit 1033 outputs a High-level compression discrimination signal 1038.

The compression discrimination signal 1038 is input to a selector 1032. When the signal 1038 is at High level, a process for executing intra-block fixed-length compression, and then inputting compressed data to a page memory 1035 is selected; when the signal 1038 is at Low level, a process for directly inputting data to the page memory 1035 without compression processing is selected. In this manner, image data input from the input terminal 1030 is transferred to the selected process, and is stored in the page memory 1035.

When image data is output, stored data is read out from the page memory 1035, and is supplied to a selector 1039. At this time, the compression discrimination signal 1038 is supplied from the compression discrimination circuit 1033 to the selector 1039. When the compression discrimination signal 1038 is at High level, the selector 1039 selects a process for performing intra-block fixed-length expansion as in the compression mode; when the signal 1038 is at Low level, the selector 1039 selects a process for outputting data without expansion processing. Image data is output from the output terminal 1037 via the selected process.

As described above, according to the 17th embodiment, whether or not compression processing is performed is determined according to the image size, and for an image which does not require compression, another path without compression processing is provided. Thus, a transform error caused by compression processing can be prevented, and image encoding can be performed while perfectly preserving input data.

18th Embodiment

Figure 31:
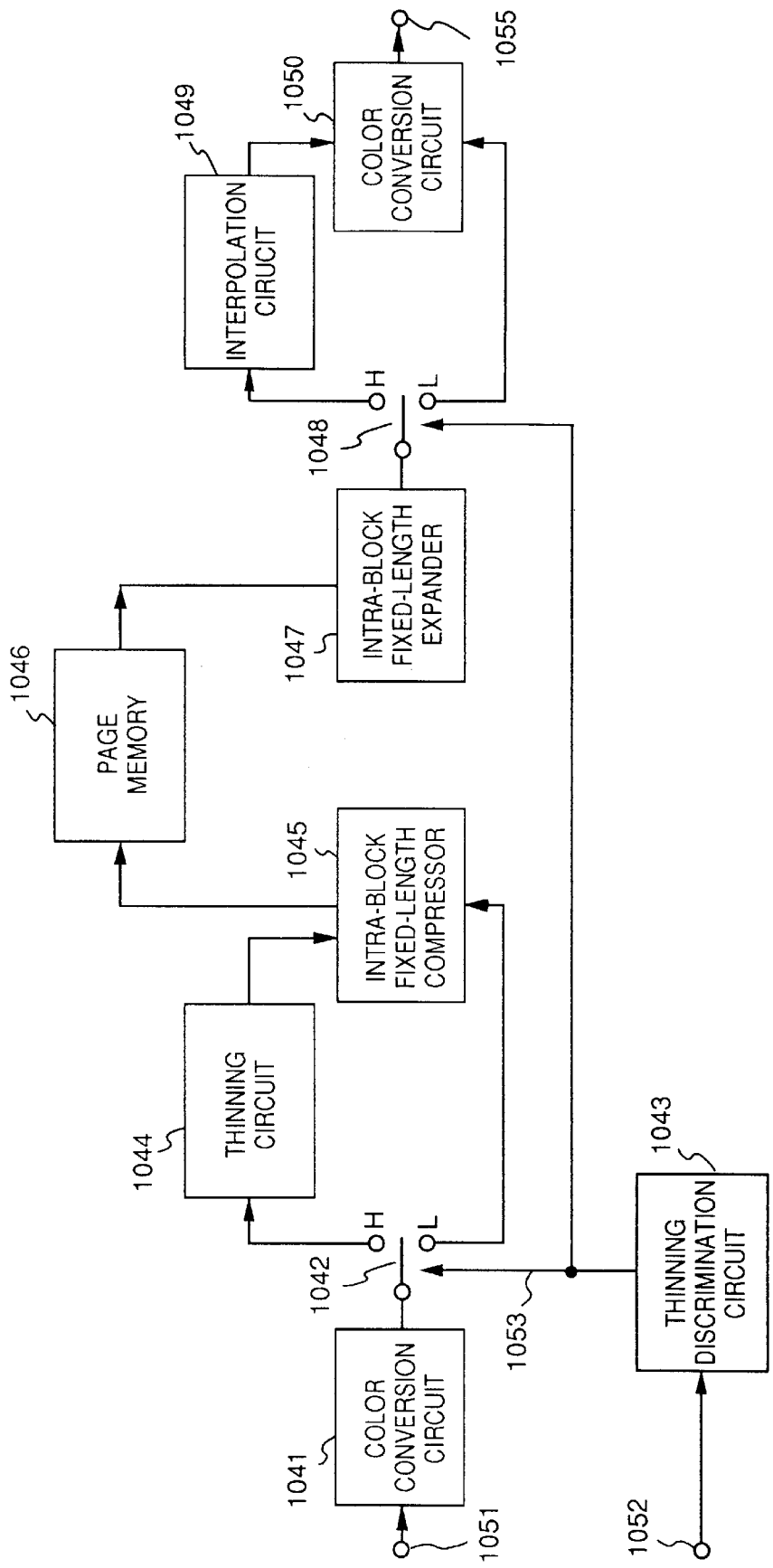
FIG. 31 is a block diagram showing an image encoding apparatus according to the 18th embodiment of the present invention.

FIG. 31 shows the 18th embodiment according to the present invention. Normally, a compression system for a color image constituted by RGB data performs color conversion of image data before compression processing so as to increase the compression ratio. More specifically, RGB data are converted into YUV data, and a relatively large compression ratio is used for UV data, thus allowing compression while sufficiently preserving image quality.

At this time, even when UV data are thinned out, since deterioration of image quality is not conspicuous in terms of visual sense characteristics of man, the UV data are thinned out to ½ in, e.g., the horizontal direction, and compression processing is performed using a half UV data amount. At this time, thinning processing is performed regardless of the type of image, and thereafter, intra-block fixed-length compression is also performed. For this reason, an image having a not so large image size is unnecessarily compressed.

Thus, in the 18th embodiment, whether or not thinning processing is performed is determined on the basis of the image size input together with image data, so as not to perform thinning process for an image having a small image size.

In FIG. 31, color image data consisting of RGB data are input from an input terminal 1051, and at the same time, an image size is input from an input terminal 1052. A thinning discrimination circuit 1043 compares the input image size and a predetermined threshold value T on the basis of the input image size. When the value T is larger than the input image size, the circuit 1043 outputs a Low-level thinning discrimination signal 1053 so as not to perform thinning processing.

Conversely, when the value T is smaller than the input image size, the circuit 1043 outputs a High-level thinning discrimination signal 1053 so as to perform thinning processing. The above-mentioned threshold value T is set in the thinning discrimination circuit 1043 as an image size, which does not require thinning processing.

The thinning discrimination signal 1053 is input to a selector 1042. When the thinning discrimination signal 1053 is at High level, the selector 1042 selects a process with thinning processing; when the signal 1053 is at Low level, the selector 1042 selects a process for directly outputting image data without thinning processing. Data converted from RGB data to YUV data by a color conversion circuit 1041 is transferred to the process selected by the selector 1042. When the thinning processing is to be performed, a thinning circuit 1044 thins out UV data in the horizontal or vertical direction. Image data subjected to the thinning processing or image data directly output without going through the thinning processing is input to an intra-block fixed-length compressor 1045 similar to that in the 15th embodiment, and is compressed. Thereafter, the compressed data is stored in a page memory 1046.

In an expansion mode, expansion processing is performed by an intra-block fixed-length expander 1047 similar to that in the above-mentioned 15th embodiment, and expanded data is output to a selector 1048. At this time, the selector 1048 receives the thinning discrimination signal 1053 as in the compression mode. When the thinning discrimination signal 1053 is at High level, the selector 1048 selects a process for performing interpolation; when the signal 1053 is at Low level, the selector 1048 selects a process for outputting data without interpolation.

When interpolation processing is performed, UV data is subjected to pre-interpolation in the same direction (horizontal or vertical direction) as the thinning direction. Furthermore, data subjected to interpolation processing or data directly output without interpolation processing is input to a color conversion circuit 1050, and is converted from YUV data into RGB data. Thus, image data is output from an output terminal 1055.

As described above, according to the 18th embodiment, whether or not thinning processing is performed is determined according to an image size. Thinning processing is not performed for an image having a not so large image size, and image encoding free from deterioration of image quality caused by thinning processing can be realized at that image size.

As described above, according to the 15th to 18th embodiments, since the image size of an input image is checked, and the compression ratio is changed according to the image size, intra-block fixed-length compression can be performed at an optimal compression ratio independently of the input image size. Therefore, image data can be stored by efficiently utilizing the page memory, and image encoding can be performed without deteriorating image quality by unnecessary compression processing.

19th Embodiment

Figure 32:
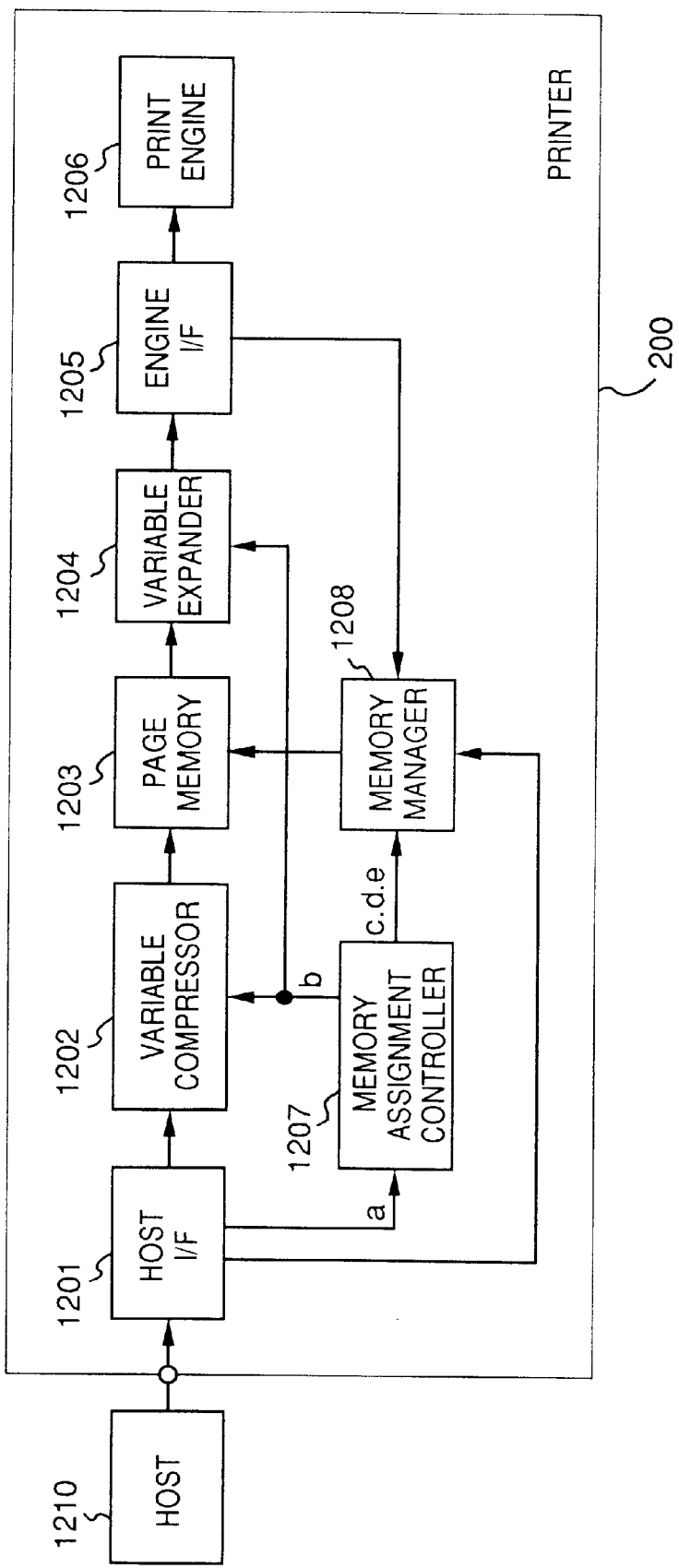
FIG. 32 is a block diagram showing an arrangement according to the 19th embodiment of the present invention.

FIG. 32 shows the 19th embodiment in which the present invention is applied to a printer as an image output apparatus. In FIG. 32, reference numeral 1200 denotes a printer according to the 19th embodiment of the present invention; and 1210, a host apparatus for outputting print information such as image information to be printed by the printer 1200 of this embodiment.

In the printer 1200, reference numeral 1201 denotes a host I/F for interfacing with the host apparatus 1210. Image information to be printed, which is generated by the host apparatus 1210 is received by the host I/F 1201, and is supplied to a variable compressor 1202. The variable compressor 1202 performs predetermined compression processing of the received image data, and stores compressed information in a page memory 1203. After image information for one page is sequentially subjected to the compression processing, and is stored in the page memory, the stored information is decoded to original image information by a variable expander 1204, and the decoded information is supplied to a print engine 1206 via an engine I/F 1205. Thus, an image is printed on, e.g., a recording sheet.

A case will be exemplified below wherein an image for one page consists of three partial images A, B, and C, as shown in, e.g., FIG. 41 described previously. In the prior art, the partial images are stored in the page memory as a single two-dimensional image D including the images A, B, and C.

In contrast to this, in the 19th embodiment, the three partial images A, B, and C are independently managed, and each partial image is one-dimensionally stored in the page memory 1203. Each image is defined by an absolute position $(x_i, y_i)$ $(i=1, 2, \ldots)$ with respect to the coordinate system $(x, y)$ of a paper sheet, a width $W_i$ of a region, and a height $H_i$ of the region, and is defined in a header portion of an image data file.

FIG. 33 shows an example of the format of the header portion used in the 19th embodiment.

In FIG. 33, since the absolute position $(x_1, y_1)$ of the partial image A is stored in frames 1 and 2 (F1, F2), the host I/F 1201 separates this position data, and supplies the position data to a memory manager 1208. Since the subsequent frames F3 and F4 respectively store the width $W_1$ and the height $H_1$ of the region of the partial image A, the host I/F 1201 separates these data, and supplies the data to a memory assignment controller 1207.

Figure 34:
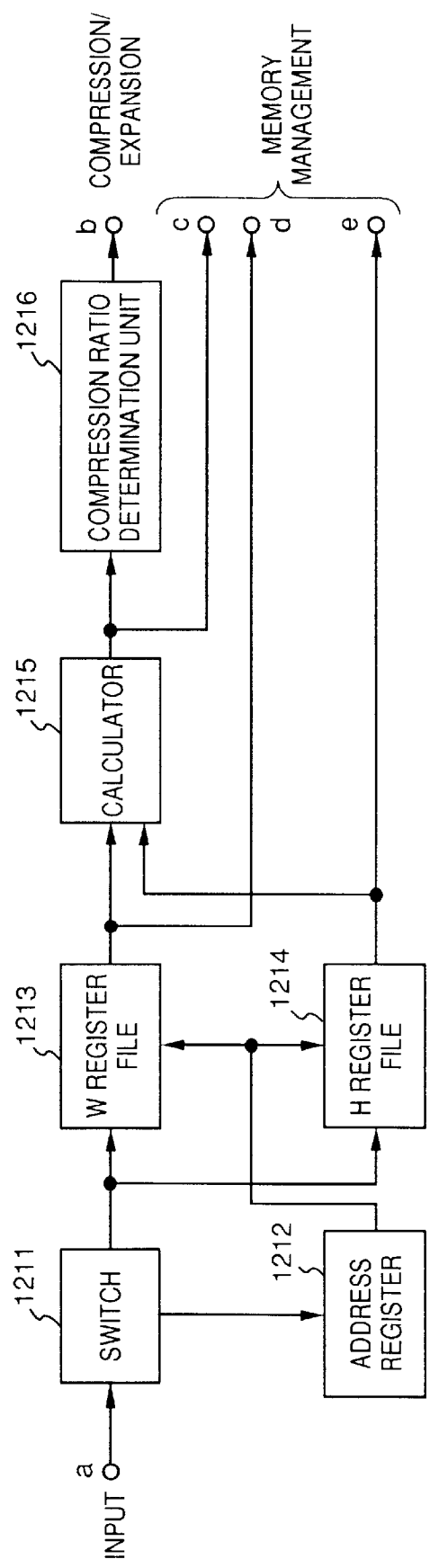
FIG. 34 is a block diagram showing a detailed arrangement of a memory assignment controller of the 19th embodiment.

FIG. 34 is a block diagram showing a detailed arrangement of the memory assignment controller 1207. The width information $W_1$ and the height information $H_1$ input to the memory assignment controller 1207 are separated by a switch 1211, and are respectively stored in corresponding registers of W and H register files 1213 and 1214 designated by a register address unit 1212. This operation is performed for all the images.

As described above, image data is separated by the host I/F 1201, and is supplied to the variable compressor 1202. For this reason, a calculator 1215 performs a calculation given by the following equation ① so as to obtain an image information amount H:

$$H = \sum_{i=1}^{3} (W_i \times H_i) \qquad ①$$

Figure 35:
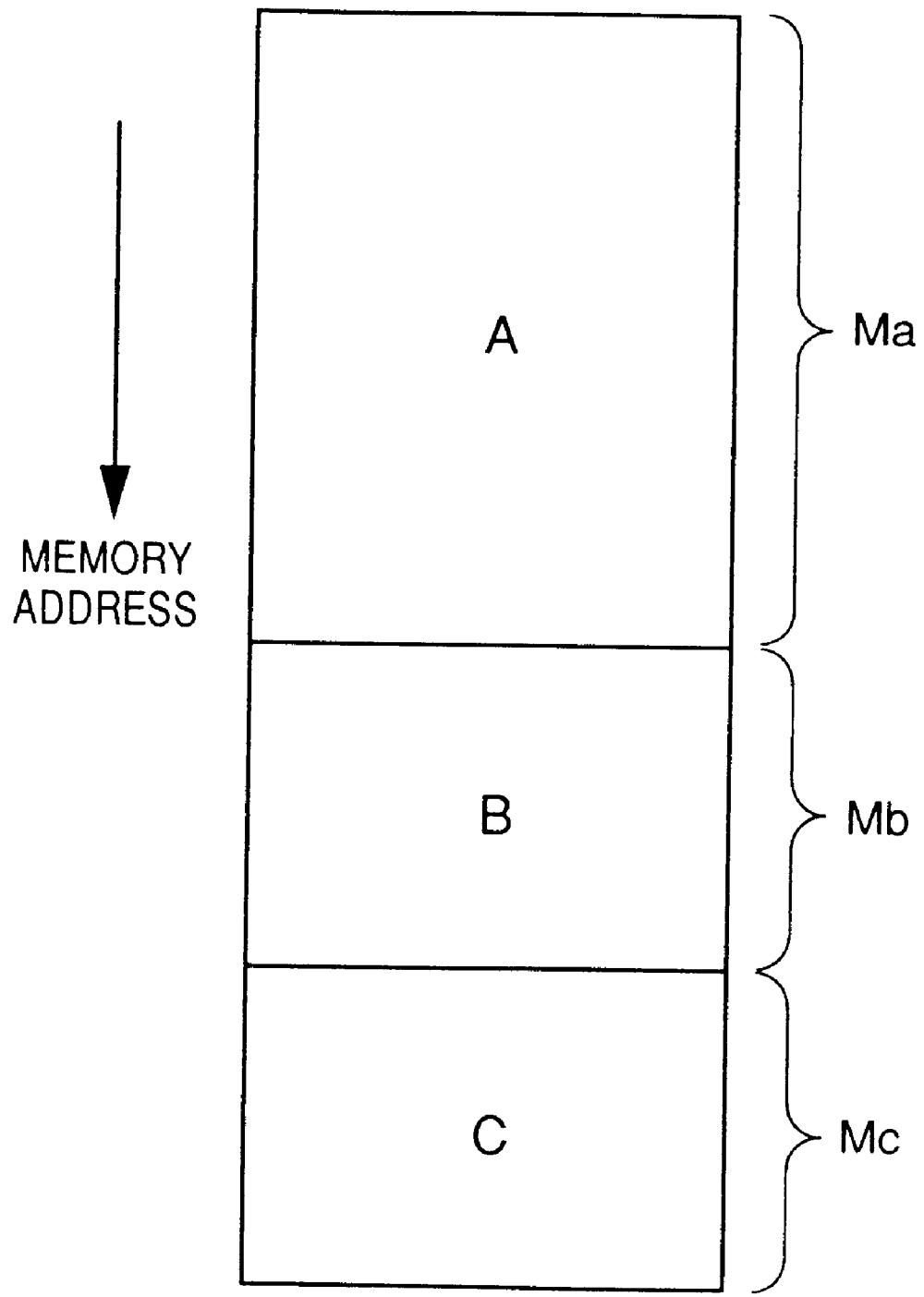
FIG. 35 is a map showing an example of memory address assignment to a page memory of the 19th embodiment.

If memory amounts assigned to the three partial images are respectively represented by Ma, Mb, and Mc, the memory amounts Ma, Mb, and Mc are given by the following equations ② to ④:

$$Ma = Mp\{(W_1 \times H_1)/H\} \quad (2)$$

$$Mb = Mp\{(W_2 \times H_2)/H\} \quad (3)$$

$$Mc = Mp\{(W_3 \times H_3)/H\} \quad (4)$$

where Mp is the total capacity of the page memory 1203. FIG. 35 shows an example of this memory assignment.

Compression ratios Na, Nb, and Nc are given by the following equation ⑤:

$$Na = Nb = Nc = (Ma)/(W_1 \times H_1) = Mp/H \quad (5)$$

This calculation is made by a compression ratio determination unit 1216, and the calculated result is supplied to the variable compressor 1202 and the variable expander 1204, thus determining their operations. The setting operations for the partial images are completed in a frame F12, and image data starts from a frame F13. Each image data is compressed under a condition set as described above, and is stored at the corresponding address in the page memory 1203 designated by the memory manager 1208.

After image data for one page is recorded in the page memory 1203, the print engine 1206 is started. In a print mode, the addresses of pixels are output from the engine I/F 1205. For this reason, the memory manager 1208 obtains physical addresses on the page memory 1203 corresponding to the output pixel addresses so as to read out pixel information, and supplies the readout information to the print engine 1206 via the engine I/F 1205. The print engine 1206 forms an image while executing a scan operation. This operation is repeated over one page, thus completing the print operation.

In the above description, the case of three images has been exemplified. The same processing sequence applies to other cases.

As described above, according to the 19th embodiment, since page image information consisting of a plurality of images can be subjected to compression management in units of images, an inexpensive printer apparatus, which can achieve high-quality printing, can be realized.

20th Embodiment

In the 19th embodiment, partial images are controlled to have an equal compression ratio. However, in some cases, required image quality varies depending on patterns of partial images. In the 20th embodiment, relative area information required for each image can be input. The arrangement of the printer apparatus in the 20th embodiment is substantially the same as that shown in FIG. 32 of the 19th embodiment, except that the memory assignment controller 1207 of the 20th embodiment has a partially different arrangement, and control information of image data sent from the host apparatus 1210 via the host I/F 1201 has a partially different format, i.e., relative area information required for each image is sent from the host apparatus 1210 in addition to the information of the 19th embodiment.

Figure 36:
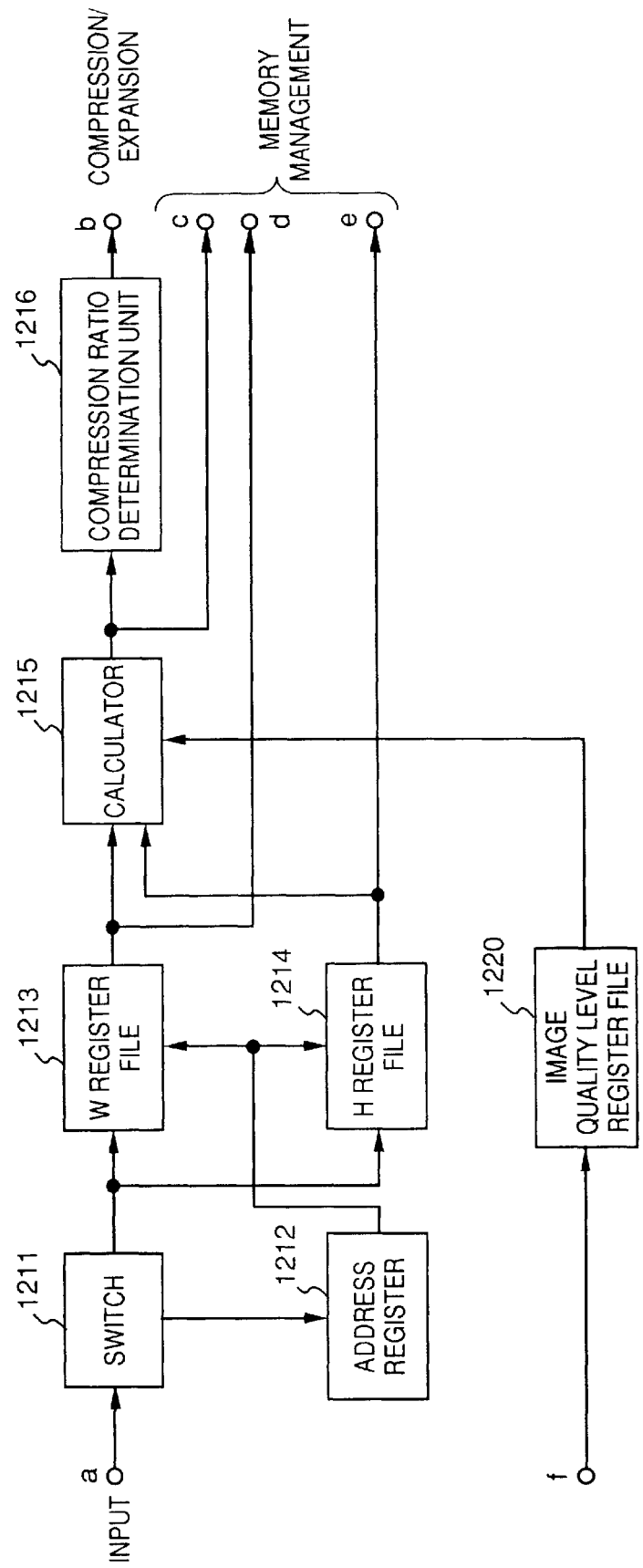
FIG. 36 is a block diagram showing a detailed arrangement of a memory assignment controller according to the 20th embodiment of the present invention.

FIG. 36 shows the detailed arrangement of the memory assignment controller of the 20th embodiment according to the present invention. The same reference numerals in FIG. 36 denote the same parts as in FIG. 34, and a detailed description thereof will be omitted.

In the 20th embodiment, as shown in FIG. 36, the memory assignment controller 1207 comprises an area level register file 1220, so that relative area information required for each image from the host apparatus 1210 via the host I/F 1201 can be separately input from an input terminal f shown in FIG. 36.

For example, if an image A>an image B=an image C, equation ① for calculating the image information amount H in the 19th embodiment by the calculator 1215 is modified as follows to calculate an image information amount H' in the 20th embodiment:

$$H' = (W_1 + H_1)(1+k_1) + W_2 \times H_2 + W_3 \times H_3 \quad (6)$$

where $k_1$: designated value

Since calculating the image information amount H' using the above equation is equivalent to increasing the information of the image A by $(1+k_1)$ times, the ratio of the image A in the page memory 1203 is increased. For this reason, if memory amounts assigned to the three images are respectively represented by Ma', Mb', and Mc', they are given by the following equations ⑦ to ⑨:

$$Ma' = Mp[\{W_1 \times H_1(1+k_1)\}/H'] \quad (7)$$

$$Mb' = Mp\{(W_2 \times H_2)/H'\} \quad (8)$$

$$Mc' = Mp\{(W_3 \times H_3)/H'\} \quad (9)$$

The subsequent processing is the same as that in the above-mentioned 19th embodiment.

As described above, according to the 20th embodiment, compression management of page image information consisting of a plurality of images can be performed in units of images, and relative area information required for each image can be input. Therefore, an inexpensive printer apparatus, which can print a high-quality hard copy, can be realized.

21st Embodiment

Figure 37:
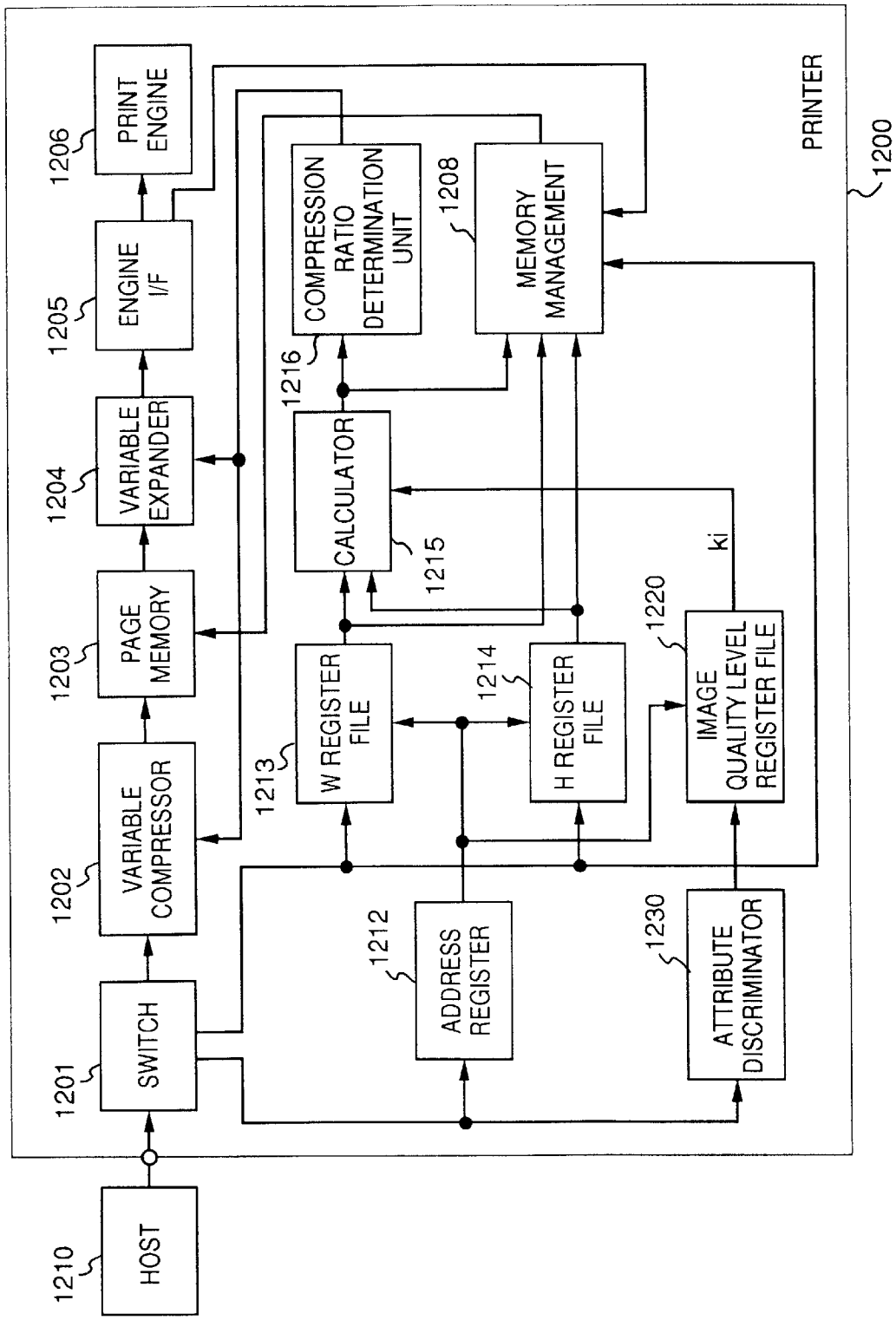
FIG. 37 is a block diagram showing an arrangement according to the 21st embodiment of the present invention.

FIG. 37 shows the 21st embodiment according to the present invention. The same reference numerals in the 21st embodiment denote the same parts as in FIGS. 32 and 36 of the 20th embodiment, and a detailed description thereof will be omitted. In the 21st embodiment, the detailed arrangement of the memory assignment controller 1207 in the 19th or 20th embodiment described above is illustrated together with other arrangements. In the 21st embodiment, the switch 1211 also has a function of the host I/F 1201.

Figure 41:
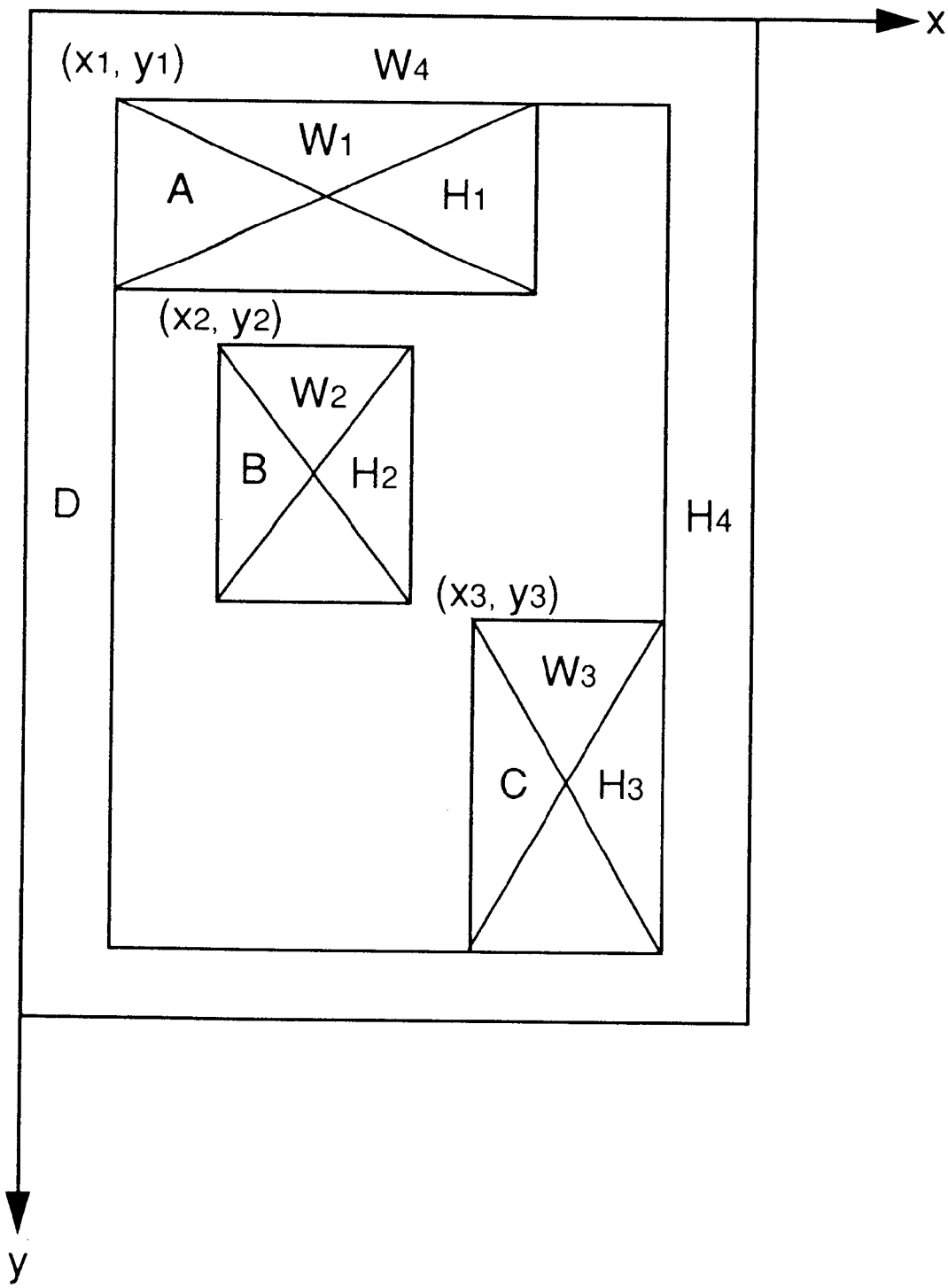
FIG. 41 is a view showing a 1-page image.

In the 21st embodiment, each of image data of images A, B, and C shown in, e.g., FIG. 41, which are sent from the host apparatus 1210, independently managed, and one-dimensionally stored in the page memory 1203, defines an attribute of an image (e.g., an attribute $A_i$ for the image A) in the header portion of the image data file in addition to the absolute position $(x_i, y_i)$ (i=1, 2, . . . ) of the origin of an image with respect to the coordinate system (x, y) of a paper sheet, the width $W_i$ of the corresponding image area, and the height $H_i$ of the area. For this purpose, the apparatus of this embodiment comprises an attribute discriminator 1230 for discriminating an image attribute.

FIG. 38 shows an example of the header portion of the image data file in the 21st embodiment. An image attribute $A_i$ in a frame F5 means a generation source of an image, e.g., a CG, a scanned image, a TV camera, a VTR, or the like, and is mapped as a code in the 21st embodiment.

The origin position $(x_1, y_1)$ of the image A is defined in frames F1 and F2, the width $W_1$ and height $H_1$ of the image area are defined in frames F3 and F4, and its attribute is defined in the frame F5. The images B and C are similarly defined in the frames F6 to F15, and image data is stored in a frame F16 and subsequent frames. The format other than the attributes is the same as that shown in FIG. 33.

The header portion of the image data file from the host apparatus 1210 is separated by the switch 1211. The data ($x_1$, $y_1$) is supplied to the memory manager 1208, and the data ($W_i$, $H_i$) are respectively stored in the W and H register files 1213 and 1214 designated by the register address unit 1212. The data $A_i$ are supplied to the attribute discriminator 1230 to be discriminated, and are stored in an image quality level register file 1220. Note that image data is supplied to the variable compressor 1202.

The calculator 1215 for calculating a total image information amount H in the 21st embodiment performs a calculation given by the following equation (11):

$$H = \sum_{i=1}^{3} \{(W_i + H_i) \times (1 \times k_i)\} \quad (11)$$

$k_i$: the correction term supplied from the image quality level register file 1220

If memory amounts assigned to the three partial images are respectively represented by Ma, Mb, and Mc, they are respectively given by the following equations (12) to (14):

$$Ma = Mp\{(W_1 \times H_1)/H(1+k_1)\} \quad (12)$$

$$Mb = Mp\{(W_2 \times H_2)/H(1+k_2)\} \quad (13)$$

$$Mc = Mp\{(W_3 \times H_3)/H(1+k_3)\} \quad (14)$$

where Mp is the total capacity of the page memory 1203.

$k_i$ is the correction term supplied from the image quality level register file 1220. This correction term is determined to have a value satisfying $|k_i|<1$ by the attribute discriminator 1230. For example, if the image A is an image generated by a computer graphics (CG), the image B is an image from a scanner, and the image C is an image from a TV camera, their frequency ranges satisfy A>B>C.

If the compression ratios of the three images are respectively represented by Na, Nb, and Nc, [Na>Nb>Nc] must be satisfied to as to suppress deterioration of image quality due to compression.

From equations (12), (13), and (14), $$Na = Ma/(W_1 \times H_1) = (M\bar{p}/H)(1+k_2) \quad (15)$$

$$Nb = (Mp/H)(1+k_2) \quad (16)$$

$$Nc = (Mp/H)(1+k_3) \quad (17)$$

Equations (15), (16), and (17) are calculated by the compression ratio determination unit 1216, and the calculated results are supplied to the variable compressor 1202 and the variable expander 1204. Image data compressed at the calculated compression ratios by the variable compressor 1202 are stored in the page memory 1203.

Therefore, the constants of the correction term $k_i$ are mapped to satisfy $[k_1>k_2>k_3]$. In this manner, after the images for one page are stored in the page memory 1203, a print process is started.

Since the print engine 1206 of this embodiment performs main and sub scans, the position of a pixel to be printed is given by the coordinate position (xp, yp) on a paper sheet from the engine I/F 1205. The memory address corresponding to this position is obtained by the memory manager 1208 on the basis of ($x_i$, $y_i$), ($W_i$, $H_i$), Ma, Mb, and Mc. Pixel information is read out from the page memory according to the memory address, and is expanded by the variable expander 1204 using the same parameters as those used upon compression by the variable compressor 1202. The expanded information is supplied to the print engine 1206 via the engine I/F 1205.

In the above description, the number of partial images is 3. The same applies to other numbers of images.

As described above, according to the 21st embodiment, when a page image consisting of a plurality of partial images added with attribute information is compressed and is written in the page memory, optimal compression parameters can be automatically set for each partial image.

22nd Embodiment

Figure 39:
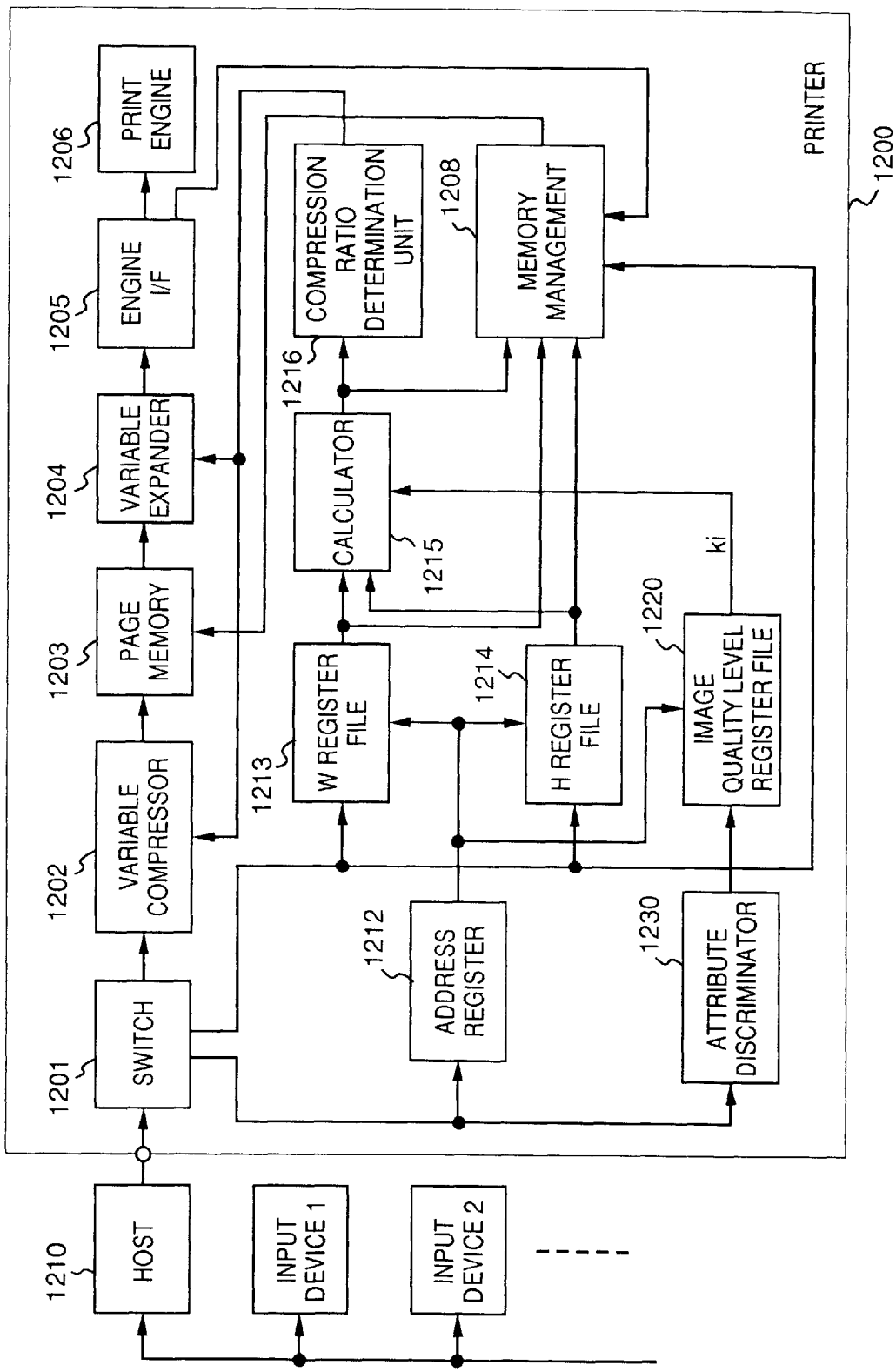
FIG. 39 is a block diagram showing an arrangement according to the 22nd embodiment of the present invention.

FIG. 39 shows the arrangement of the 22nd embodiment. The same reference numerals in FIG. 39 denote the same parts as in the above-mentioned 21st embodiment shown in FIG. 37, and a detailed description thereof will be omitted. In the 21st embodiment, the attribute of each partial image is added by a user using the host apparatus 1210 to create the image file shown in FIG. 38. However, such an operation easily causes an error. Thus, in the 22nd embodiment, input devices 1241, 1242, and the like (e.g., a scanner, a TV camera, a VTR, . . . ) for generating partial images automatically add attribute information, and supply the information to the host apparatus 1210.

Figure 40:
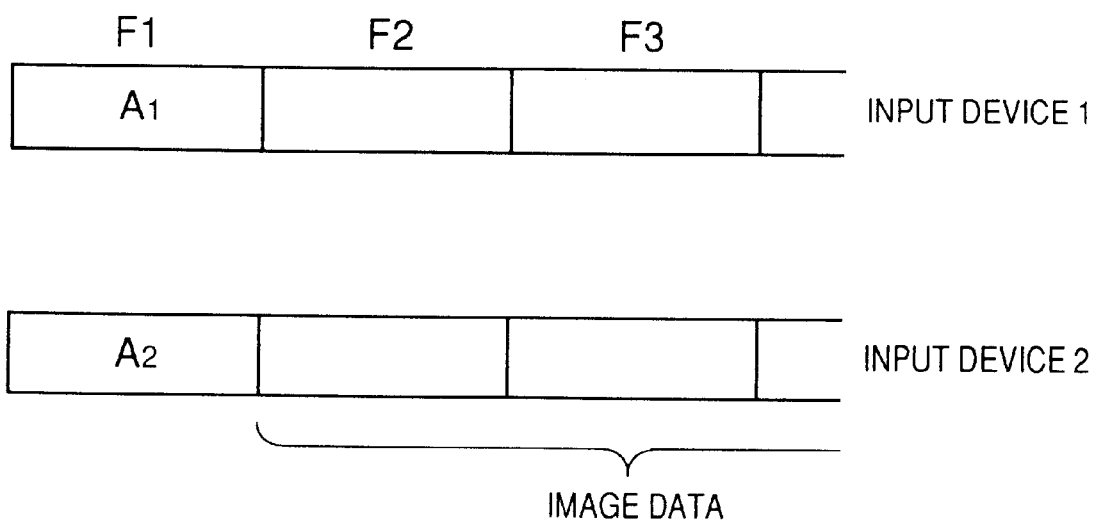
FIG. 40 shows data formats from input devices of the 22nd embodiment.

FIG. 40 shows the data format. In FIG. 40, attribute information (e.g., $A_1$ or $A_2$) is stored in a frame 1 (F1), and image data is added in a frame F2 and subsequent frames. The host apparatus 1210 edits these pieces of partial image information to form the data format shown in FIG. 38.

Thus, the designation error of an image attribute can be avoided.

As described above, according to the embodiments of the present invention, in a printer comprising a memory means having a predetermined capacity, the compression ratio can be desirably changed according to an image size, and the equipped memory means can be maximally efficiently utilized.

As a result, a printer which is equipped with only a memory having a small memory capacity but requires a large memory capacity, e.g., a color printer, can be put into the market.

Also, since the image size of an input image is checked, and the compression ratio is changed according to the image size, intra-block fixed-length compression can be performed at an optimal compression ratio independently of the input image size. Therefore, image data can be stored by efficiently utilizing the page memory, and image encoding can be performed without deteriorating image quality by unnecessary compression processing.

23rd Embodiment

The block diagram of this embodiment is the same as FIG. 1.

Figure 42:
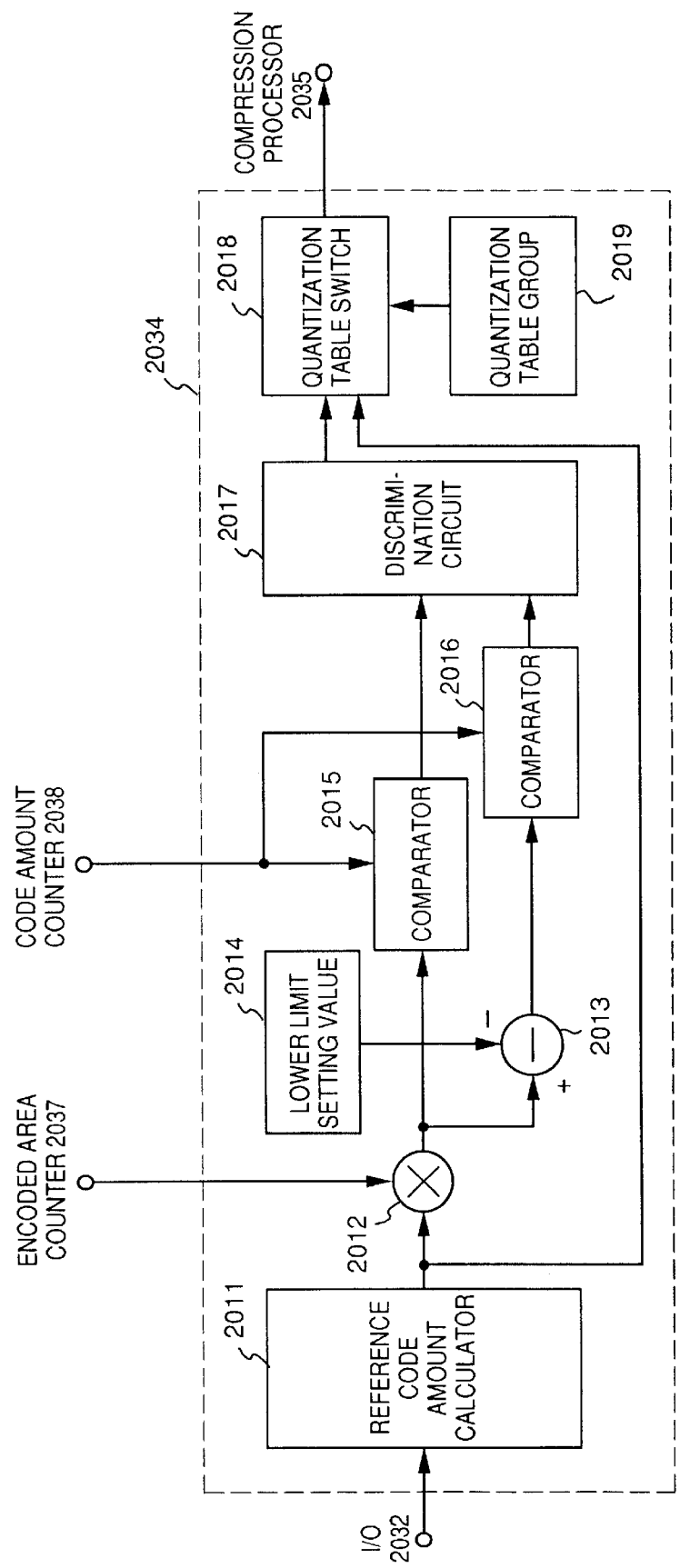
FIG. 42 is a block diagram showing an arrangement of a code amount controller 2034 according to the 23rd embodiment of the present invention.

FIG. 42 is a block diagram showing the arrangement of a code amount controller 2234 according to the 23rd embodiment. A portion surrounded by a broken line in FIG. 42 corresponds to the code amount controller in FIG. 1. The block diagram showing the arrangement of a compression processor 2035 is the same as FIG. 3. A portion surrounded by a broken line in FIG. 42 corresponds to the compression processor.

In FIG. 42, reference numeral 2011 denotes a reference code amount calculator; 2012 a multiplier; 2013, a subtracter; 2014, a register; 2015 and 2016, comparators; 2017, a discrimination circuit; 2018, a quantization table switch; and 2019, a quantization table group.

The signal flow of this embodiment with the above arrangement will be described below.

The code amount controller 2034 receives, from an I/O 2032, image size information of an image to be output to a printer. The image size may be received from a connected host computer in the format of <the number of horizontal pixels> and <the number of vertical pixels> when an image area has a rectangular shape, or may be received in the format of <the area of an image area> when an image area has a shape other than the rectangular shape. The image size information must be received as header information prior to image information.

The image size information is supplied to the reference code amount calculator 2011. The calculator 2011 calculates a reference (average) code amount per block.

For example, if the memory capacity of the printer is represented by A, and the number of blocks obtained when the input image size is divided into 8×8 blocks is represented by B, A/B corresponds to the reference (average) code amount per block.

Image information for one block line is supplied from the I/O 2032, and is stored in a buffer 2033. The information stored in the buffer 2033 is transmitted to a block circuit 2041. In the compression processor 2035, image information for one divided block is DCT-transformed by a DCT circuit 2042, and the transformed information is sorted by-a zigzag-scan circuit 2043 in the one-dimensional direction in a zigzag pattern from a low-frequency range to a high-frequency range in the block.

Then, the sorted information is quantized by a quantizer 2044 according to quantization table information transmitted from the code amount controller, and quantization coefficients are entropy-encoded by a Huffman encoder 2045. In this manner, codes for one block are stored in a memory 2036.

As information to be transmitted from the code amount controller to the compression processor, an optimal quantization table is selected by the code amount controller using a code amount generated by the compression processor, and the selected quantization table is transmitted. In the next encoding step, encoding is performed using the transmitted quantization table. Therefore, upon execution of first encoding after an image is input, an initial value of a quantization table used in quantization processing must be transmitted to the compression processor. At this time, if a certain fixed initial value is used, a quantization table different from that to be originally selected may be selected.

In this embodiment, at the beginning of encoding, the reference code amount per block calculated by the reference code amount calculator 2011 based on the input image size information is input to the quantization table switch 2018, and an optimal quantization table is selected as the initial value from the quantization table group 2019 storing a plurality of quantization tables in accordance with the input reference code amount. With this arrangement, in the early stage of encoding, a reference quantization table value according to the image size of an input image can be selected as an initial parameter, and efficient encoding processing can be performed.

An encoded area counter 2037 comprises an accumulator for adding encoded blocks, and the number of encoded blocks so far is input to the multiplier 2012.

The multiplier 2012 calculates a product of the reference code amount information per block from the reference code amount calculator 2011 and the number of encoded blocks. For example, when the above-mentioned A/B is the reference code amount per block, if K blocks have been encoded so far, the multiplier 2012 calculates a value (A×K)/B. Upon completion of encoding of all blocks, since K=B, the output from the multiplier becomes A.

A predetermined lower limit setting value (the register 2014) is subtracted from the product output from the multiplier by the subtracter 2013.

The outputs from the multiplier 2012 and the subtracter 2013 represent a value offset downward by a predetermined amount from a reference code amount in the encoded area so far. More specifically, if the lower limit setting value is represented by $\beta$, and K blocks have been processed so far, the subtracter 2013 outputs $((A \times K)/B) - \beta$.

On the other hand, the code amount stored in the memory 2036 is counted by a code amount counter 2038. If the code amount stored in the memory upon completion of encoding of K blocks is represented by Ck, the comparators 2015 and 2016 respectively compare $(A \times K)/B$ and Ck, and $((A \times K)/B) - \beta$ and Ck.

The discrimination circuit 2017 receives these comparison results, and determines which one of the following three relations the code amount Ck satisfies.

$$(A \times K)/B \leq Ck \tag{1''}$$

$$((A \times K)/B) - \beta \leq Ck < (A \times K)/B \tag{2''}$$

$$Ck < ((A \times K)/B) - \beta \tag{3''}$$

If the discrimination circuit 2017 determines that the code amount satisfies relation (1''), it transmits a switching signal to the quantization table switch 2018 so as to select a quantization table for performing a little more coarse quantization from the quantization table group 2019. If the code amount satisfies relation (3''), the circuit 2017 transmits a switching signal to the switch 2018 so as to select a quantization table for performing a little more fine quantization from the quantization table group 2019.

If the code amount satisfies relation (2''), it is determined that the accumulated code amount is almost equal to the reference code amount (falls within an allowable range), and the quantization condition is not changed.

The quantization table selected from the quantization table group 2019 is transmitted from the quantization table switch 2018 to the compression processor 2035, and the subsequent blocks are encoded based on the transmitted information.

The code amount control in this embodiment is the same as that shown in FIG. 5.

24th Embodiment

Figure 43:
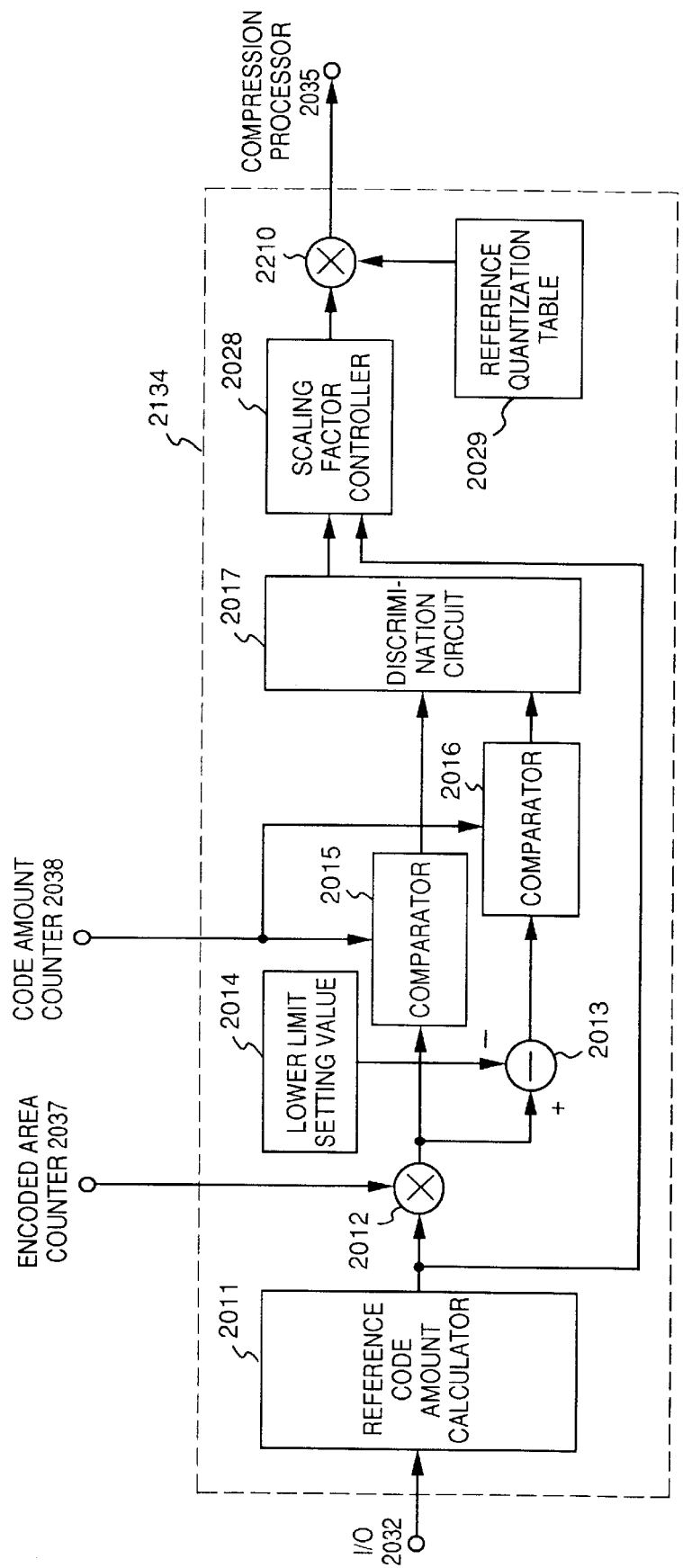
FIG. 43 is a block diagram showing an arrangement of a code amount controller 2134 according to the 24th embodiment of the present invention.

FIG. 43 is a block diagram showing an arrangement of a code amount controller according to the 24th embodiment. In the 24th embodiment, a portion surrounded by a broken line in FIG. 43 corresponds to a code amount controller 2134.

In the 24th embodiment to be described below, the same reference numerals in FIG. 43 denote blocks for performing the same processing as in the 23rd embodiment in FIG. 42, and a detailed description thereof will be omitted.

The 24th embodiment adopts an arrangement wherein image size information is input from the I/O 2032 shown in FIG. 43 to the code amount controller 2134. The reference code amount calculator 2011 calculates a reference code amount on the basis of the input image size information.

When encoding is sequentially performed, a quantization parameter is updated based on accumulated code amount information and accumulated encoded area information as in the 23rd embodiment. In this embodiment, a control method using a scaling factor is used as control means of the parameter.

At the beginning of encoding, in order to obtain an initial value of a quantization table to be transmitted to the compression processor, the reference code amount calculated by the reference code amount calculator 2011 is input to a scaling factor calculator 2028. A reference quantization table 2029 stores reference quantization tables. The scaling factor calculator 2028 sequentially calculates a scaling factor value in accordance with the reference code amount input from the reference code amount calculator 2011.

When an input image size is large, since the reference code amount assumes a large value, relatively coarse quantization steps need be selected, and a relatively large scaling factor value is output. Conversely, when an image size is small, a small scaling factor value is output so as to select fine quantization steps.

The scaling factor value calculated in this manner, and the quantization table value output from the reference quantization table are input to a multiplier 2210, and the quantization value is multiplied with the scaling factor value. The calculated value is output to the compression processor 2035 as an initial value of a quantization table in quantization processing.

Since a discrimination method for increasing/decreasing a code amount in the code amount controller 2134 on the basis of the code amount generated by the compression processor 2035 is the same as that in the above-mentioned 23rd embodiment, a detailed description thereof will be omitted. Based on the discrimination result from the discrimination circuit 2017, the scaling factor calculator 2028 increases the scaling factor value to perform coarse quantization, or decreases the scaling factor value to perform fine quantization. In this manner, the quantization parameter used in the compression processor 2035 is updated, thus controlling the code amount.

With the arrangement of this embodiment, since a plurality of quantization tables need not be prepared, a hardware component for storing the quantization table group can be omitted.

25th Embodiment

When variable-length encoding is used as in the above-mentioned 23rd and 24th embodiments, a variation in code amount can be absorbed, and image quality can be prevented from being deteriorated. However, it is difficult to control the code amount, and the memory may become full of data during encoding.

The 25th embodiment for solving the above problem will be described below.

Figure 44:
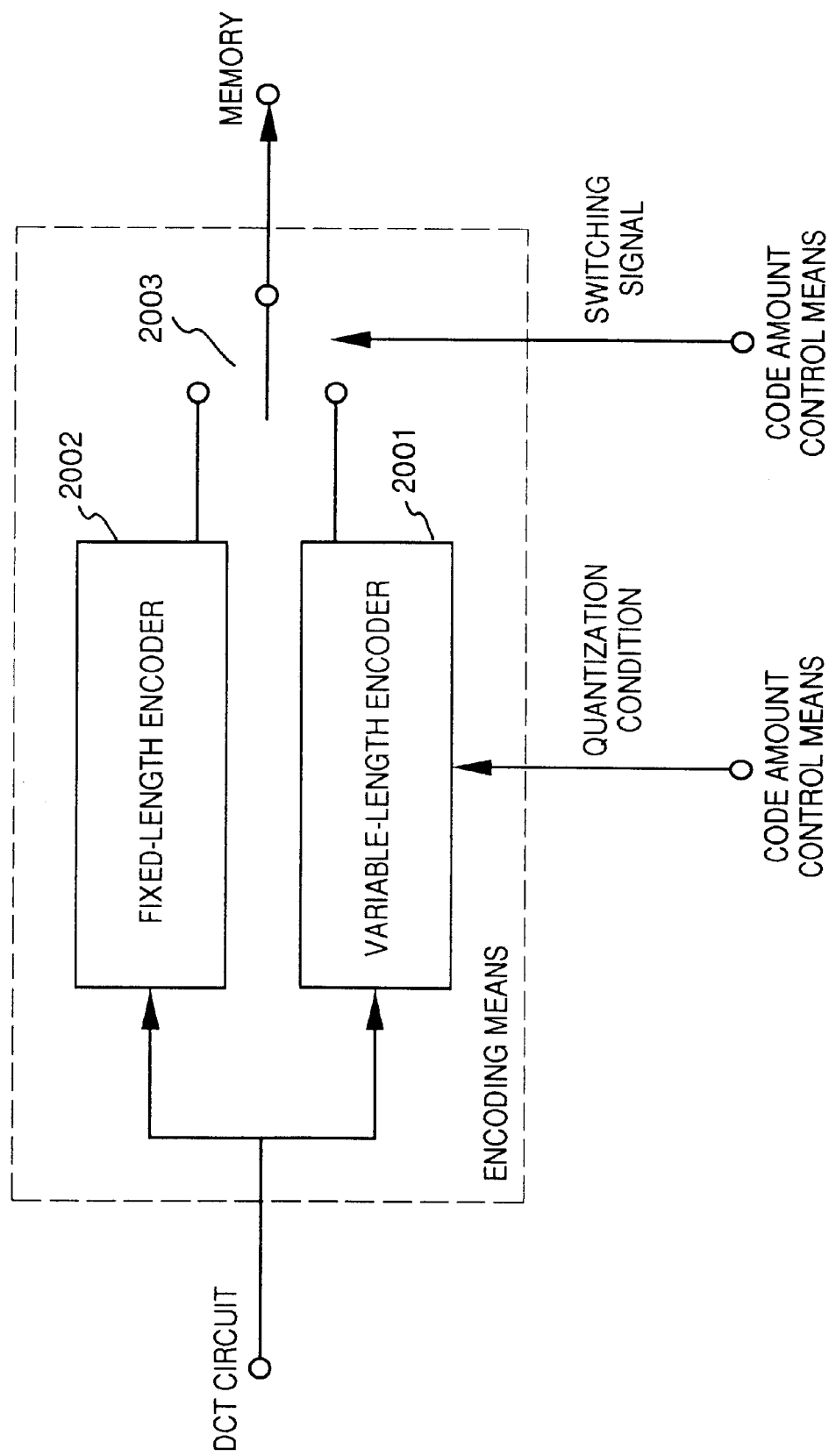
FIG. 44 is a schematic diagram showing encoding means according to the 25th embodiment of the present invention.

FIG. 44 is a schematic diagram of an encoding means according to the 25th embodiment. In FIG. 44, a portion within a broken line represents an encoding means, and the encoding means has a variable-length encoder 2001 for variable-length encoding DCT transform coefficients from a DCT circuit, and a fixed-length encoder 2002 for fixed-length encoding DCT transform coefficients. The variable-length encoder 2001 variably performs encoding depending on a quantization condition set by a code amount control means. A switch 2003 selects one of the outputs from the variable-length encoder 2001 and the fixed-length encoder 2002 in accordance with a switching signal from the code amount control means.

Figure 45:
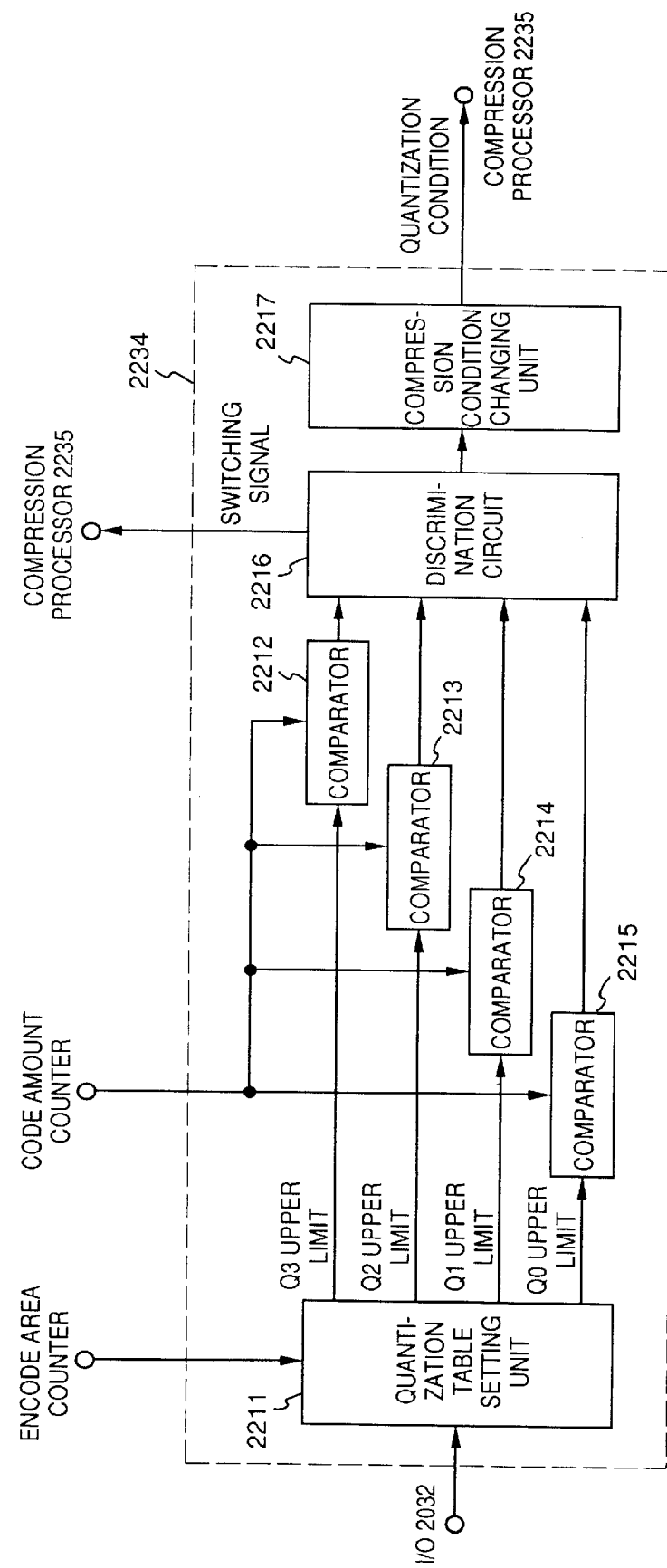
FIG. 45 is a block diagram showing an arrangement of a code amount controller 2234 according to the 25th embodiment.

FIG. 45 is a block diagram showing an arrangement of a code amount controller according to the 25th embodiment. In FIG. 45, reference numeral 2234 denotes a code amount controller of the 25th embodiment. The code amount controller 2234 comprises a quantization table setting unit 2211, comparators 2212 to 2215, a discrimination circuit 2216, and a compression condition changing unit 2217.

Figure 46:
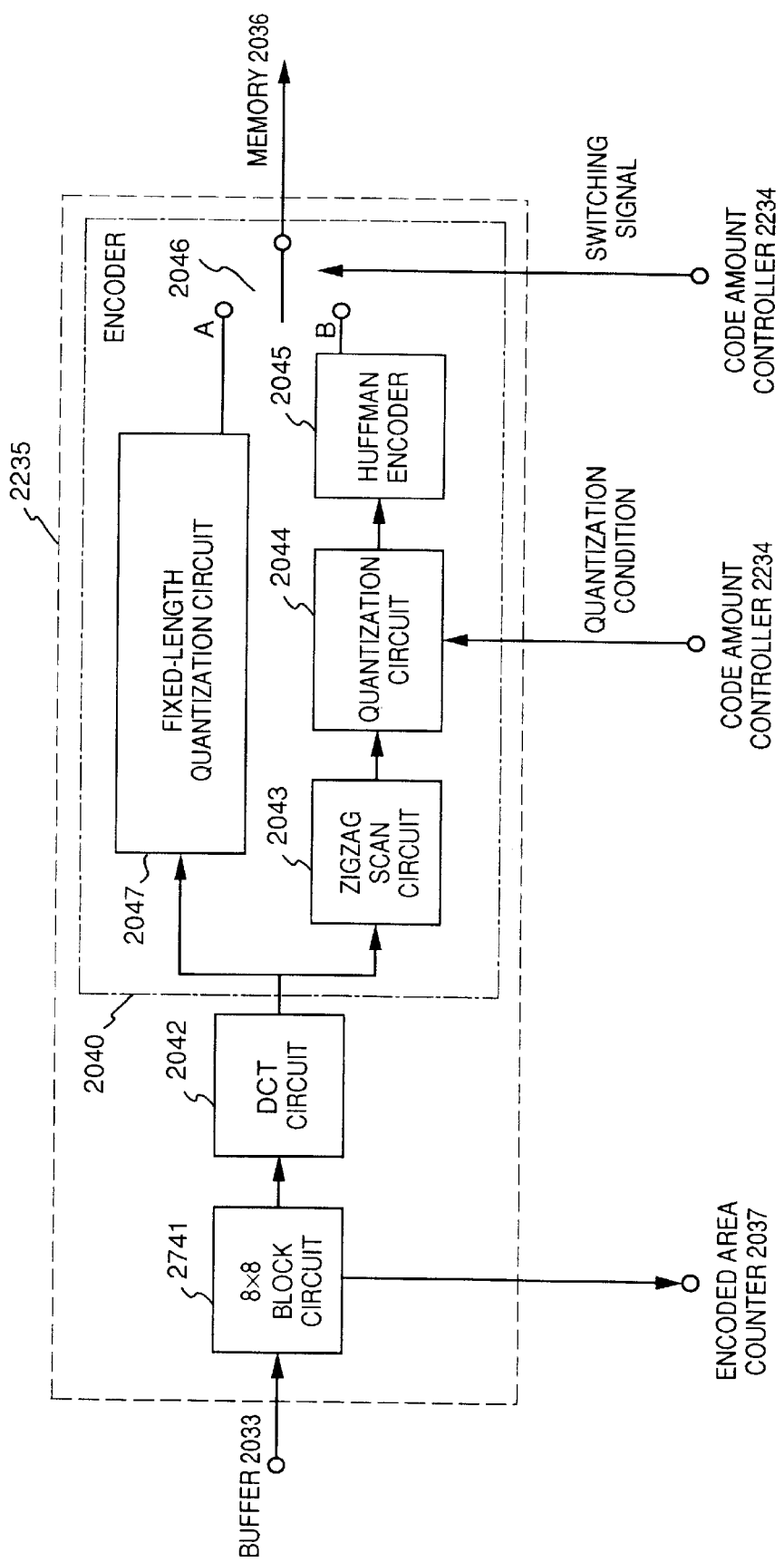
FIG. 46 is a block diagram showing an arrangement of a compression processor 2235 of the 25th embodiment.

FIG. 46 is a block diagram showing an arrangement of a compression processor 2235 according to the 25th embodiment. A portion surrounded by an alternate long and short dashed line corresponds to the encoding means shown in FIG. 44.

In FIG. 46, reference numeral 2041 denotes an 8×8 block circuit; 2042, a DCT circuit; 2043, a zigzag scan circuit; 2044, a quantization circuit; and 2045, a Huffman encoder. A unit including these circuits corresponds to the variable-length encoder 2001 shown in FIG. 44. Reference numeral 2047 denotes a fixed-length quantization circuit, which corresponds to the fixed-length encoder 2002 shown in FIG. 44. Reference numeral 2046 denotes a switch, which corresponds to the switch 2003 shown in FIG. 44.

The signal flow of the above arrangement will be described below.

The code amount controller 2234 receives image size information output from an I/O 2032 to a printer engine 2310. The image size may be received from a connected host computer in the format of <the number of horizontal pixels> and <the number of vertical pixels> when an image area has a rectangular shape, or may be received in the format of <the area of an image area> when an image area has a shape other than the rectangular shape. In any case, the image size information must be received as header information prior to image information.

The image size information is transmitted to the quantization table setting unit 2211, and the total number of blocks (represented by B) is calculated.

Image information for one block line is supplied from the I/O 2032, and is stored in a buffer 2033. The information stored in the buffer is then transmitted to the 8×8 block circuit 2041. In the compression processor 2235, image information for one divided block is DCT-transformed by the DCT circuit 2042. The switch 2046 is connected to a terminal B in an initial state, and DCT transform coefficients are sorted by the zigzag scan circuit 2043 in the one-dimensional direction in a zigzag pattern from a low-frequency range to a high-frequency range in the block.

Subsequently, the quantization circuit 2044 performs quantization processing according to quantization table information from the code amount controller 2234, and quantization coefficients are entropy-encoded by the Huffman encoder 2045. In this manner, codes for one block are stored in a memory 2036.

An encoded area counter 2037 comprises an accumulator for adding encoded blocks, and the number of encoded blocks so far (to be referred to as the number of accumulated encoded blocks hereinafter) is input to the quantization table setting unit 2211.

As described above, the quantization table setting unit 2211 receives the input image size information from the I/O 2032, and accumulated encoded block information from the encoded area counter, and can calculate the ratio of the accumulated encoded blocks to the total number B of blocks.

In other words, percentages of the encoded area to the input total image size can be detected.

Figure 47:
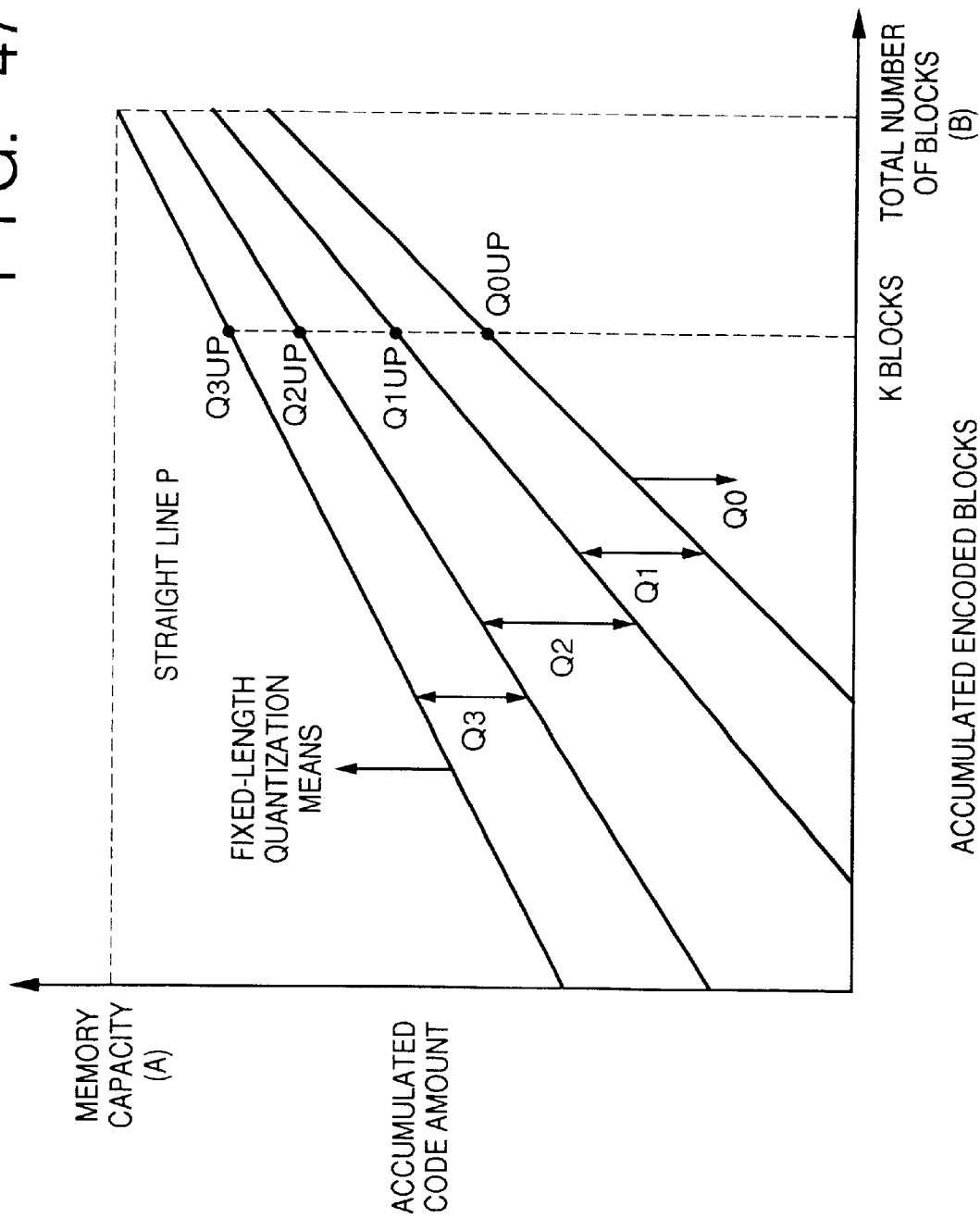
FIG. 47 is a graph for explaining accumulation encoding.

More specifically, a graph shown in FIG. 47 can be set in advance in the form of a ROM. FIG. 47 is a graph for explaining accumulation encoding.

In FIG. 47, the number of accumulated encoded blocks is plotted along the abscissa, and the end point indicates the total number (B) of blocks calculated based on the input image size information.

The accumulated code amount is plotted along the ordinate, and the end point indicates the memory capacity (A) of a printer.

The printer of this embodiment has four different quantization tables for variable-length encoding, and a single quantization table for fixed-length encoding so as to control a code amount. The fixed-length encoder 2002 determines in advance code amount distributions in units of components in a block, and assigns the distributed codes. FIG. 48 shows an example of the numbers of bits to be assigned to codes. Assume that this table is already loaded.

The variable-length encoder 2001 is a means for encoding quantization coefficients by dividing transform coefficients with a quantization step set in a quantization table.

For the sake of easy understanding, the four different quantization tables are numbered with Q3, Q2, Q1, and Q0 in the order from the one having the coarsest quantization steps. These quantization tables are experimentally determined on the basis of the relationship between the code amount and image quality.

Assume that the number of accumulated encoded blocks is K.

The quantization table setting unit 2211 outputs four different signals, i.e., <upper limit value of Q3>, <upper limit value of Q2>, <upper limit value of Q1>, and <upper limit value of Q0>, and these signals are respectively transmitted to the comparators 2212, 2213, 2214, and 2215.

If the input from the code amount counter 2038 is represented by Ck, the upper limit values of the four quantization tables are compared with Ck by the corresponding comparators.

If the upper limit value of Qn is represented by QnUP, the comparison results can be classified into the following five relations:

| | |
|---|---|
| $Q3UP<Ck$ | 1 (fixed-length encoding means) |
| $Q2UP \leq Ck<Q3UP$ | 2 (Table Q3) |
| $Q1UP \leq Ck<Q2UP$ | 3 (Table Q2) |
| $Q0UP \leq Ck<Q1UP$ | 4 (Table Q1) |
| $Ck<Q0UP$ | 5 (Table Q0) |

The discrimination circuit 2216 receives the comparison results, and discriminates which quantizer range the code amount belongs, and whether variable-length quantization processing or fixed-length quantization processing is to be executed. Of the above-mentioned five relations, when relation 1 is satisfied, fixed-length processing is performed; when one of relations 2 to 5 is satisfied, variable-length processing is performed. In the case of the variable-length quantization processing, the compression condition changing unit 2217 selects a suitable table from the stored quantization tables on the basis of the discrimination result from the discrimination circuit 2216, and transmits the selected table to the compression processor 2235.

The discrimination circuit 2216 transmits a switching signal to the switch 2046 (corresponding to 2003 in FIG. 44) of the compression processor 2235, thereby selecting variable-length encoding processing or fixed-length encoding processing.

For example, if the compression processor has the variable-length encoder 2001 alone, even when a plurality of quantization tables are prepared, a generated code amount has high image dependency, and the memory becomes full of the accumulated code amount before all areas to be encoded are completed. As a countermeasure against such overflow, the fixed-length encoding means is provided.

More specifically, when the above-mentioned relation 1 (Q3UP<Ck) is satisfied, the fixed-length encoding is executed from then. Thus, in the subsequent encoding, a code amount can be controlled along a straight line P shown in FIG. 47.

Of course, since the fixed-length encoder 2002 sets a smaller code amount per block than that set by the quantization means of Q3, an unbalanced information amount per block is not eliminated, and image quality is deteriorated. However, if a code amount becomes larger than expected in variable-length encoding, the fixed-length encoder is very effective as a final means.

26th Embodiment

In the 26th embodiment, the same function as in the 23rd embodiment is realized by a simple arrangement different from that in the 23rd embodiment. Since the arrangement of the compression processor of the 26th embodiment is substantially the same as that of the 25th embodiment, except that the fixed-length encoding means is omitted, and the overall arrangement of the 26th embodiment is the same as that of the 23rd embodiment, a detailed description thereof will be omitted. More specifically, no switching signal is input from the code amount controller, and variable-length encoding processing is performed in every case.

Thus, how to prevent overflow of the code amount is the problem. In order to solve this problem, formation of a quantization table is devised.

FIG. 49 shows an example of a quantization table according to the 26th embodiment.

Assume that an accumulated code amount and an accumulated encoded area are set, as shown in FIG. 49. Since comparison means with setting values are the same as those in the arrangement shown in FIG. 45, a description thereof will be omitted. However, a difference from the code amount controller 2234 shown in FIG. 45 is that a discrimination circuit (2216' in the 26th embodiment) does not transmit any switching signal. In this embodiment, in place of the fixed-length encoder 2002, another quantization table is added, and five different quantization tables are held. The quantization tables are numbered with Q4, Q3, Q2, Q1, and Q0 in an order from the one having the coarsest quantization steps.

If the input from a code amount counter is Ck, the upper limit values of the quantization tables are compared with Ck by the corresponding comparators.

If the upper limit value of Qn is represented by QnUP, the comparison results can be classified into the following five relations:

| | |
|---|---|
| $Q3UP<Ck$ | 1 (Table Q4) |
| $Q2UP \leq Ck<Q3UP$ | 2 (Table Q3) |
| $Q1UP \leq Ck<Q2UP$ | 3 (Table Q2) |
| $Q0UP \leq Ck<Q1UP$ | 4 (Table Q1) |
| $Ck<Q0UP$ | 5 (Table Q0) |

The discrimination circuit 2216' receives the comparison results, and discriminates which quantizer range the code amount belongs. In this case, quantization processing of Q4 corresponds to fixed-length quantization processing in the 25th embodiment. FIG. 49 shows an example of the quantization table Q4.

In the quantization processing, DCT transform coefficients are divided with the corresponding values of the quantization table to obtain quantization coefficients (by rounding in practice). However, a component corresponding to a value "0" of the quantization table is masked (not encoded).

In the example shown in FIG. 49, since AC components to be generated are five components alone, a generated code amount can be suppressed below a predetermined value even when Huffman encoding is performed. It is important that a code amount curve is controlled not to extend along the straight line P in FIG. 47 but not to exceed the inclination of the straight line P. If a code amount in a block can be controlled below a predetermined value, there is no fear of overflow.

27th Embodiment

The 27th embodiment is an application of the 26th embodiment, and the code amount in a block can be more easily controlled to be a predetermined value.

Figure 50:
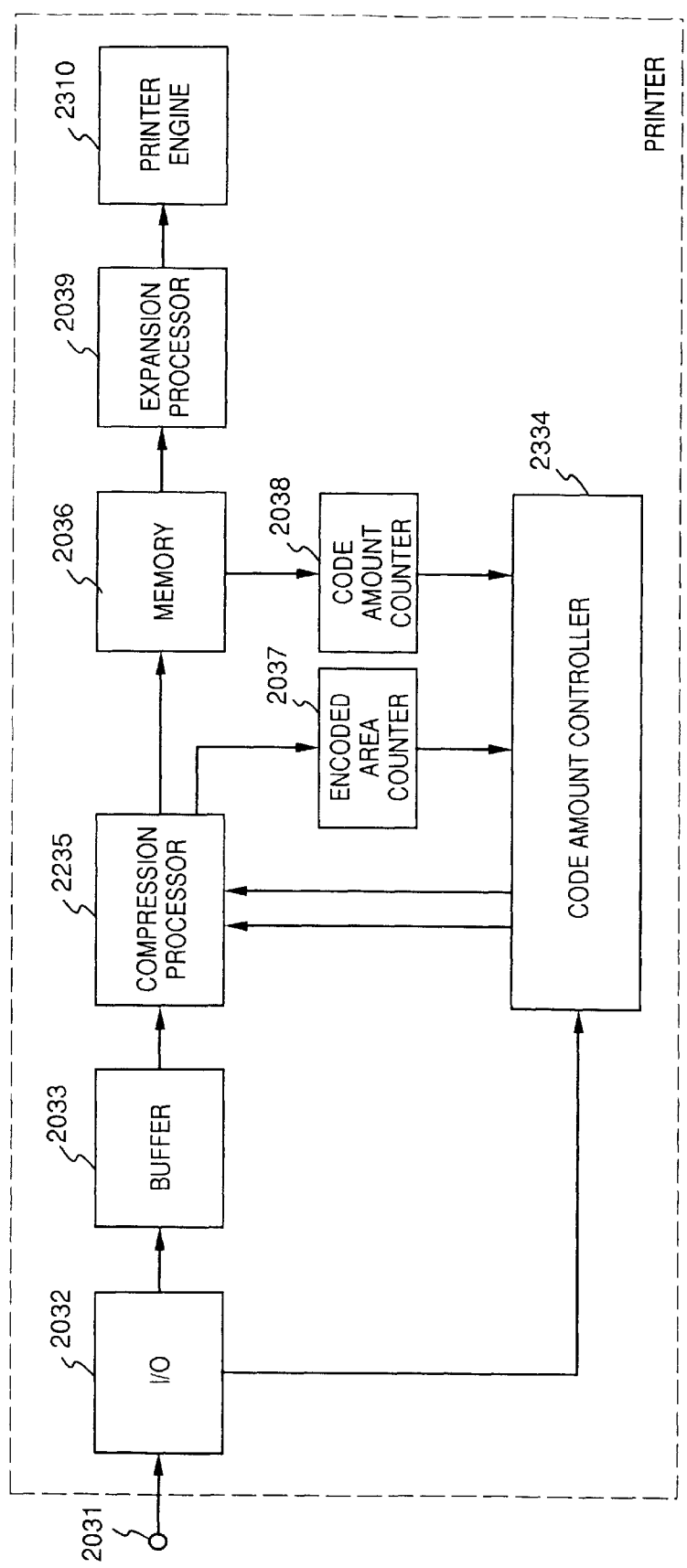
FIG. 50 is a block diagram showing an arrangement of a printer according to the 27th embodiment of the present invention.

FIG. 50 is a block diagram showing an arrangement of a printer according to the 27th embodiment of the present invention. In FIG. 50, reference numeral 2335 denotes a compression processor; and 2334, a code amount controller.

Figure 51:
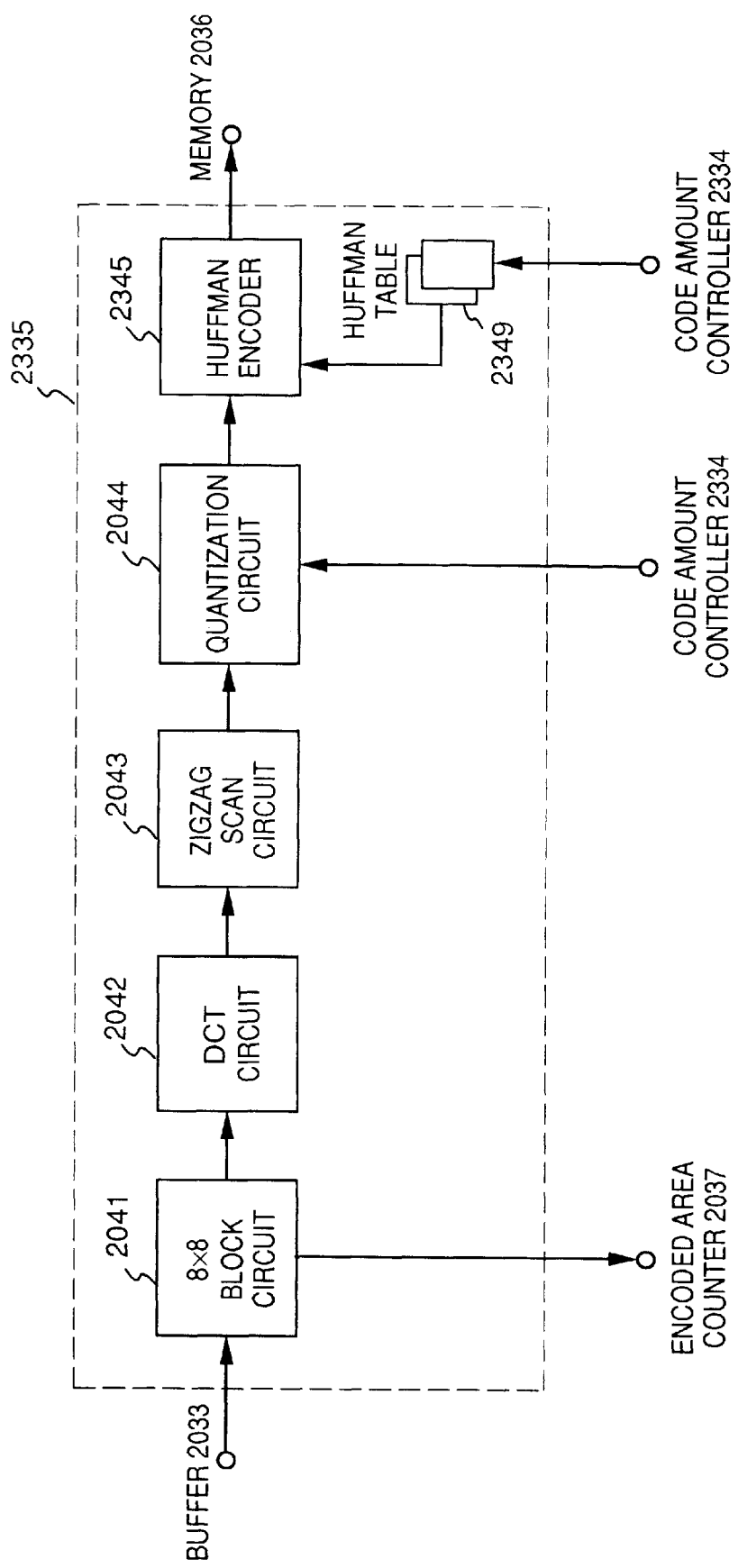
FIG. 51 is a block diagram showing an arrangement of a compression processor 2335 of the 27th embodiment.

FIG. 51 is a block diagram showing an arrangement of the compression processor 2335 of the 27th embodiment. Note that the same reference numerals in FIG. 51 denote the same parts as in the circuit of the compression processor shown in FIG. 3.

In this embodiment, five different quantization tables Q4, Q3, Q2, Q1, and Q0 are switched to control a code amount like in the 26th embodiment (Q4 has the coarsest quantization steps).

In FIG. 51, a difference from FIG. 3 is that a Huffman table is switched in a portion of Huffman encoding. For this purpose, the compression processor comprises a Huffman table 2349 and a Huffman encoder 2345. Therefore, the code amount controller 2334 supplies two kinds of information to the compression processor 2335.

This embodiment will be examined along the above-mentioned JPEG method. In the JPEG method, quantized AC coefficients are classified to "0" and coefficients other than "0", and a group number (SSSS) obtained by grouping coefficients other than "0", i.e., so-called significant coefficients, and a run length (NNNN) of "0"s continuous to a certain significant coefficient obtained by zigzag scan are encoded using two-dimensional Huffman codes. Assume that this method is applied to this embodiment.

The Huffman table is optimized by probability of generation of symbols in consideration of two-dimensional codes SSSS and NNNN. In this embodiment, in order to obtain the smallest code amount using the quantization table Q4, a Huffman table exclusively used for the table Q4 is used in encoding using the table Q4.

More specifically, the Huffman table 2349 shown in FIG. 51 is switched between a quantization mode using the table Q4 and a quantization mode using one of the tables Q3 to Q0 on the basis of a quantization table number transmitted from the code amount controller. In the quantization mode using the table Q4, encoding may be performed without using Huffman codes. However, the code amount can be normally further reduced by Huffman encoding exclusively used for the table Q4.

Of course, the quantization tables and Huffman tables must be easy to read out in a decoding mode. Thus, switching information may be encoded at a switching point of a quantization condition, or the quantization table may be encoded as index information. In the decoding mode, when the quantization table Q4 is used, the Huffman table must also be switched.

28th Embodiment

The 28th embodiment is also an application of the 26th embodiment, and the code amount in a block can be further easily controlled to-be a predetermined value.

This embodiment holds five different quantization tables (Q4 to Q0) as well, and will be examined along the JPEG method.

Figure 52:
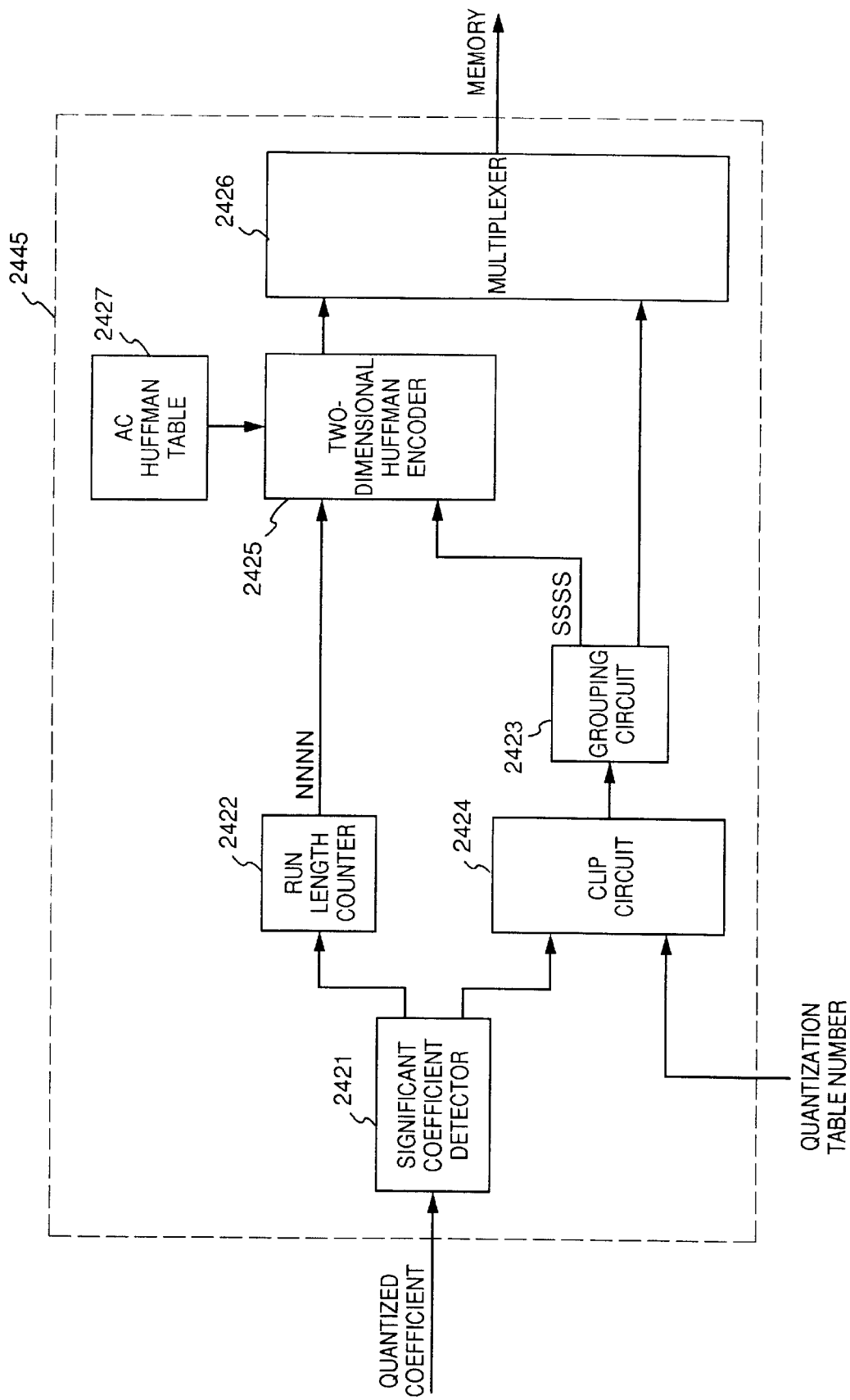
FIG. 52 is a block diagram showing a Huffman encoding circuit according to the 28th embodiment of the present invention.

FIG. 52 is a block diagram showing a Huffman encoding circuit according to the 28th embodiment of the present invention. In FIG. 52, reference numeral 2445 denotes a Huffman encoding circuit. The Huffman encoding circuit 2445 comprises a significant coefficient detector 2421, a run length counter 2422, a clip circuit 2424, a grouping circuit 2423, a two-dimensional Huffman encoder 2425, an AC Huffman table 2427, and a multiplexer 2426.

The significant coefficient detector 2421 classifies quantized AC coefficients into "0" and coefficients other than "0". The run length counter 2422 counts a run length of "0"s continuous to a certain significant coefficient, and transmits the count result to the two-dimensional Huffman encoder 2425 (when a significant coefficient is input to the counter 2422, the value of the counter is reset).

The clip circuit 2424 is the characteristic feature of this embodiment. This circuit receives a serial number of a quantization table from a code amount controller similar to that in the above-mentioned embodiment, and sets upper and lower limits of significant coefficient values in a quantization mode using the table Q4 so as to clip the significant coefficient values (no clip operation is performed for quantization tables other than Q4).

As the upper and lower limits, values of switching points of group numbers SSSS upon grouping in the grouping circuit 2423 are set. More specifically, SSSS in the quantization mode using the table Q4 always has a value equal to or smaller than a certain setting group number.

Significant coefficients other than "0" are grouped into some groups by the grouping circuit 2423, and each group is divided into SSSS and an additional bit for determining a value in the group. SSSS is transmitted to the two-dimensional Huffman encoder 2425, and the additional bit is transmitted to the multiplexer 2426.

The two-dimensional Huffman encoder 2425 performs encoding of SSSS according to the AC Huffman table 2427, and the multiplexer 2426 multiplexes encoded data with the additional bit to form a code of a symbol.

As described above, in this embodiment, significant coefficients are clipped to suppress the value SSSS to be equal to or smaller than a predetermined number, thereby suppressing the code amount to be equal to or smaller than a predetermined value.

Quantization processing may be achieved by a ROM, and the function of this embodiment may be realized in the ROM. For example, values which are not used in other tables may be set in the quantization table Q4, and are input to the ROM so as to output quantized coefficients as clipped values.

29th Embodiment

Normally, since a printer receives various kinds of image information transmitted from a host computer connected thereto, the encoded code amount may often vary. In the 29th embodiment, a variation in code amount can be further eliminated from the above embodiment.

Figure 53:
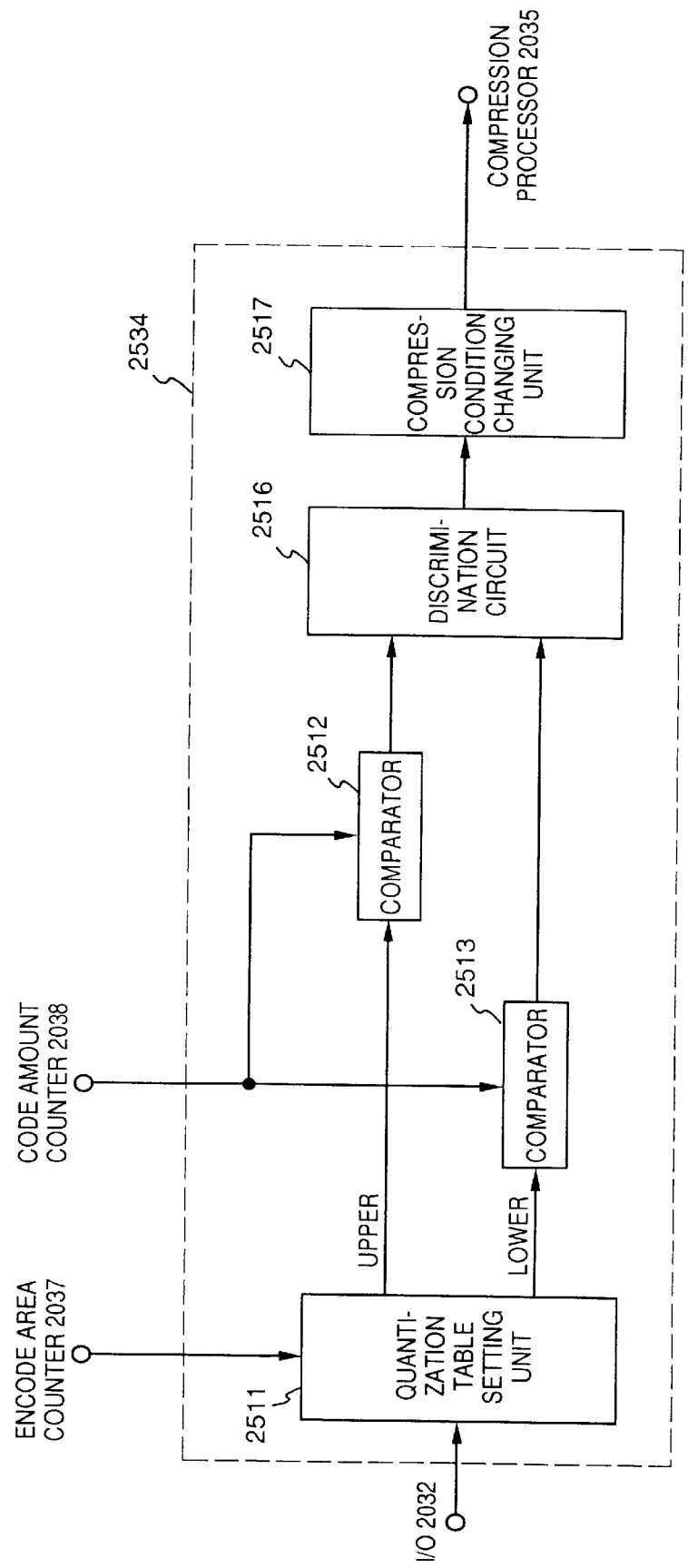
FIG. 53 is a block diagram showing an arrangement of a code amount controller 2534 according to the 29th embodiment of the present invention.

FIG. 53 is a block diagram showing an arrangement of a code amount controller according to the 29th embodiment. In FIG. 53, reference numeral 2534 denotes a code amount controller according to the 29th embodiment. The code amount controller 2534 comprises a quantization table setting unit 2511, comparators 2512 and 2513, a discrimination circuit 2516, and a compression condition changing unit 2517.

The signal flow in the above arrangement will be explained below.

The code amount controller 2534 receives image size information output from the I/O 2032 to a printer. The image size may be received from a connected host computer in the format of <the number of horizontal pixels> and <the number of vertical pixels> when an image area has a rectangular shape, or may be received in the format of <the area of an image area> when an image area has a shape other than the rectangular shape. In any case, the image size information must be received as header information prior to image information.

The image size information is transmitted to the quantization table setting unit 2511, and the total number (B) of blocks is calculated.

Image information for one block line is supplied from the I/O 2032, and is stored in the buffer 2033. The image information is then transmitted to the block circuit 2041. In the compression processor 2035, image information for one divided block is DCT-transformed by the DCT circuit 2042, and the transformed information is sorted by the zigzag scan circuit 2043 in the one-dimensional direction in a zigzag pattern from a low-frequency range to a high-frequency range in the block.

Subsequently, the quantization circuit 2044 performs quantization processing according to quantization table information from the code amount controller, and quantization coefficients are entropy-encoded by the Huffman encoder 2045. In this manner, codes for one block are stored in the memory 2036.

The encoded area counter 2037 comprises an accumulator for adding encoded blocks, and the number of encoded blocks so far (to be referred to as the number of accumulated encoded blocks hereinafter) is input to the quantization table setting unit 2511.

As described above, the quantization table setting unit receives input image size information from the I/O 2032, and accumulated encoded block information from the encoded area counter 2037, and can calculate the ratio of the accumulated encoded blocks to the total number (B) of blocks.

In other words, percentages of the encoded area to the input total image size can be detected.

Figure 54:
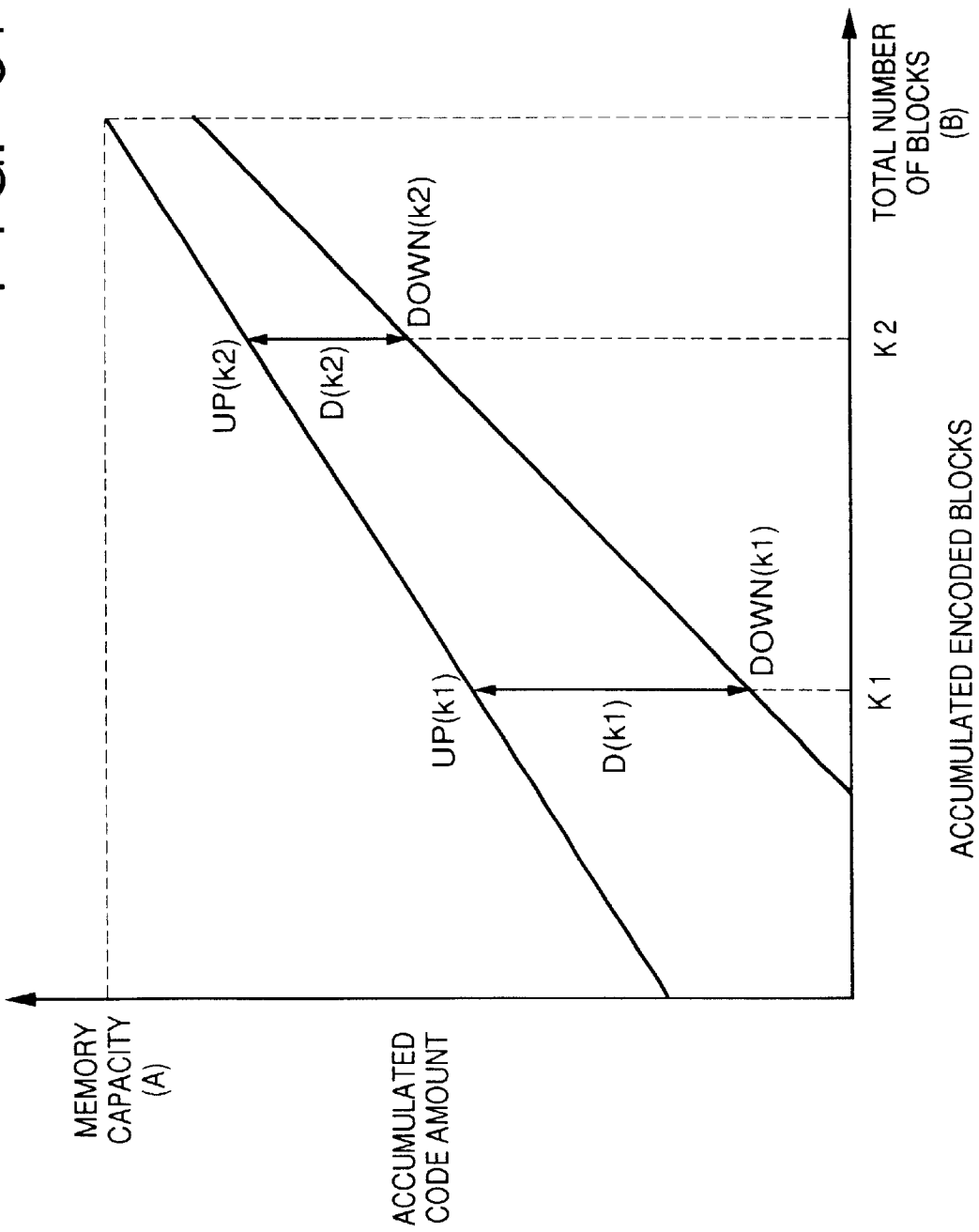
FIG. 54 is a graph showing accumulation encoding according to the 29th embodiment.

More specifically, a graph shown in FIG. 54 can be set in advance in the form of a ROM.

FIG. 54 is a graph for explaining accumulation encoding according to the 29th embodiment.

In FIG. 54, the number of accumulated encoded blocks is plotted along the abscissa, and the end point indicates the total number (B) of blocks calculated based on the input image size information.

The accumulated code amount is plotted along the ordinate, and the end point indicates the memory capacity (A) of a printer.

Assume that the printer according to this embodiment holds three different quantization tables for controlling the code amount. For the sake of easy understanding, the three different quantization tables are numbered with Q2, Q1, and Q0 in the order from the one having the coarsest quantization steps. The table Q1 has a standard quantization table, and is experimentally determined based on the relationship between the code amount and image quality.

Assume that accumulated encoded blocks are K1 blocks.

The quantization table setting unit 2511 outputs two different signals, i.e., <upper limit value> and <lower limit value>, which are respectively transmitted to the comparators 2512 and 2513.

The comparators 2512 and 2513 respectively compare the input values with the accumulated code amount (C(k1)) of the K1 blocks.

If the upper limit value in the K1 blocks is represented by UP(k1), and the lower limit value is represented by DOWN(k1), the discrimination circuit 2516 receives the comparison results, and discriminates which one of the following relations the code amount C(k1) satisfies.

$$UP(k1) \leq C(k1) \tag{1}$$

$$DOWN(k1) \leq C(k1) < UP(k1) \tag{2}$$

$$C(k1) < DOWN(k1) \tag{3}$$

If the discrimination circuit 2516 determines that the code amount satisfies relation (1), the table Q2 is selected to perform coarse quantization for the purpose of decreasing the rate of increase in code amount.

If the code amount satisfies relation (3), the table Q0 is selected to perform a little more fine quantization.

If the code amount satisfies relation (2), it is determined that the accumulated code amount is almost equal to the reference code amount (falls within an allowable range), and the quantization condition is not changed.

Information from the compression condition changing unit 2517 is transmitted to the compression processor, and the subsequent blocks are encoded according to the changed condition.

Assume an arbitrary encoded area K2 (K1<K2) advanced from K1. The upper limit value upon completion of encoding of K2 blocks is represented by UP(k2), and the lower limit value is represented by DOWN(k2).

Also, we have:

$$UP(k1)-DOWN(k1)=D(k1)$$

$$UP(k2)-DOWN(k2)=D(k2)$$

More specifically, the values D correspond to the allowable ranges of the respective encoded area.

As the characteristic feature of this embodiment, the relationship between D(k1) and D(k2) is determined to satisfy:

$$D(k1)>D(k2)$$

Such a relation is set since unbalanced code amounts in units of blocks cancel each other as the number of accumulated encoded blocks increases. A printer normally receives, from, e.g., a connected host computer, a synthesized image of various kinds of image information such as a natural image input from an image reader, an image artificially created by the host computer, character and line images, and the like.

In such a case, in an early stage of encoding, a wide allowable range is set to eliminate unbalanced code amounts, and the code amount can be controlled in the latter half of encoding.

30th Embodiment

Figure 55:
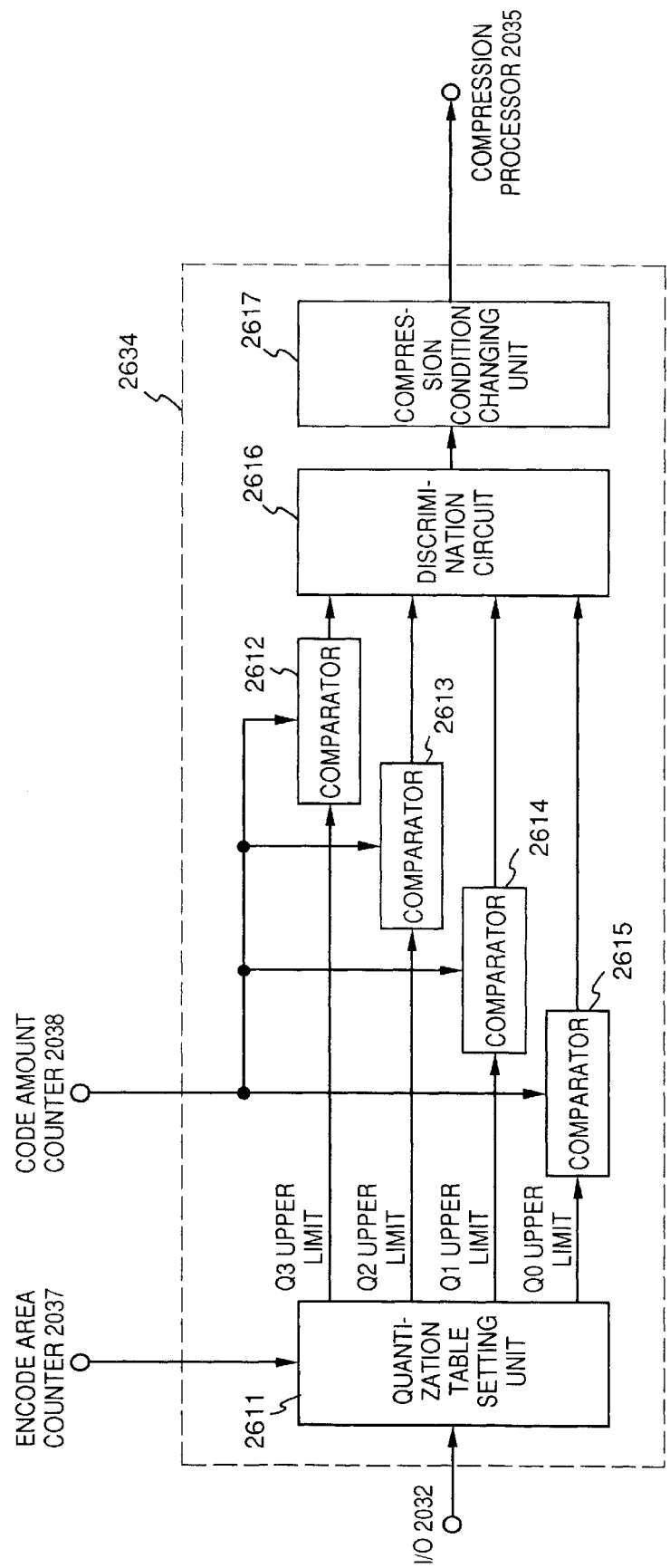
FIG. 55 is a block diagram showing an arrangement of a code amount controller 2634 according to the 30th embodiment of the present invention.

FIG. 55 is a block diagram showing an arrangement of a code amount controller according to the 30th embodiment of the present invention. This embodiment is an application of the 29th embodiment. Other arrangements are the same as those in the 29th embodiment, and a detailed description thereof will be omitted. Assume that this embodiment holds five different quantization tables.

In FIG. 55, reference numeral 2611 denotes a quantization table setting unit, which receives image size information from the I/O 2032, and calculates the total number (B) of blocks. The quantization table setting unit 2611 can also calculate the ratio of the accumulated encoded blocks to the total number (B) of blocks on the basis of accumulated encoded block information received from the encoded area counter 2037. More specifically, a graph shown in FIG. 9 can be set in advance in the form of a ROM. Reference numerals 2612 to 2615 denote comparators; 2616, a discrimination circuit; and 2617, a compression condition changing unit.

Assume that accumulated encoded blocks are K blocks. Also, assume that the held quantization tables are numbered with Q4, Q3, Q2, Q1, and Q0 in the order from the one having the coarsest quantization steps.

The quantization table setting unit 2611 outputs four different signals, i.e., <upper limit value of Q3>, <upper limit value of Q2>, <upper limit value of Q1>, and <upper limit value of Q0>, which are respectively transmitted to the comparators 2612, 2613, 2614, and 2615.

If the input from the code amount counter 2038 is C(k1), the upper limit values of the quantization tables are compared with C(k1) by the corresponding comparators 2612 to 2615.

If the upper limit value of Qn(k1) is represented by QnUP(k1), the comparison results can be classified into the following five relations:

| | |
|---|---|
| $Q3UP(k1) < C(k1)$ | 1 (Table Q4) |
| $Q2UP(k1) \leq C(k1) < Q3UP(k1)$ | 2 (Table Q3) |
| $Q1UP(k1) \leq C(k1) < Q2UP(k1)$ | 3 (Table Q2) |
| $Q0UP(k1) \leq C(k1) < Q1UP(k1)$ | 4 (Table Q1) |
| $C(k1) < Q0UP(k1)$ | 5 (Table Q0) |

The discrimination circuit 2616 receives the comparison results, and discriminates which quantizer range the code amount belongs. The compression condition changing unit 2617 selects a table matching with the discrimination result from the held quantization tables on the basis of the discrimination result of the discrimination circuit 2616, and transmits the selected table to the compression processor 2035.

In the above description, the four comparators 2612 to 2615 are used. However, since the accumulated code amount continuously changes, this embodiment may be realized by a simpler arrangement (e.g., by decreasing the number of comparators).

Assume an arbitrary encoded area K2 (K1<K2) advanced from K1. The upper limit value of Qn upon completion of encoding of K2 blocks is represented by QnUP(k2), and the lower limit value is represented by QnDOWN(k2).

Also, we have:

$$QnUP(k1) - QnDOWN(k1) = QnD(k1)(n=0, 1, 2, 3, 4)$$

That is, the value D corresponds to an allowable range for each encoded area.

As the characteristic feature of this embodiment, QnD(k1)>QnD(k2) is set. More specifically, even when the switching means for the plurality of quantization tables is provided in addition to a means for setting the upper and lower limits as in the 29th embodiment, control is made to narrow the allowable range (in which the quantization table is left unchanged) as the accumulated encoded area approaches the end of encoding, thereby eliminating unnecessary switching operations.

In the above description, code amount control by switching a quantization condition has been exemplified. In this case, the quantization tables must be easy to read out in a decoding mode. Thus, switching information may be encoded at a switching point of a quantization condition, or the quantization table may be encoded as index information.

As described above, it is preferable that each quantization table is experimentally obtained using a typical image to yield a certain code amount.

In this embodiment, a code amount is detected in units of blocks, but may be detected in units of several blocks or in units of block lines.

31st Embodiment

Figure 56:
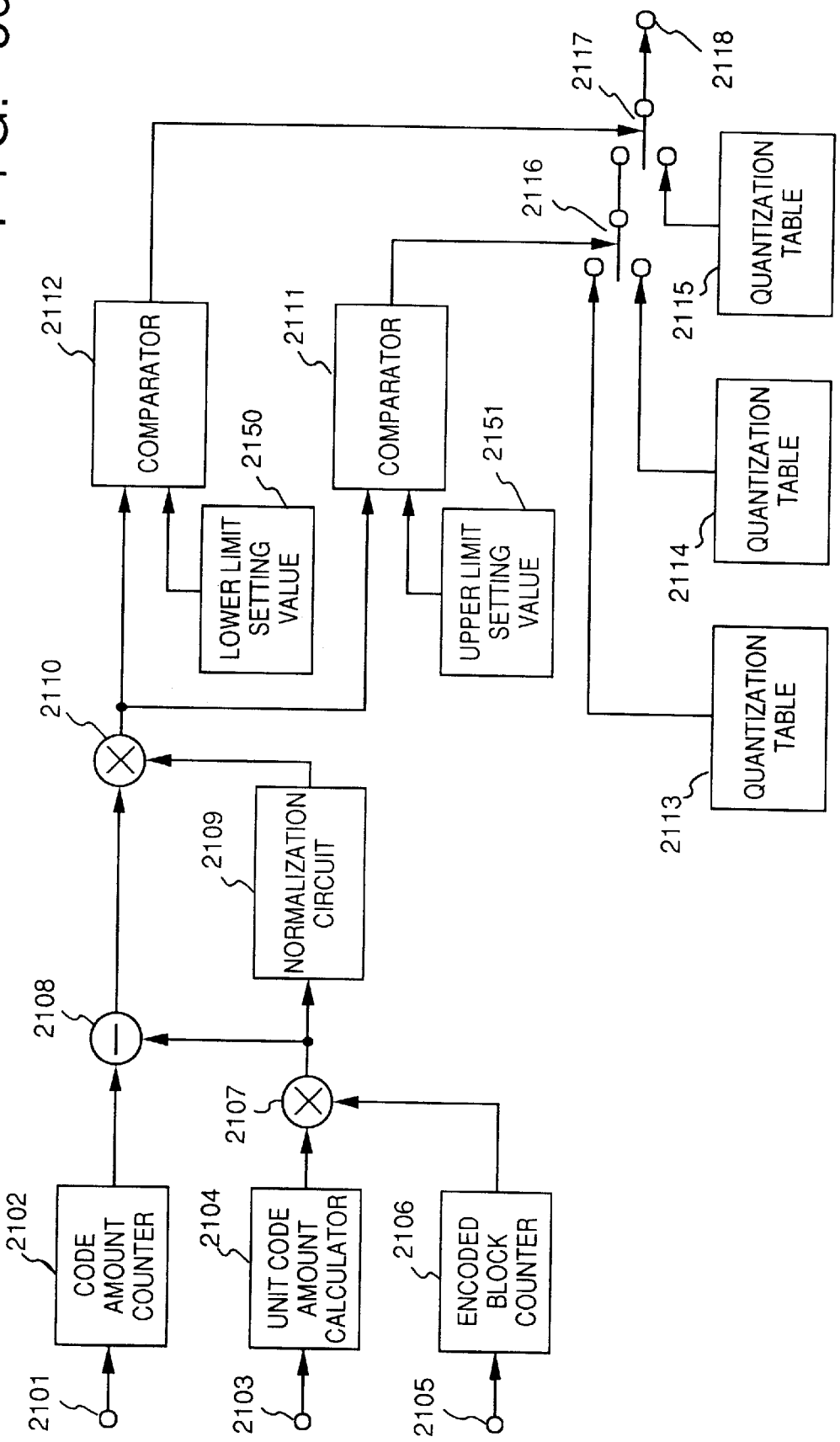
FIG. 56 is a block diagram showing an arrangement of a code amount controller according to the 31st embodiment of the present invention.

FIG. 56 is a block diagram showing an arrangement of a code amount controller according to the 31st embodiment of the present invention. In FIG. 56, reference numeral 2101 denotes a terminal for receiving a code amount generated by encoding processing. Reference numeral 2102 denotes a code amount counter for accumulating and adding the code amounts to obtain an accumulated code amount. Reference numeral 2103 denotes a terminal for receiving an image size. Reference numeral 2104 denotes a unit code amount calculator for calculating a code amount per block to be assigned on the basis of the image size. Reference numeral 2105 denotes a terminal for receiving a pulse every time one block is encoded. Reference numeral 2106 denotes an encoded block counter for counting the number of encoded blocks. Reference numeral 2107 denotes a multiplier for multiplying the output from the unit code amount calculator 2104 and the output from the encoded block counter to output a reference code amount. Reference numeral 2108 denotes a subtracter for subtracting the reference code amount from the output from the code amount counter 2102 to obtain a difference therebetween. Reference numeral 2109 denotes a normalization circuit for normalizing the value of the reference code amount. Reference numeral 2110 denotes a multiplier for multiplying the output from the subtracter 2108 with the output from the normalization circuit 2109.

Reference numeral 2111 denotes a first comparator for comparing the output from the multiplier 2110 with an upper limit setting value; and 2112, a second comparator for comparing the output from the multiplier 2110 with a lower limit setting value. Reference numerals 2113, 2114, and 2115 denote first, second, and third quantization tables, respectively. Reference numeral 2116 and 2117 denote first and second selectors for selectively outputting the quantization tables. Reference numeral 2118 denotes a terminal for outputting a quantization step.

Figure 57:
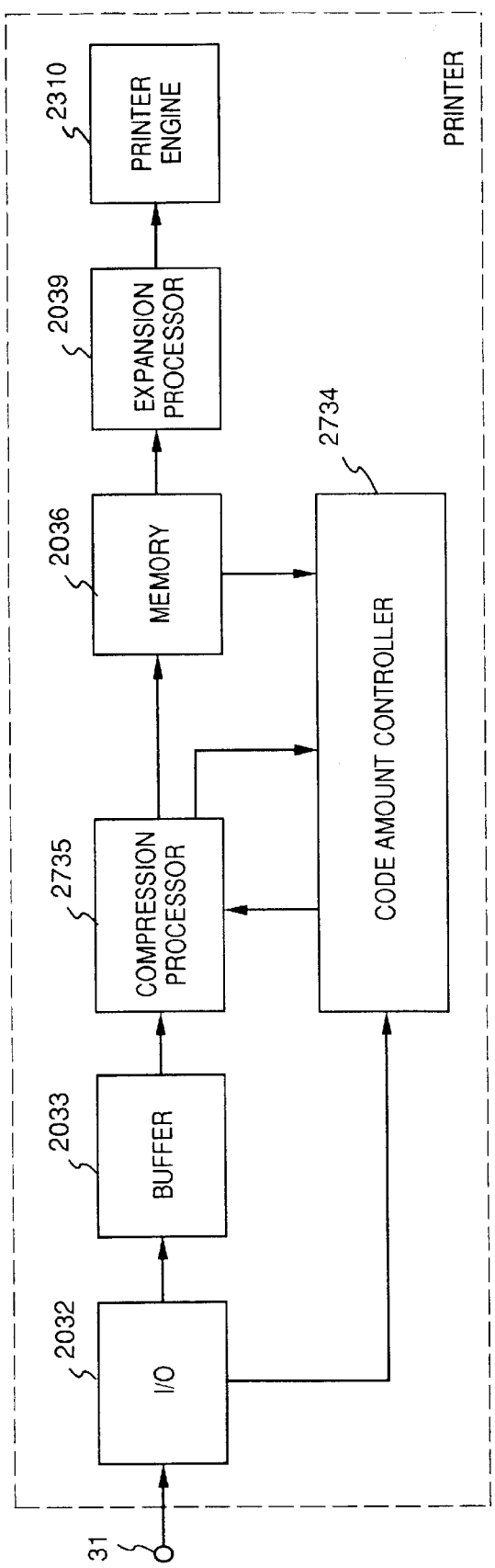
FIG. 57 is a block diagram showing an arrangement of a printer according to the 31st embodiment.

FIG. 57 is a block diagram showing an arrangement of a printer according to the 31st embodiment. A difference from the printer arrangement shown in FIG. 1 of the first embodiment is that an encoded area counter 17 and a code amount counter 18 are omitted. Therefore, in FIG. 57, reference numeral 2735 denotes a compression processor according to the 31st embodiment; and 2734, a code amount controller shown in FIG. 56.

Figure 58:
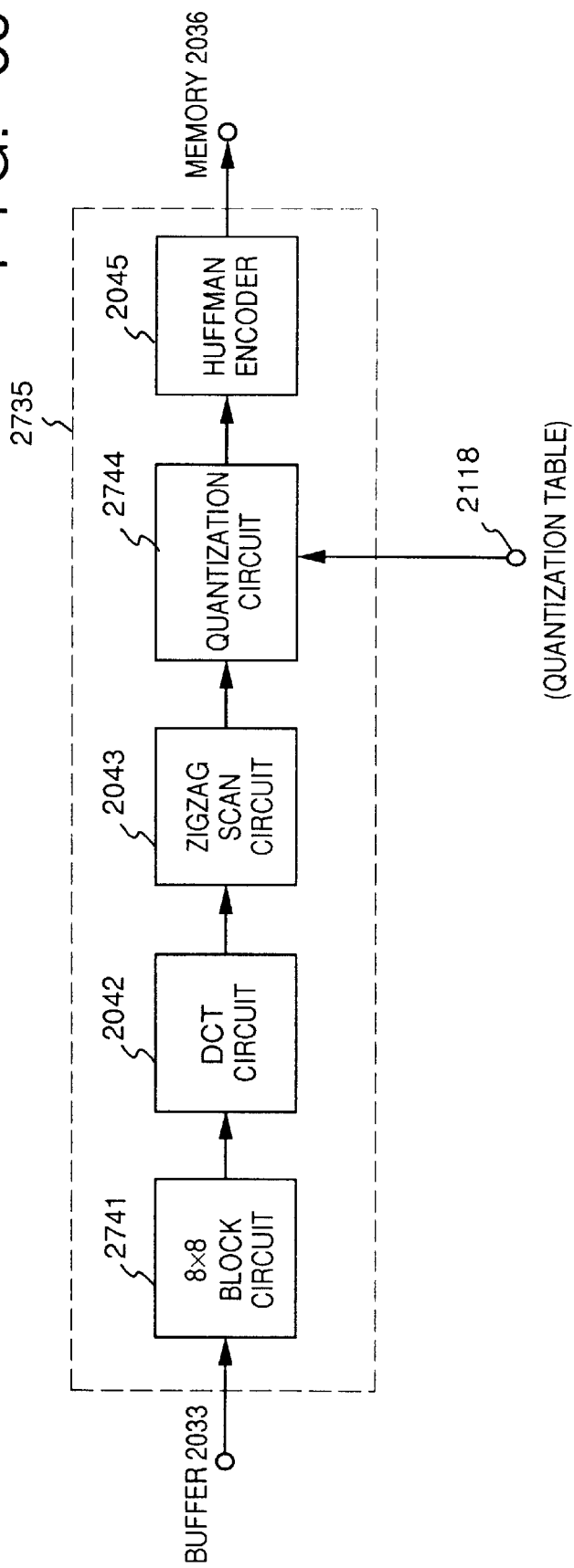
FIG. 58 is a block diagram showing an arrangement of a compression processor 2735 shown in FIG. 57.

FIG. 58 is a block diagram showing an arrangement of the compression processor 2735 shown in FIG. 57. A portion surrounded by a broken line corresponds to the compression processor 2735. Reference numeral 2741 denotes an 8×8 block circuit according to the 31st embodiment.

The signal flow in the above-mentioned arrangement will be described below.

The code amount controller 2734 receives, from an I/O 2032, size information of an image to be output to the printer. The size information is received from a host computer (not shown) as header information prior to image information in the format of <the number of horizontal pixels> and <the number of vertical pixels> or <an area of an image region>. The image size information is supplied to the unit code amount calculator 2104 via an input terminal 2031 (FIG. 57), and a unit code amount per block is calculated by the calculator 2104.

For example, if the memory capacity of a memory 2036 is represented by A, the upper limit setting value is represented by a, and the number of blocks obtained when the input image size is divided into 8×8 blocks is represented by B, the unit code amount per block is $(A-\alpha)/B$.

Image data is temporarily stored in the buffer 2033 via the I/O 2032, and is then supplied to the 8×8 block circuit 2741. In the compression processor 2735, image information for one block is DCT-transformed by a DCT circuit 2042, and is sorted by a zigzag scan circuit 2043 in the one-dimensional direction in a zigzag pattern from a low-frequency range to a high-frequency range in the block.

Subsequently, quantization processing is performed by a quantization circuit 2744 according to a quantization step supplied from the code amount controller. Quantized coefficients are entropy-encoded by a Huffman encoder 2045, and codes for one block are stored in the memory 2036. At the same time, information of a code amount generated by the encoding processing is supplied to the code amount counter 2102, and is counted as an accumulated code amount.

Every time one block is encoded, the Huffman encoder 2045 outputs one pulse, and the pulse is input to the encoded block counter 2106. The encoded block counter 2106 counts the input pulses, thereby counting the number of encoded blocks. The counter 2106 outputs the count value to the multiplier 2107.

The multiplier 2107 calculates a product of the information of the unit code amount per block output from the unit code amount calculator 2104 and the number of encoded blocks.

For example, assuming that the above-mentioned $(A-\alpha)/B$ is the unit code amount per block, and K blocks have been encoded so far, a value $(A-\alpha) \times K/B$ is calculated, and is output as a reference code amount. Upon completion of encoding of all blocks, since K=B, the reference code amount becomes $A-\alpha$.

The reference code amount is supplied to the subtracter 2108, and is subtracted from the accumulated code amount output from the code amount counter 2102. The difference is supplied to the multiplier 2110. The reference code amount is also supplied to the normalization circuit 2109, and is normalized by the normalizing circuit. The normalized value is then supplied to the multiplier 2110.

In this case, as normalization processing, the maximum value of the reference code amount is converted to "1". As has been described above, the reference code amount after encoding of all blocks is ended is $A-\alpha$, and is the maximum value. For example, the maximum value is multiplied with $\frac{1}{2}(A-\alpha)$, and 0.5 is added to the product, thus normalizing the maximum value to "1". The normalized value is multiplied with the output from the subtracter 2108 by the multiplier 2110.

The product is compared with the upper limit setting value (a) and the lower limit setting value ($-\alpha$) by the first and second comparators, respectively. According to the comparison results, one of the first, second, and third quantization tables is selected, and a quantization step is output from the terminal 2118. The quantization step output from the first quantization table is coarser than those of the remaining two tables, and the quantization step output from the third quantization table is finer than those of the remaining two tables.

Therefore, when identical image data is quantized and encoded, the code amount is decreased if the first quantization table is used; the code amount is increased in the third quantization table is used.

If the output (accumulated code amount) from the code amount counter 2102 upon completion of encoding up to K blocks is represented by Ck, and the output from the multiplier 2110 at that time is represented by Dk, the following relationship is established:

$$Dk=(Ck-(A-\alpha) \times K/B) \times (0.5+K/2B)$$

When the accumulated code amount Ck exceeds $(A-\alpha) \times K/B$, Dk>0 is satisfied; when the accumulated code amount Ck is smaller than $(A-\alpha) \times K/B$, Dk<0 is satisfied. In these cases, as the difference between the accumulated code amount and the reference code amount becomes larger, the absolute value of Dk increases.

Thus, a code amount generated in encoding processing is controlled by setting the selectors 2116 and 2117 to select the quantization table 2113 when $Dk \geq \alpha$; the quantization table 2114 when $\alpha > Dk > -\alpha$; and the quantization table 2115 when $-\alpha \geq Dk$. In this manner, image data can be encoded to maintain a relation $|Dk| < \alpha$. Upon completion of encoding of all blocks, $Dk=Ck-(A-\alpha)$ is established, and since $|dk| < \alpha$, $A > Ck > A-2\alpha$ is satisfied.

This means that the accumulated code amount is smaller than the memory capacity of the memory 2036, and falls within a predetermined range (a range twice the upper limit setting value $\alpha$).

Figure 59:
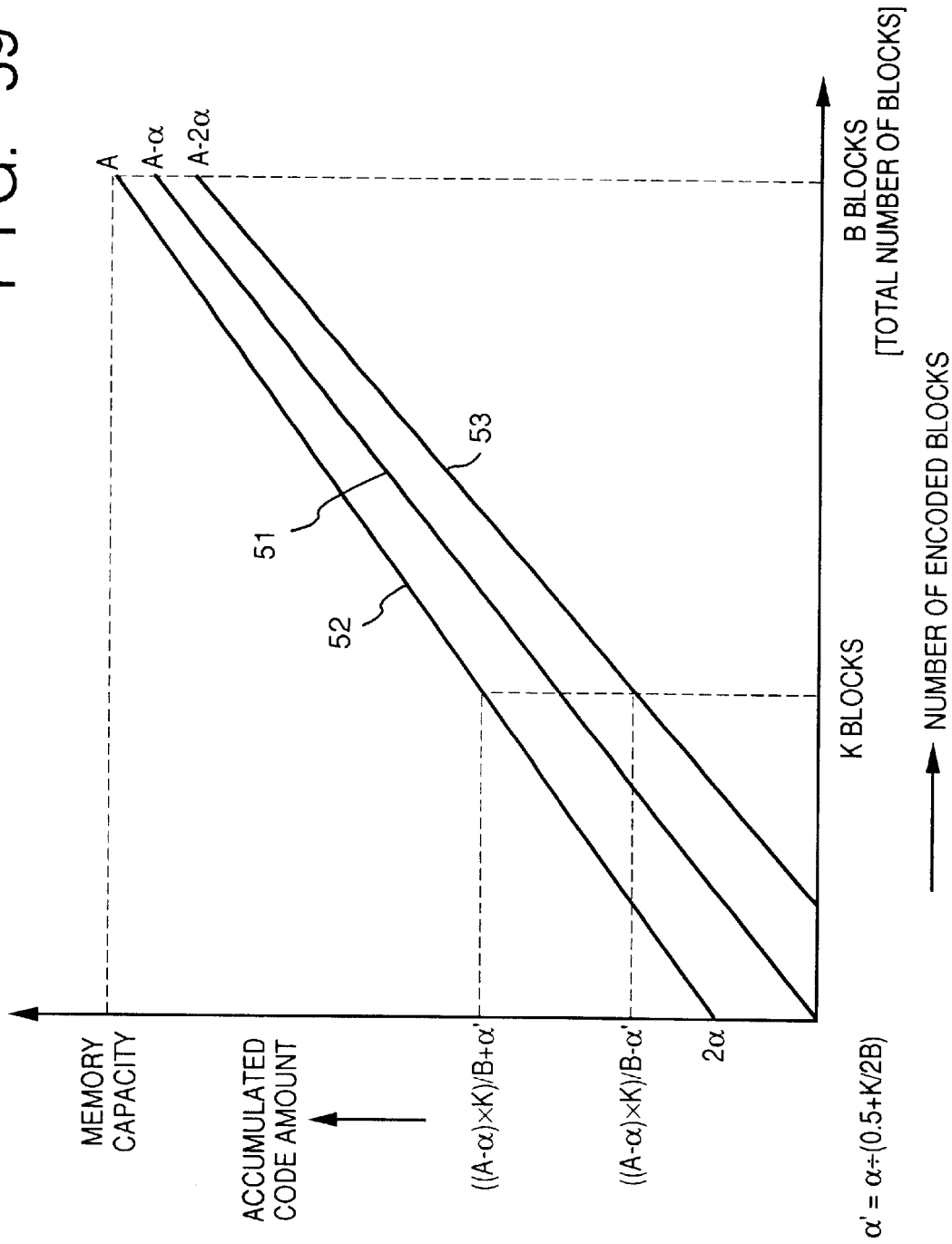
FIG. 59 is a graph showing the relationship between the accumulation code amount and the number of encoded blocks according to the 31st embodiment.

FIG. 59 illustrates the above-described control in an easy-to-understand manner.

FIG. 59 is a graph showing the relationship between the accumulated code amount and the number of encoded blocks according to the 31st embodiment.

In FIG. 59, the number of encoded blocks is plotted along the abscissa, and the end point indicates the total number (B) of blocks calculated based on the input image size information.

The accumulated code amount is plotted along the ordinate, and the end point indicates the memory capacity (A) of the printer. A straight line 51 passing the origin, and having an inclination $(A-\alpha)/B$ represents the reference code amount.

A curve 52 indicates a boundary at which the comparison result from the first comparator 2111 is switched. More specifically, the relationship between the output Dk from the multiplier 2110 and the upper limit setting value $\alpha$ is reversed to have this curve as a boundary. Similarly, a curve 53 indicates a boundary at which the comparison result from the second comparator 2112 is switched, and the relationship between the output Dk from the multiplier 2110 and the lower limit setting value $-\alpha$ is reversed to have this curve as a boundary.

The accumulated code amount at the beginning of encoding is located at the origin, and encoding is performed using the second quantization table. Along with encoding, the accumulated code amount is moved in the right upward direction. In this case, the inclination of the moving curve depends on the code amount of each block. Ideally, it is desirable that the accumulated code amount is moved to the end along the straight line 51 representing the reference code amount. However, in practice, such an ideal state is rarely established since image data suffers from unbalance of information.

After movement, as long as the accumulated code amount falls within a region sandwiched between the curves 52 and 53, encoding is continued using the second quantization table 2114. When the accumulated code amount reaches a region above the curve 52, the quantization table is switched to the first quantization table-to decrease the code amount. Conversely, when the accumulated code amount reaches a region below the curve 53, the quantization table is switched to the third quantization table to increase the code amount.

As described above, encoding is performed so that the accumulated code amount falls within the region between the curves 52 and 53.

Note that the patterns of the curves 52 and 53 depend on the processing in the normalization circuit 2109. In particular, the coordinate positions at the right end of the curves 52 and 53 are determined by the output value from the normalization circuit 2109 at the end of encoding, and when the output value is m (for $0<m\leq 1$), the coordinates are respectively (B, A$-\alpha+\alpha$/m) and (B, A$-\alpha-\alpha$/m). The coordinate position at the left end of the curve 52 is determined by the output value from the normalization circuit 2109 at the beginning of encoding, and when the output value is n, the coordinate position is (0, $\alpha$/n).

Therefore, when the values m and n are appropriately set, a transition of the code amount from the beginning to the end of encoding can be caused to fall within a certain range.

A quantization table used in decoding must correspond to one used in encoding. Therefore, needless to say, information associated with the quantization table used in encoding must be multiplexed on encoded data, and the multiplexed data must be stored in the memory 2036.

In this embodiment, for the sake of simplicity, the upper and lower limit setting values have an equal absolute value, but may have different values.

32nd Embodiment

The characteristic feature of the 32nd embodiment is that a means for multiplying the difference between the accumulated code amount and the reference code amount with a coefficient comprises a shifter. This arrangement is available when the coefficient to be multiplied is expressed by a power of 2.

In this embodiment, an arrangement for switching two coefficients (each expressed by a power of 2) will be described below. Since other arrangements can employ those in the above embodiments, a detailed description thereof will be omitted.

Figure 60:
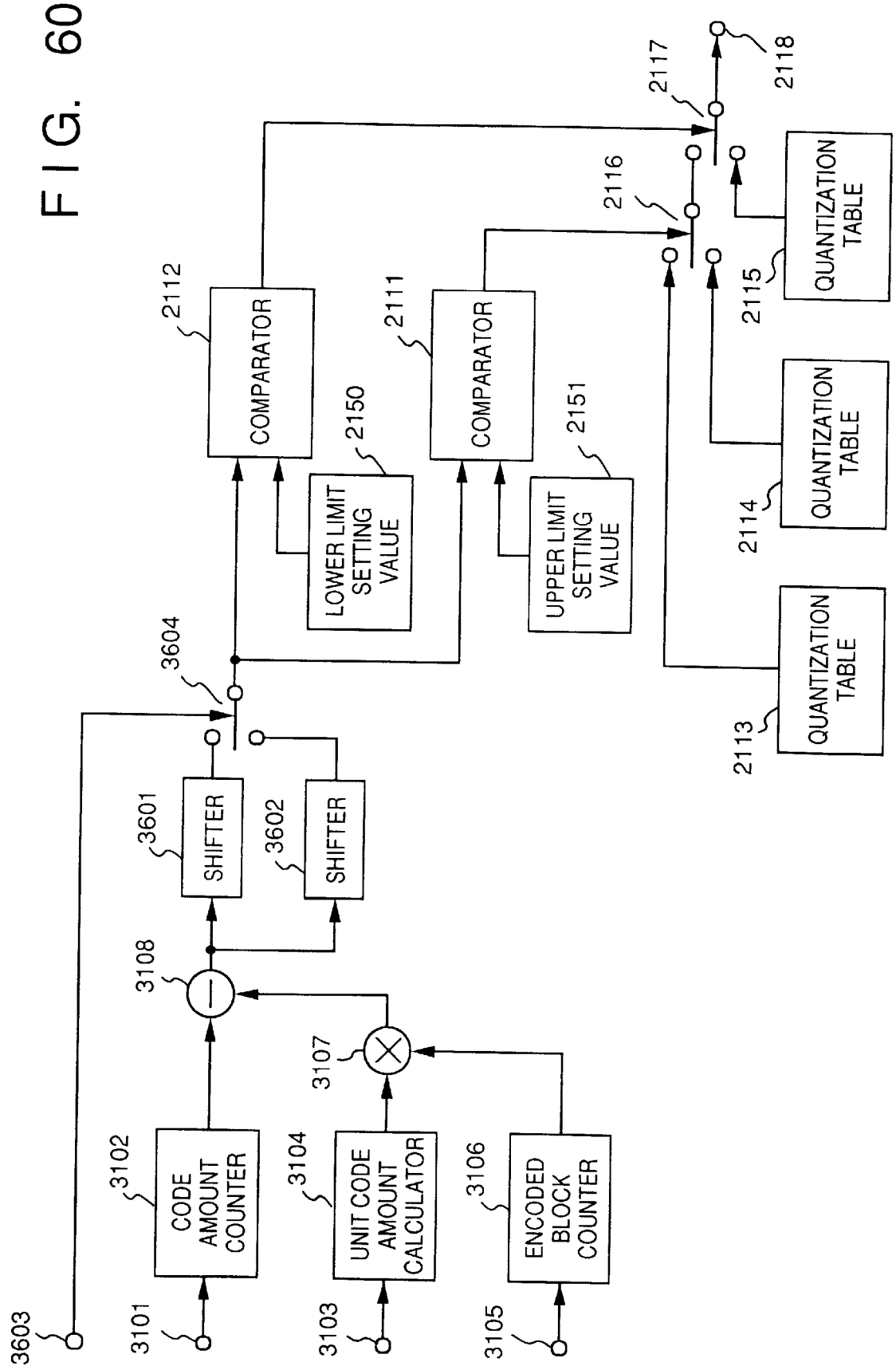
FIG. 60 is a block diagram showing an arrangement of a code amount controller according to the 32nd embodiment of the present invention.

FIG. 60 is a block diagram showing an arrangement of a code amount controller according to the 32nd embodiment of the present invention. In FIG. 60, reference numeral 3601 denotes a first shifter for realizing multiplication with the first coefficient; and 3602, a second shifter for realizing multiplication with the second coefficient. Reference numeral 3603 denotes a terminal for receiving a control signal for switching an encoding operation. Reference numeral 3604 denotes a selector for selecting one of the output values from the first and second shifters.

Other blocks 2101 to 2108, and 2112 to 2118 are the same as those in FIG. 56 described in the 31st embodiment, and a detailed description thereof will be omitted.

In the 31st embodiment, a value to be multiplied with the output from the subtracter 2108 is a coefficient whose value changes along with encoding. However, this embodiment uses a coefficient whose value does not change during an encoding operation.

Figure 61:
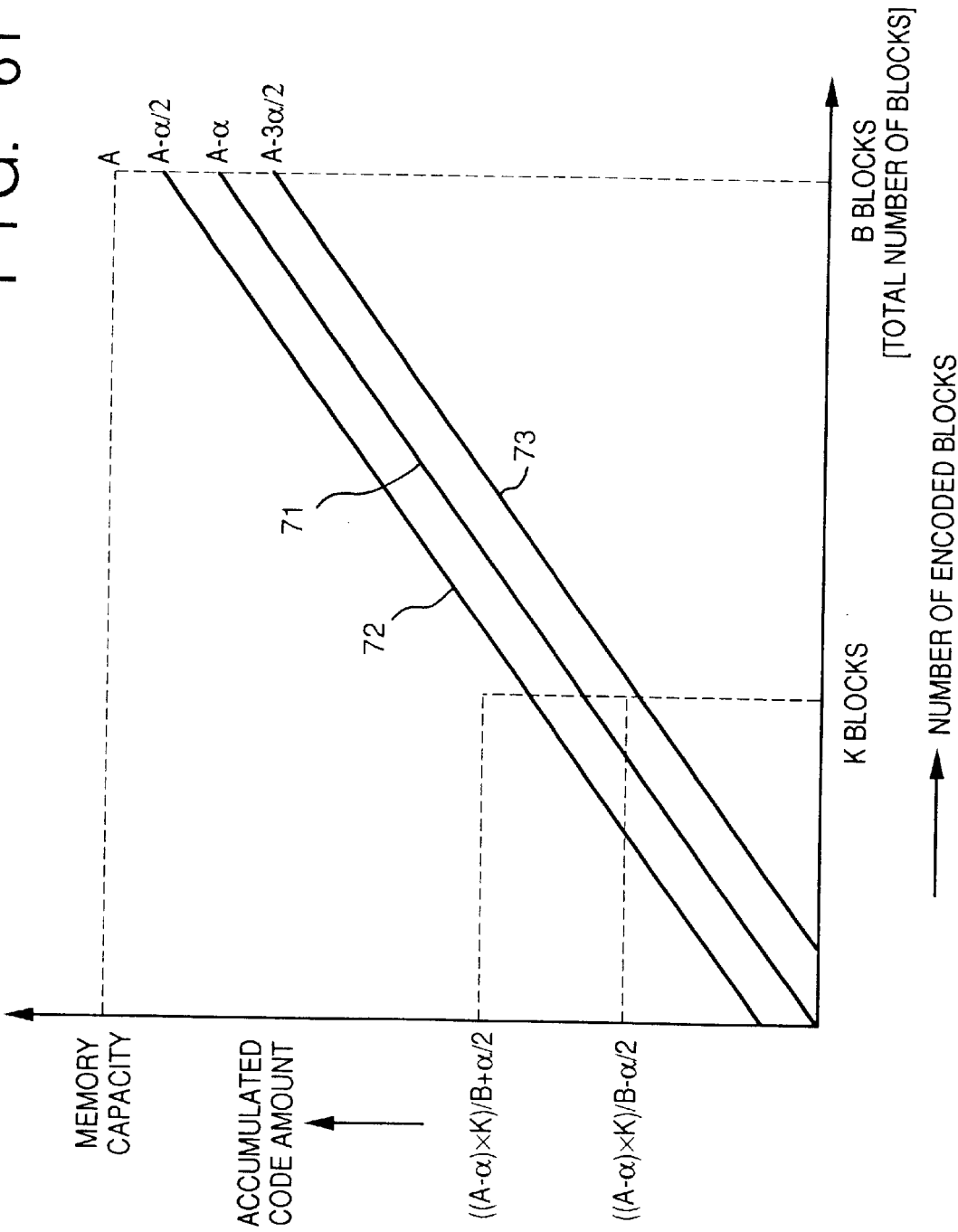
FIG. 61 is a graph showing the relationship between the accumulation code amount and the number of encoded blocks according to the 32nd embodiment.

Thus, as the first encoding operation, normal encoding is performed using the first shifter 3601 alone. In this case, the input terminal 3603 receives a control signal indicating the first encoding operation, and the selector 3604 selects the output from the first shifter. If the first shifter realizes a×2 calculation, the accumulated code amount shifts to fall within a range sandwiched between straight lines 72 and 73, as shown in FIG. 61 (a straight line 71 passing the origin represents the reference code amount).

In the normal encoding operation, the coefficient is set so as not to frequently switch the quantization tables. For this reason, the quantization table may not be switched at all for a certain kind of image.

In contrast to this, in an encoding operation for confirming the operations of the comparators 2111 and 2112, the quantization tables 2113 to 2115, and the selectors 2116 and 2117, it is convenient that the quantization tables are frequently switched for small image data. Thus, as the second encoding operation, encoding for confirming the operations is performed using the second shifter 3602 alone. In this case, the input terminal 3603 receives a control signal indicating the second encoding operation, and the selector 3604 selects the output from the second shifter. For example, if the second shifter realizes a×32 calculation, a region where the accumulated code amount shifts becomes $\frac{1}{16}$ of that in the first encoding operation, and is almost equal to the straight line 71 on the graph shown in FIG. 61. Therefore, since the quantization table is switched only when the accumulated code amount is shifted from the reference code amount only slightly, the switching operation is frequently performed.

In either of the first and second encoding operations, a final accumulated code amount can fall within the predetermined capacity of the memory 2036 as in the first embodiment, except that the two encoding operations have different switching frequencies of the quantization tables.

The description of this embodiment refers to the "first and second shifters" for the sake of convenience. However, in an actual circuit, these shifters may often be realized by a wiring pattern alone. The function of this embodiment may be realized by a barrel shifter having functions of both the first and second shifters and the selector 3604.

As described above, according to the present invention, in a printer having a memory for storing image information, since a code amount is controlled so that variable-length codes of an image fall within a predetermined memory capacity in a single pass, compression processing corresponding to unbalanced image information can be satisfactorily realized.

Note that the present invention can be applied to either a system constituted by a plurality of devices or an apparatus consisting of a single device. Also, the present invention can be applied to a case wherein the invention is achieved by supplying a program to a system or apparatus using a computer.

The amount of input image data may be automatically detected by recognizing an original using, e.g., an image scanner.

Since the amount of input image data changes depending on not only the size of an original image but also the resolution upon reading of an original, encoding may be controlled based on the resolution.

As a printer, the present invention is not limited to a laser beam printer as a so-called page printer, but may be applied to a printer having a bubble jet head for ejecting ink droplets by means of film boiling caused by heat energy.

The present invention is not limited to the above-mentioned embodiments, and various modifications and applications may be made within the scope of the claims.

Particularly, the scope of the present invention includes combinations of the ideas used in the above-mentioned embodiments.

What is claimed is:

1. An image processing apparatus comprising:

encoding means for dividing an image into blocks and performing variable-length encoding for the image;

storing means for storing encoded data obtained by said encoding means; and control means for controlling a compression condition of said encoding means based on a result of comparing a preset code amount of an accumulated encoded area with an accumulated code amount, so that the amount of the encoded data falls within a predetermined range by a single encoding operation, said preset code amount having an allowable range, wherein a relation between an allowable range D1 of a preset code amount for an amount of processed code data K1 and an allowable range D2 of a preset code amount for an amount of processed code data K2 is D1>D2 when K1<K2.

2. The apparatus according to claim 1, wherein different quantization tables are used according to whether the encoded amount is larger than the upper limit of the allowable range, the encoded amount is within the allowable range, or the encoded amount is lower than the lower limit of the allowable range.

3. An image processing method comprising:

an encoding step, of dividing an image into blocks and performing variable-length encoding for the image;

a storing step, of storing encoded data obtained in the encoding step into a memory; and a control step, of controlling a compression condition of the encoding step based on a result of comparing a preset code amount of an accumulated encoded area with an accumulated code amount, so that the amount of the encoded data falls within a predetermined range by a single encoding operation, said preset code amount having an allowable range, wherein a relation between an allowable range D1 of a preset code amount for an amount of processed code data K1 and an allowable range D2 of a preset code amount for an amount of processed code data K2 is D1>D2 when K1<K2.

4. The method according to claim 3, wherein different quantization tables are used according to whether the encoded amount is larger than the upper limit of the allowable range, the encoded amount is within the allowable range, or the encoded amount is lower than the lower limit of the allowable range.

5. An image data encoding apparatus comprising:

an inputter for inputting data representing an image constituted by a plurality of block images, and for sequentially supplying image data representing individual ones of the plurality of block images, on a block by block basis;

an image data transformer, arranged for transforming image data representing an individual block image, supplied by said inputter, into corresponding spatial frequency component data;

an encoder, arranged for quantizing the spatial frequency component data supplied by said image data transformer, to provide quantized spatial frequency component data, and for encoding the quantized spatial frequency component data;

a comparer, arranged for comparing an amount of encoded spatial frequency component data provided by said encoder with a predetermined lower value and a predetermined higher value, before said encoder encodes next spatial frequency component data; and a quantization parameter setter, arranged for setting a quantization parameter to be utilized by said encoder for quantizing the next spatial frequency component data, based on a comparison result of said comparer so that the amount of the encoded data falls within a predetermined range, wherein a relation between an allowable range D1 of a preset code amount for an amount of processed code data K1 and an allowable range D2 of a preset code amount for an amount of processed code data K2 is D1>D2 when K1<K2.

6. The apparatus according to claim 5, wherein said image data transformer performs an orthogonal transformation to the image data representing an individual block image, supplied by said inputter.

7. The apparatus according to claim 6, wherein said image data transformer performs a DCT transformation to the image data representing an individual block image.

8. The apparatus according to claim 5, wherein said encoder performs variable-length encoding to the quantized spatial frequency component data.

9. The apparatus according to claim 5, further comprising an image former for forming an image on a medium based on the encoded spatial frequency component data obtained by said encoder.

10. The apparatus according to claim 9, wherein said image forming means comprises a laser beam printer.

11. The apparatus according to claim 9, wherein said image forming means comprises a printer having a bubble jet head.

12. The apparatus according to claim 5, wherein the predetermined lower value and the predetermined higher value are defined based on an amount of block data encoded by said encoder.

13. An image data encoding method comprising the steps of:

an input step, of inputting data representing an image constituted by a plurality of block images, and sequentially supplying image data representing individual ones of the plurality of block images block, on a block by block basis;

a transforming step, of transforming image data representing an individual block image, supplied in said input step, into corresponding spatial frequency component data;

an encoding step, of quantizing the spatial frequency component data supplied in said transforming step, to provide quantized spatial frequency component data, and encoding the quantized spatial frequency component data;

a comparing step, of comparing an amount of encoded spatial frequency component data provided in said encoding step with a predetermined lower value and a predetermined higher value, before next spatial frequency component data is encoded in said encoding step; and a setting step, of setting a quantization parameter to be utilized for quantizing the next spatial frequency component data in said encoding step, based on a comparison result of said comparing step so that the amount of the encoded data falls within a predetermined range, wherein a relation between an allowable range D1 of a preset code amount for an amount of processed code data K1 and an allowable range D2 of a preset code amount for an amount of processed code data K2 is D1>D2 when K1<K2.

14. The method according to claim 13, wherein the predetermined lower value and the predetermined higher value are defined based on an amount of block data encoded in said encoding step.

* * * * *

UNITED STATES PATENT AND TRADEMARK OFFICE
CERTIFICATE OF CORRECTION

PATENT NO. : 6,553,143 B2
DATED : April 22, 2003
INVENTOR(S) : Nobutaka Miyake et al.

It is certified that error appears in the above-identified patent and that said Letters Patent is hereby corrected as shown below:

Title page,
Item [63], Related U.S. Application Data, "Continuation-in-part" should read -- Continued application --.

Column 1,
Line 1, "continued-in-part" should read -- continued application --;
Line 57, "embalance" should read -- imbalance --.

Column 6,
Line 30, "controller" should read -- controller 14 --.

Column 10,
Line 2, "which" should read -- to which --.

Column 13,
Line 43, "maximally" should read -- maximally and --.

Column 16,
Line 16, "embalance" should read -- imbalance --.

Column 23,
Line 33, "he" should read -- the --;
Line 58, "a" (second occurrence) should read -- $\alpha$ --.

Column 26,
Line 32, "maximally" should read -- maximally and --.

Column 29,
Line 42, "maximally" should read -- maximally and --.

Column 30,
Line 65, "not" should read -- not be --.

Column 37,
Line 21, "1220" should read -- 1220. --.

Column 43,
Line 51, "which" should read -- to which --.

UNITED STATES PATENT AND TRADEMARK OFFICE
CERTIFICATE OF CORRECTION

PATENT NO. : 6,553,143 B2
DATED : April 22, 2003
INVENTOR(S) : Nobutaka Miyake et al.

It is certified that error appears in the above-identified patent and that said Letters Patent is hereby corrected as shown below:

Column 44,
Line 67, "which" should read -- to which --.

Column 46,
Line 11, "to-be" should read -- to be --.

Column 50,
Line 2, "$Q_nUP(k1)—Q_nDOWN(k1)=Q_nD(k1)(n=0, 1, 2, 3, 4)$" should read
-- $Q_nUP(k1)—Q_nDOWN(k1)=Q_nD(k1),$
$(n=0, 1, 2, 3, 4)$ --

Column 52,
Line 20, "in" should read -- if --.

Column 53,
Line 21, "table-to" should read -- table to --.

Signed and Sealed this

Twenty-third Day of March, 2004

JON W. DUDAS
*Acting Director of the United States Patent and Trademark Office*